United States Patent [19]

Hall et al.

[11] Patent Number: 4,903,321

[45] Date of Patent: Feb. 20, 1990

[54] RADIO TRUNKING FAULT DETECTION SYSTEM

[75] Inventors: Nancy L. Hall; David L. Hattey, both of Lynchburg, Va.

[73] Assignee: General Electric Company, Lynchburg, Va.

[21] Appl. No.: 85,663

[22] Filed: Aug. 14, 1987

[51] Int. Cl.[4] .......................... H04Q 9/02; H04B 17/02
[52] U.S. Cl. ............................................. 455/34; 455/8; 455/67
[58] Field of Search ...................... 455/8, 9, 16, 33, 34, 455/53, 54, 56, 67; 340/825.16; 370/95, 96

[56] References Cited

U.S. PATENT DOCUMENTS 4,415,770 11/1983 Kai et al. ................................. 379/32
4,477,809 10/1984 Bose ................................ 340/825.54

Primary Examiner—Thomas H. Tarcza
Assistant Examiner—Gilberto Barron Jr.
Attorney, Agent, or Firm—Nixon & Vanderhye

[57] ABSTRACT

A radio frequency repeater system includes a independent error detection units which detect redundant and overlapping error conditions of the RF repeater stations. The error detection units notify the site controller and/or a system manager of the error conditions, and the failed repeater stations are removed from active service. The error detection units are then used to simulate actual service for the failed stations so that the stations can be placed back into service once they being operating properly again. Because the error detection units operate independently of the other components in the repeater system they can be used to trigger failure recovery mechanisms without becoming ineffective due to failure of other components.

7 Claims, 34 Drawing Sheets

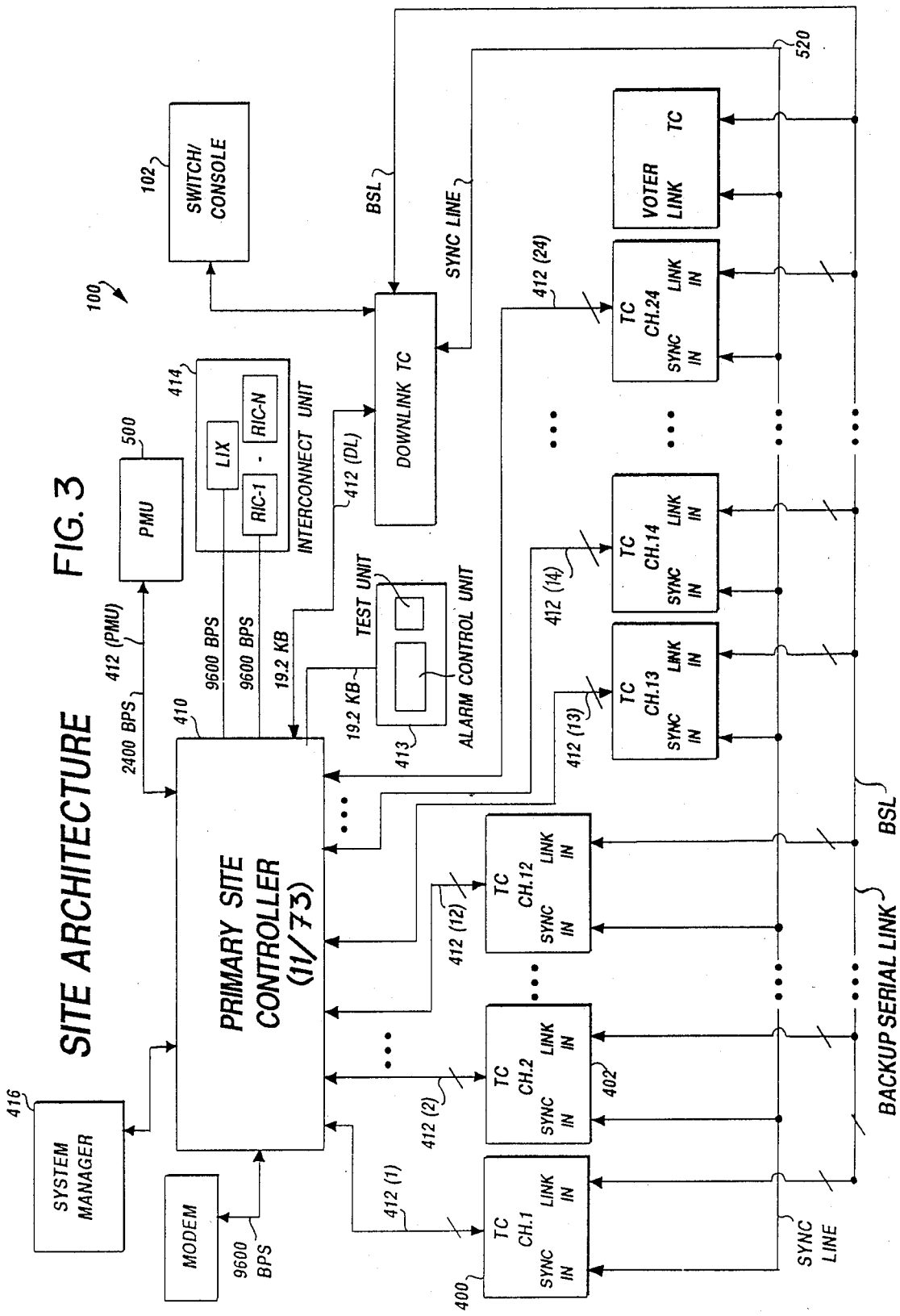

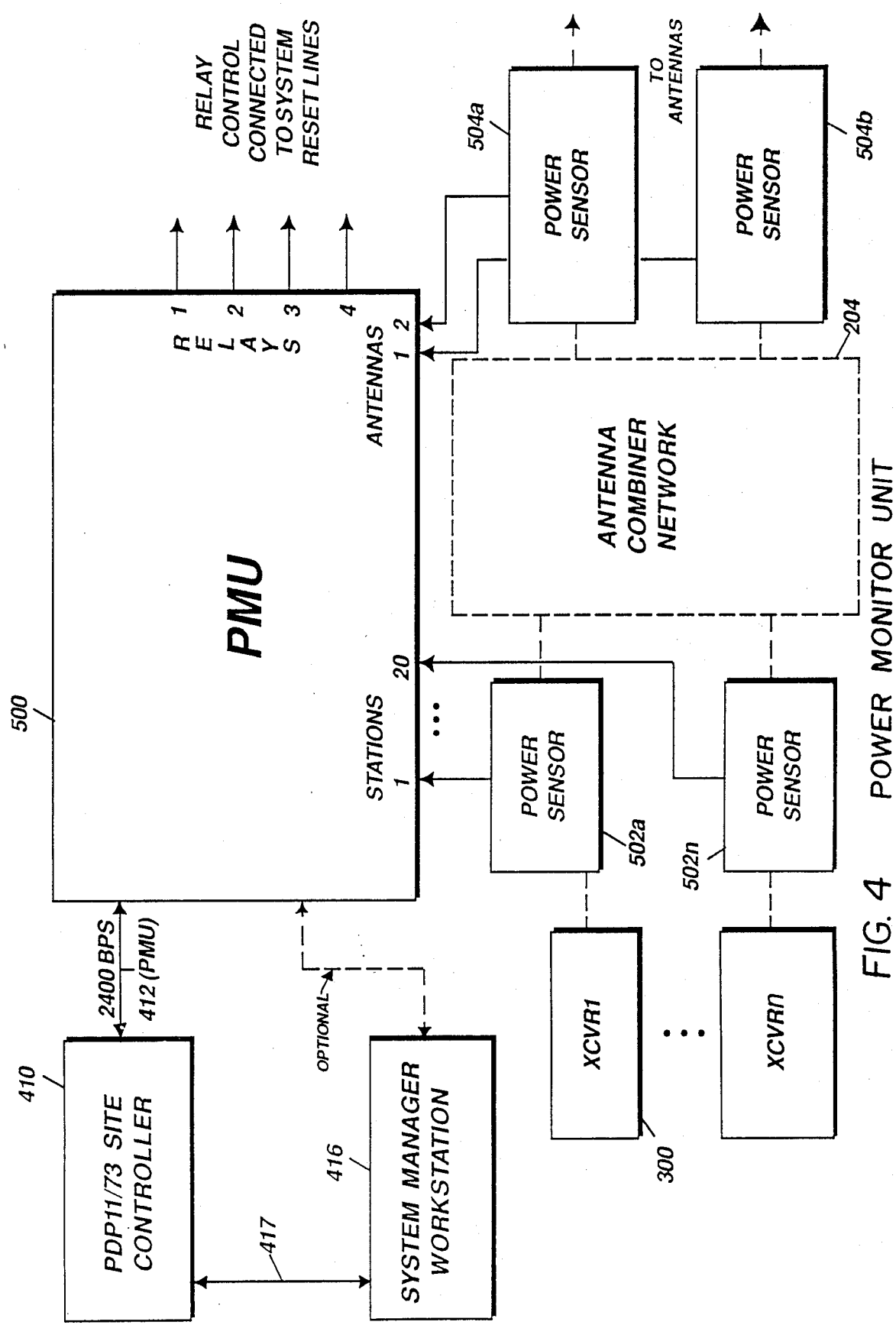
FIG. 4  POWER MONITOR UNIT

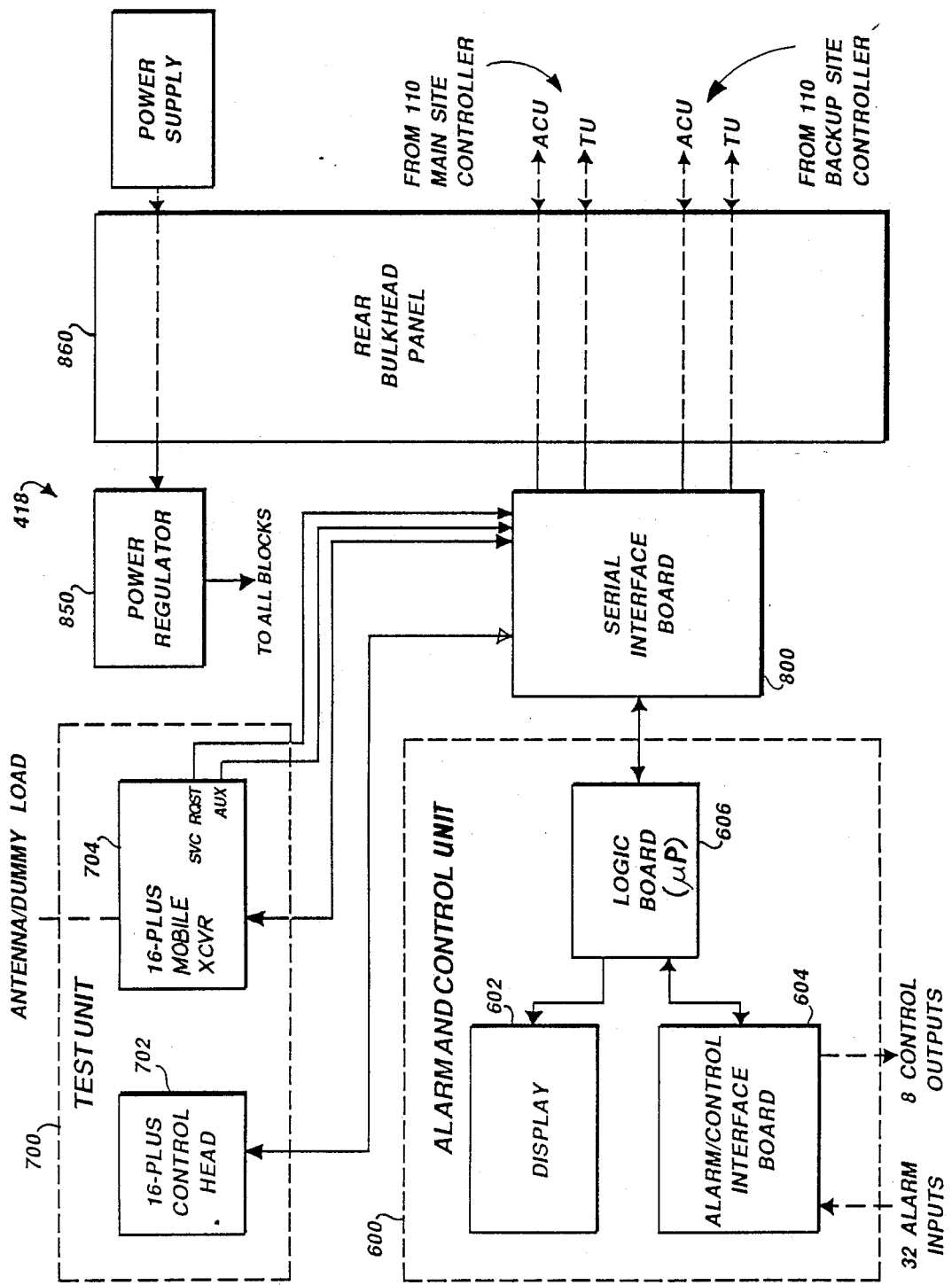
FIG. 5     TEST AND ALARM UNIT

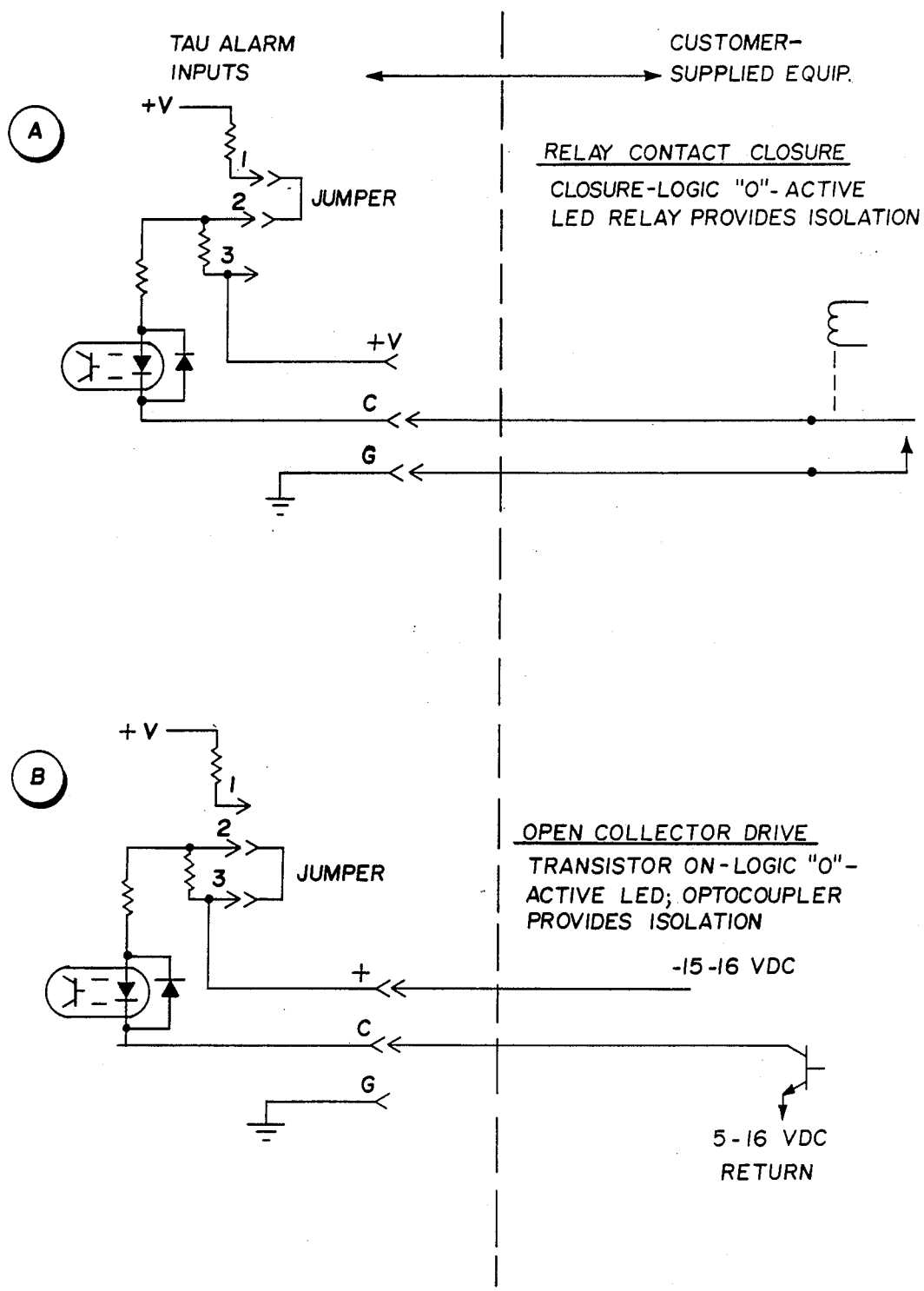
FIG. 6A (1 OF 2 SHS.)
TYPICAL ALARM INPUT CONNECTIONS

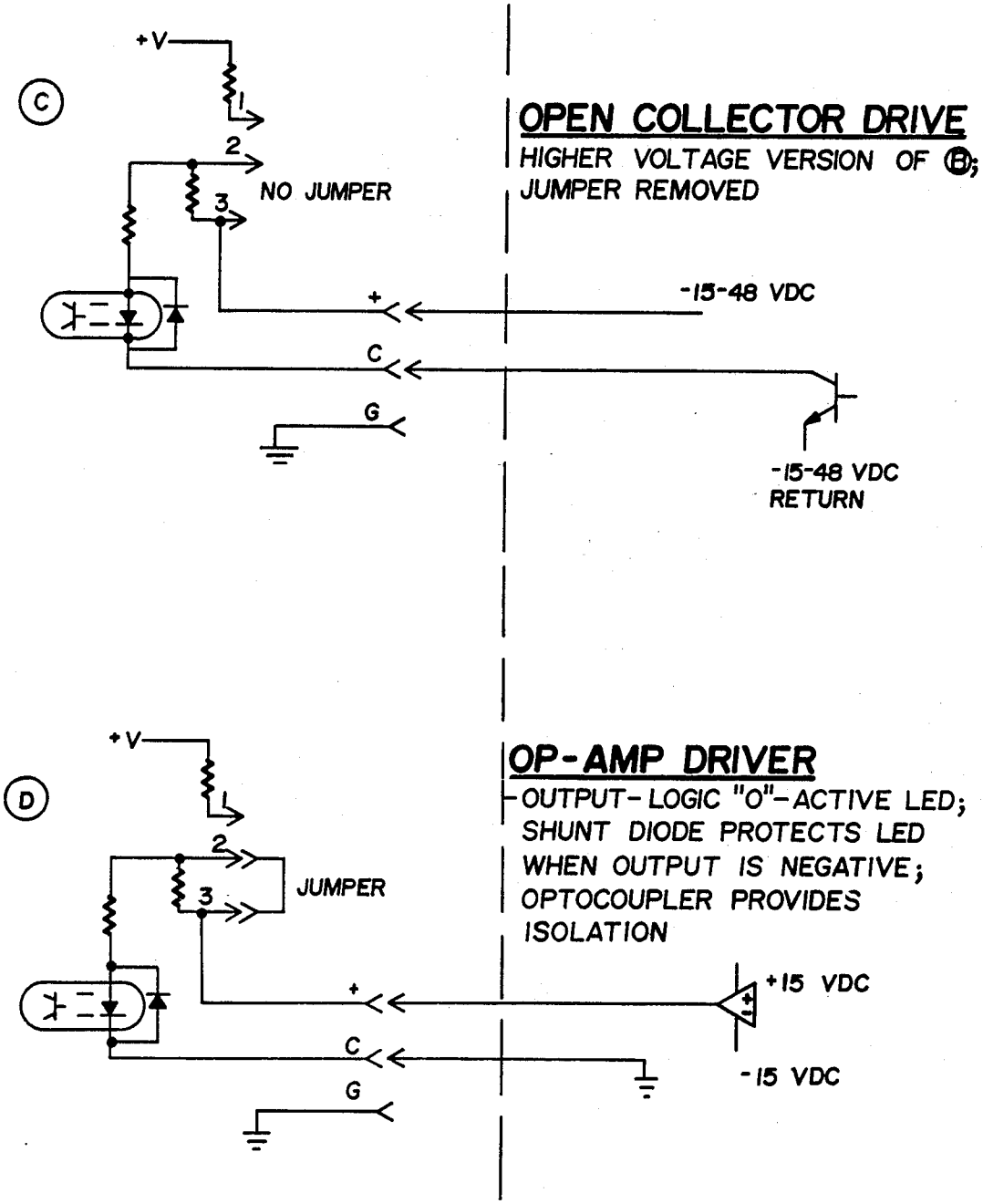
FIG. 6B (2 OF 2 SHS.)

TYPICAL CONTROL OUTPUT CONNECTIONS

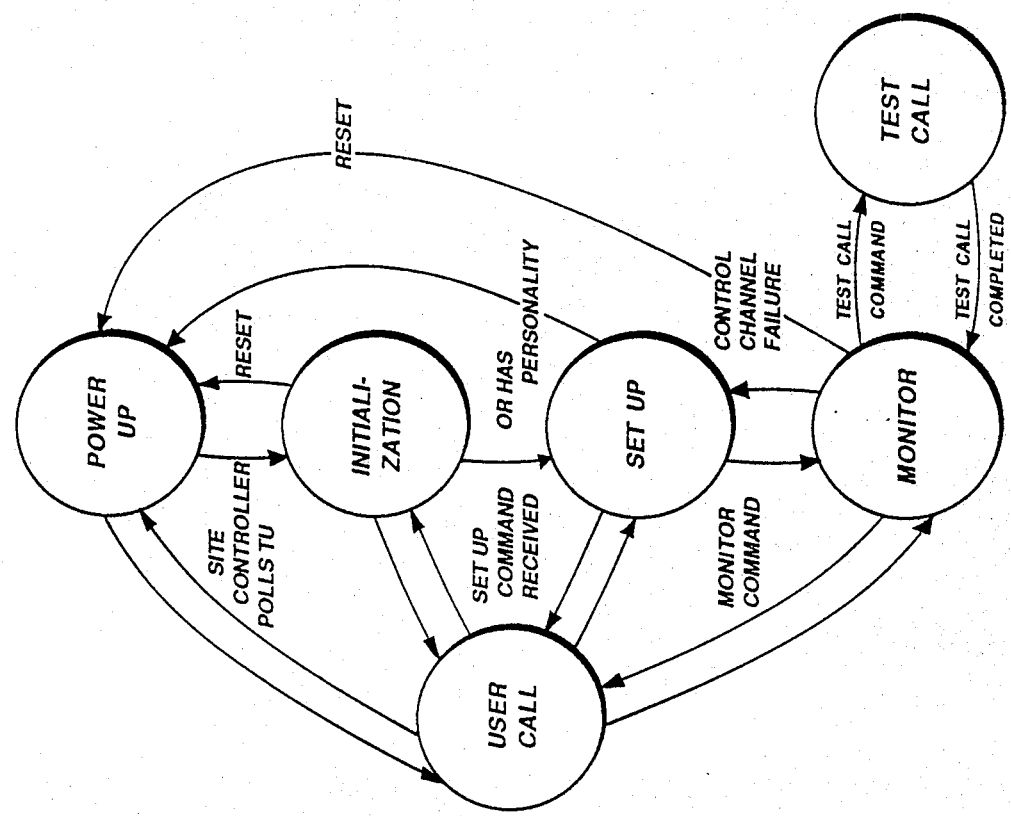
FIG. 20  TU STATE DIAGRAM
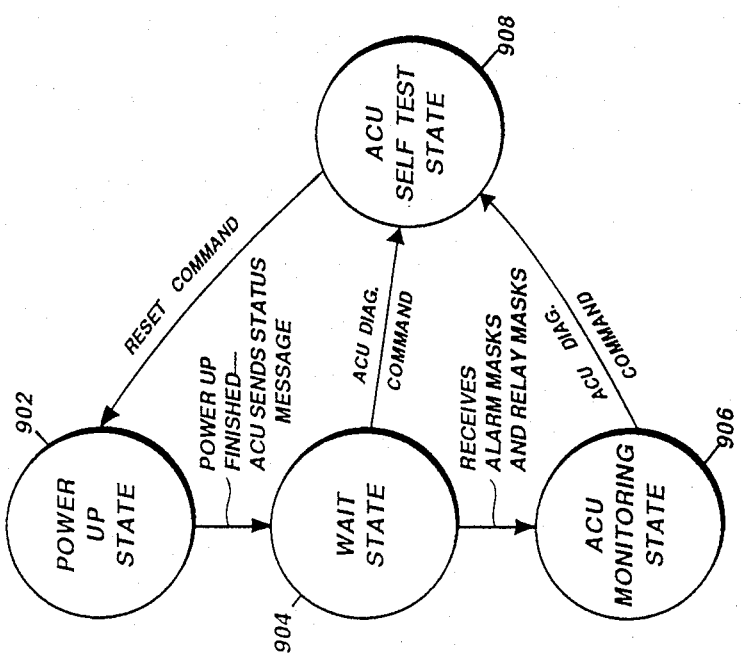
FIG. 9  ACU STATE DIAGRAM

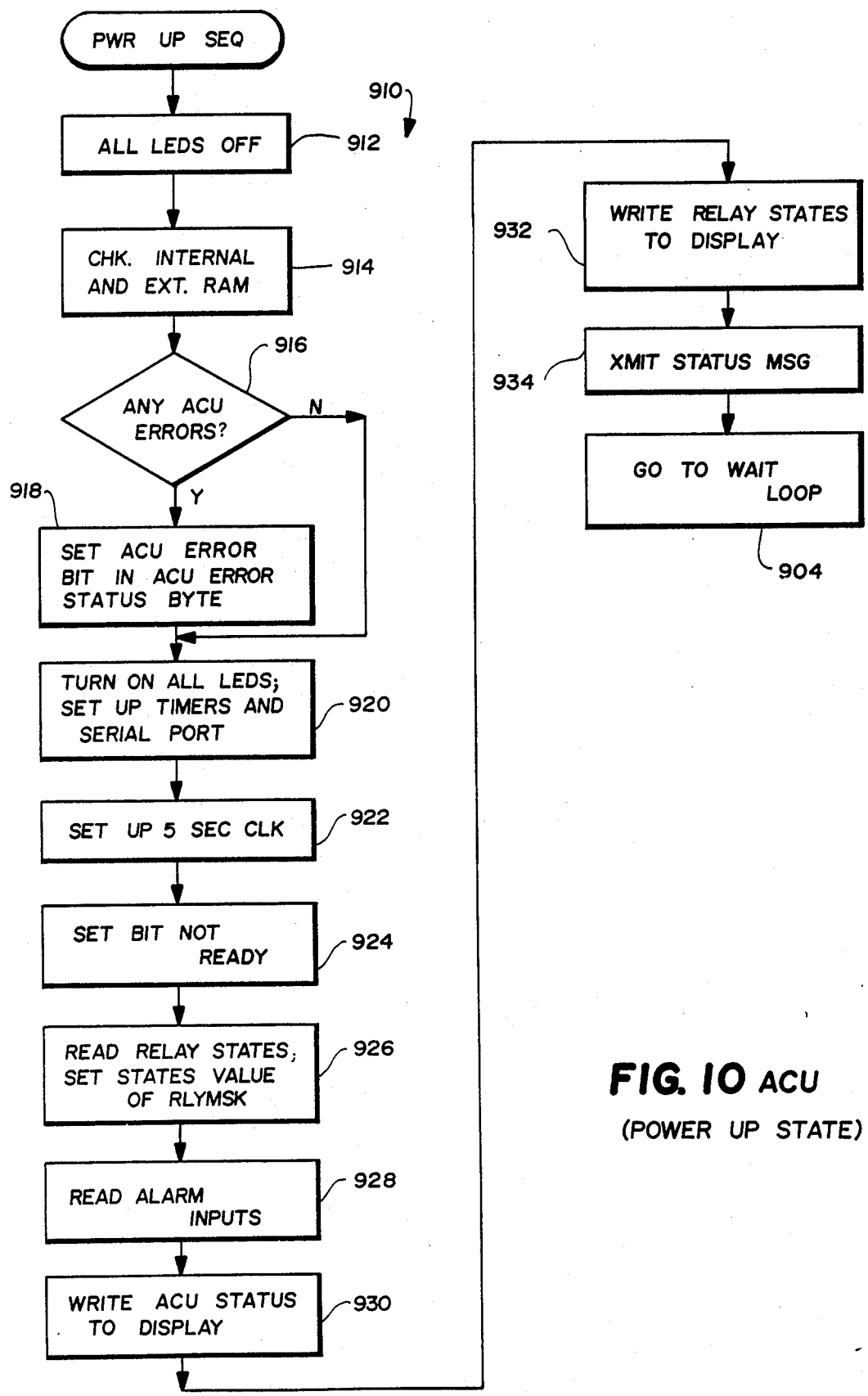
FIG. 10 ACU
(POWER UP STATE)

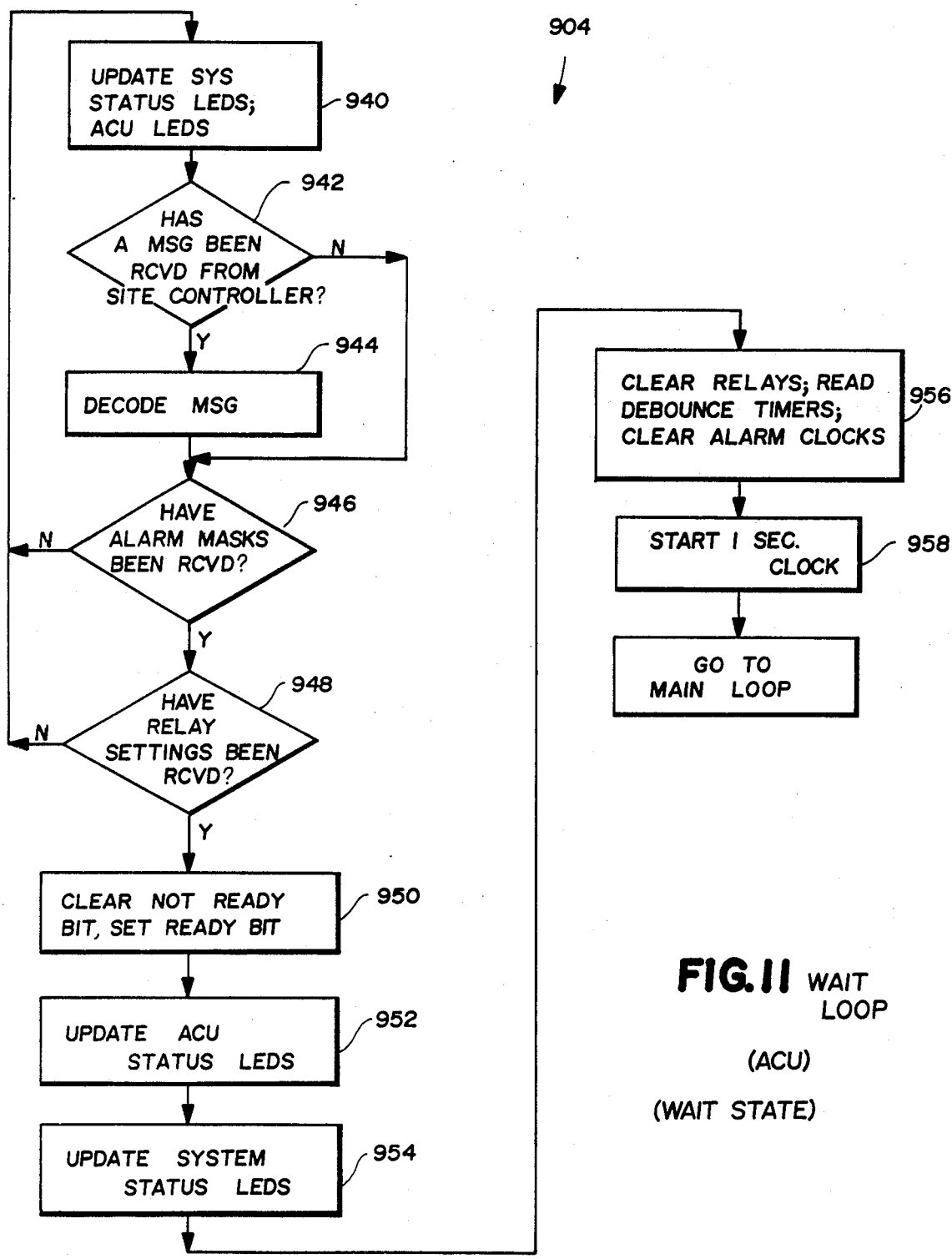
FIG. 11 WAIT LOOP
(ACU)
(WAIT STATE)

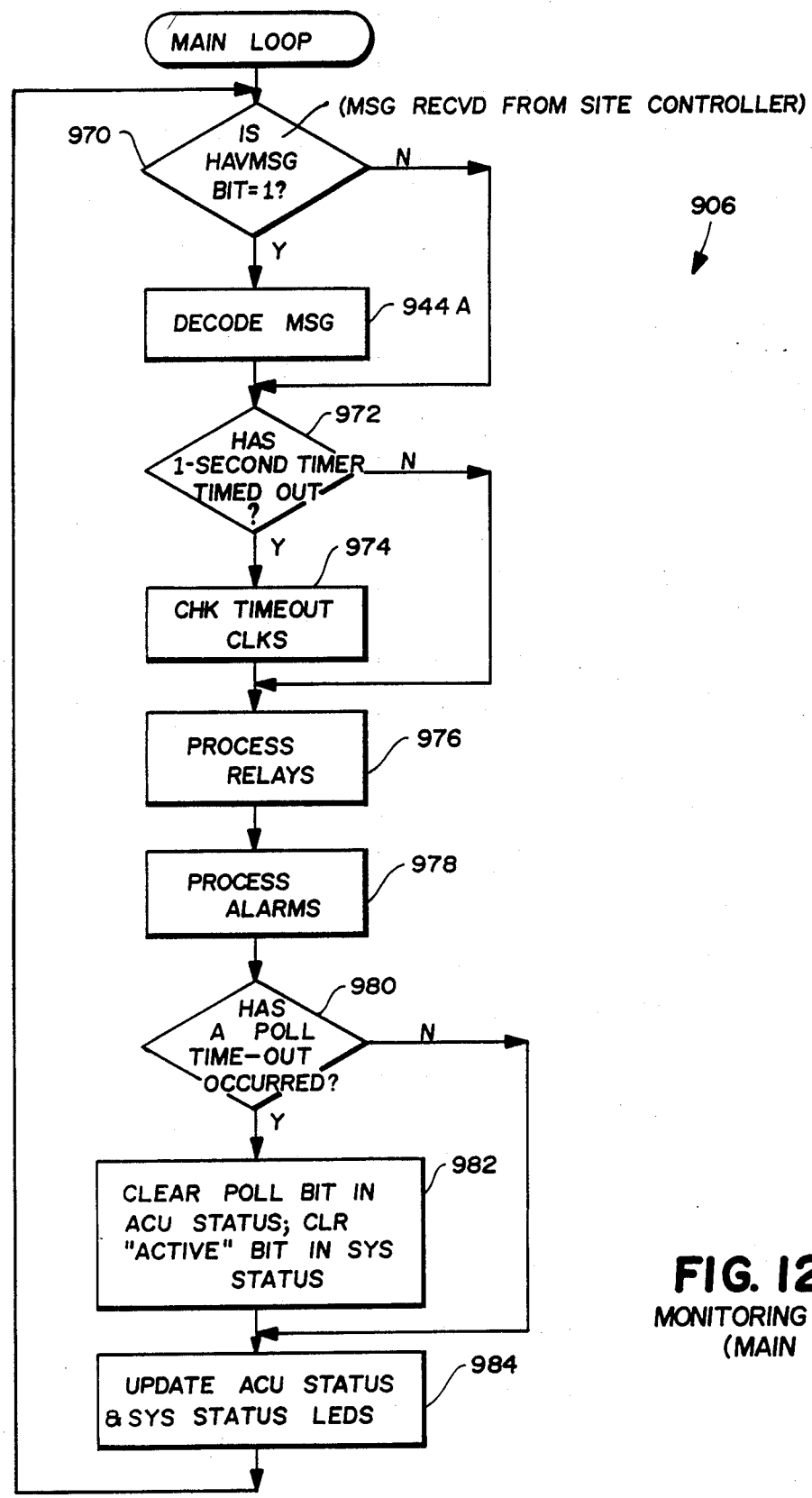
FIG. 12 ACU MONITORING STATE (MAIN LOOP)

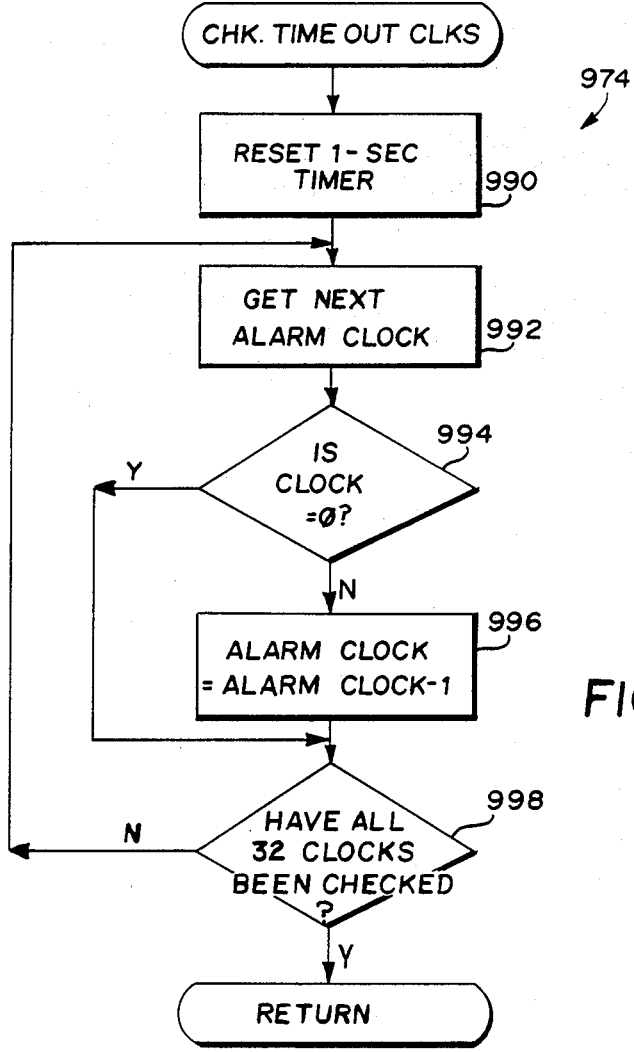
FIG. 13 ALARM CHECK (ACU)

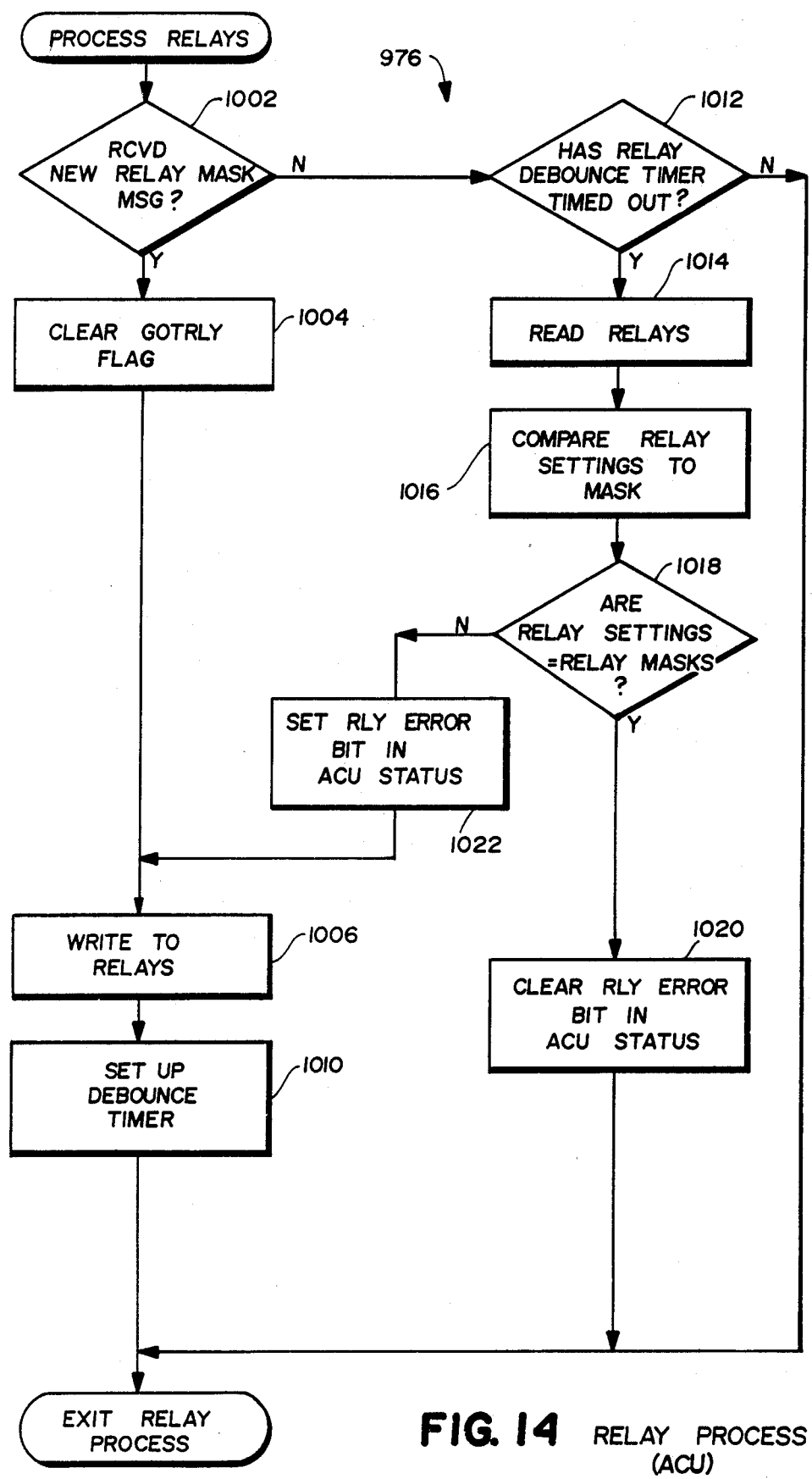
FIG. 14  RELAY PROCESS (ACU)

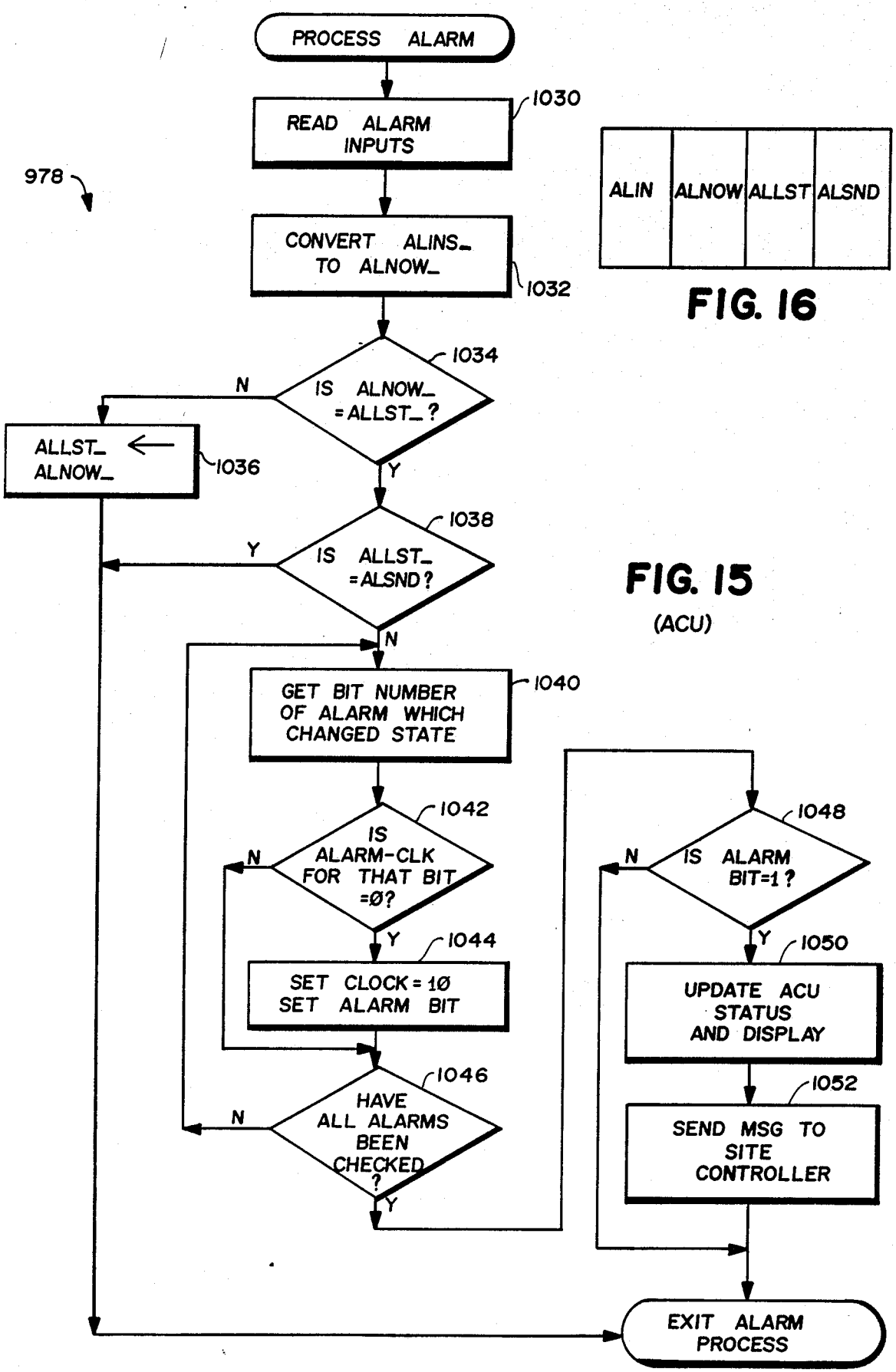

DECODE MSG
(ACU)

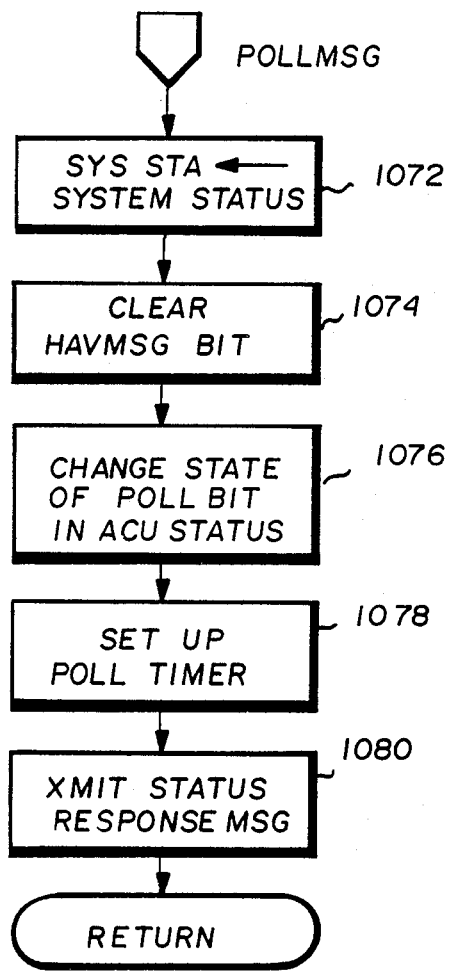
FIG. 18A
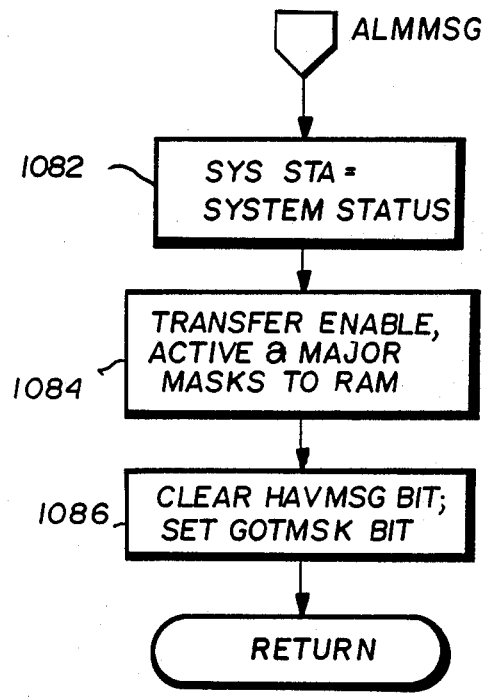
FIG. 18B ALARM MASK
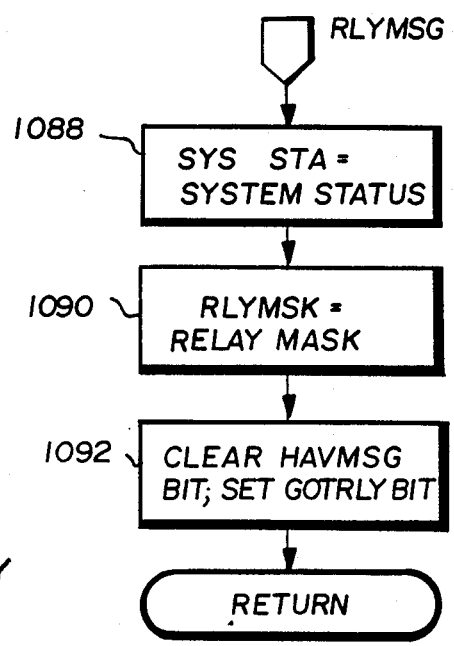
FIG. 18C RELAY MASK

TSTACU
(ACU)

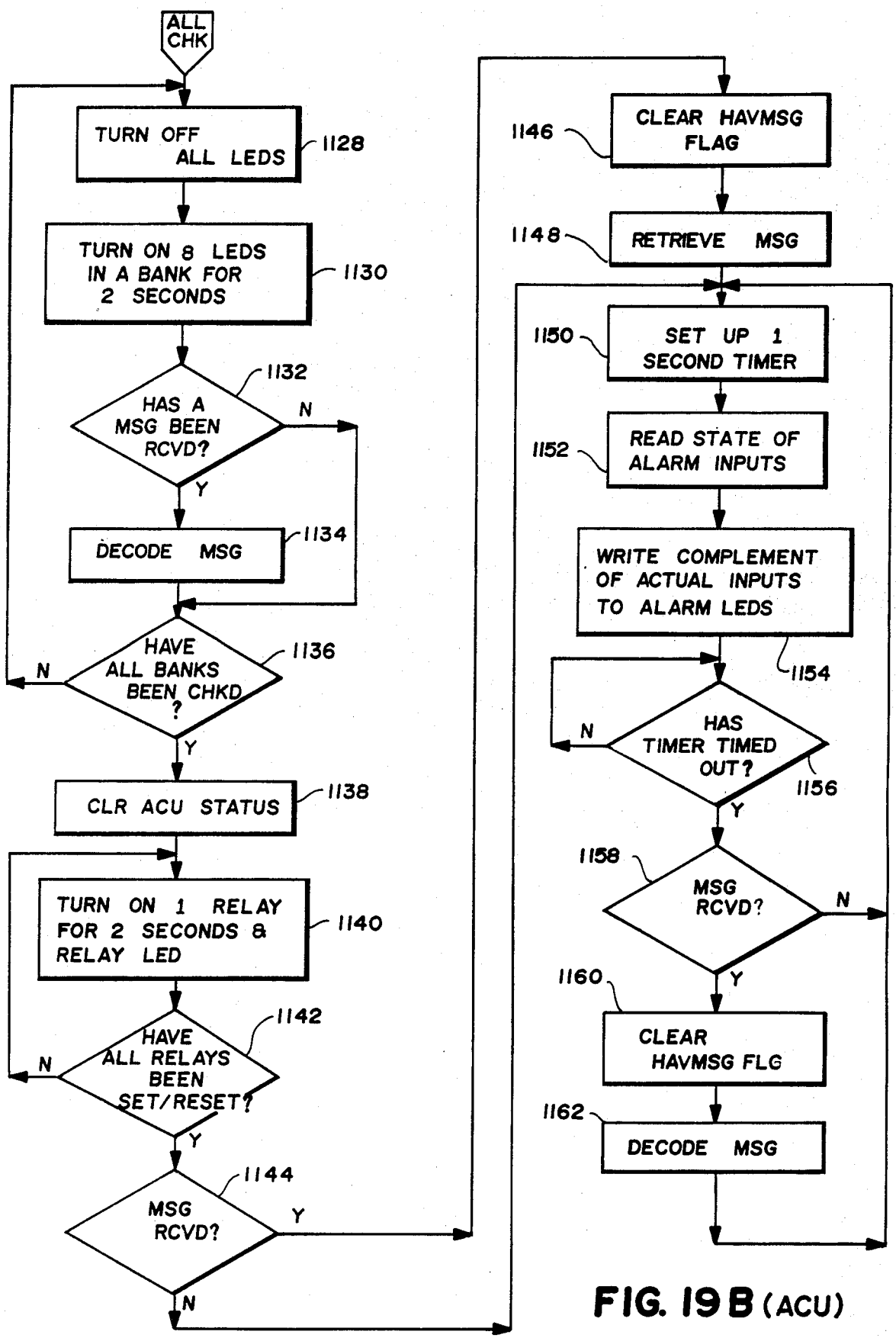
FIG. 19B (ACU)

TEST UNIT

FIG. 22 (TU)

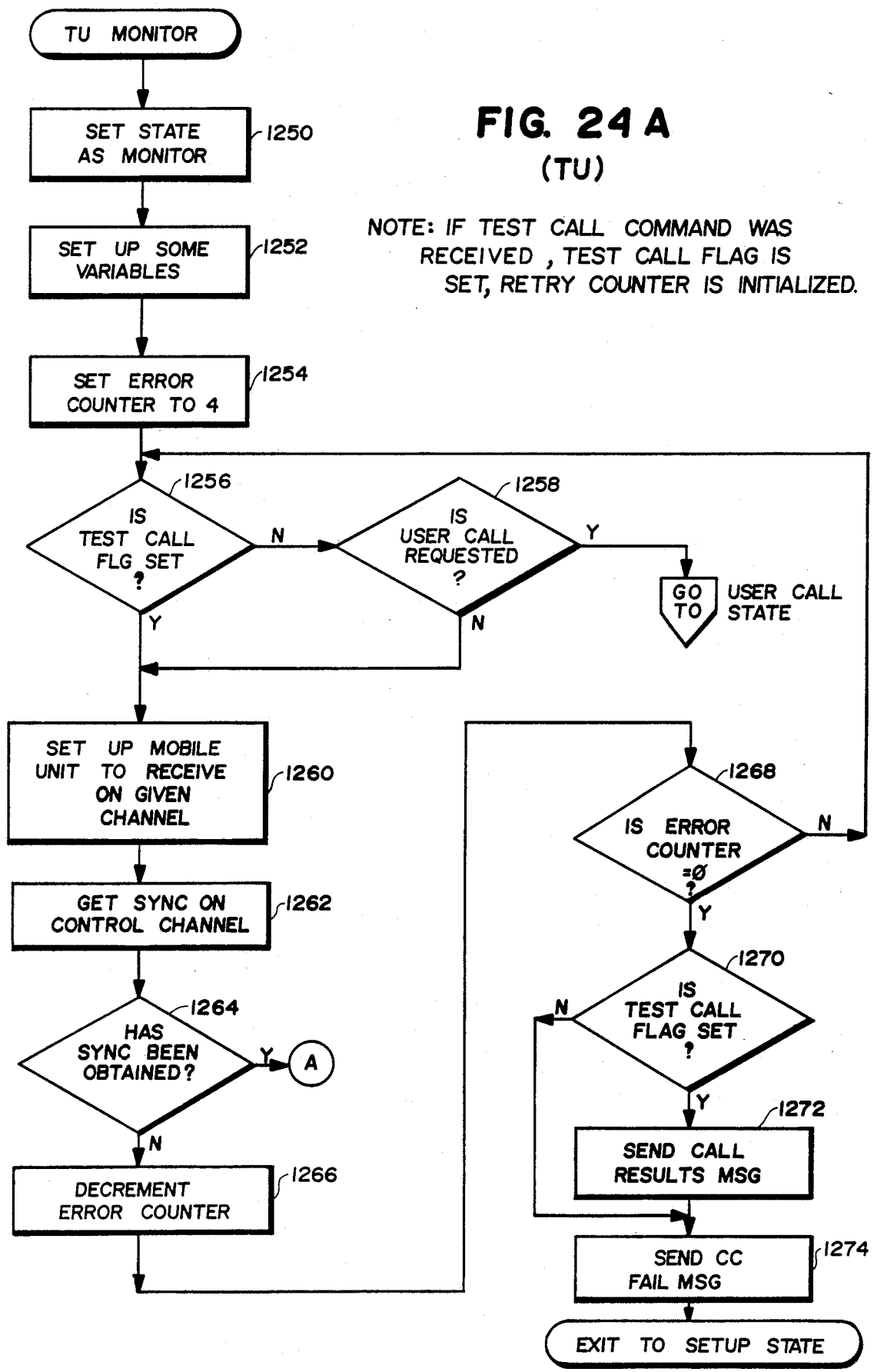
FIG. 24A (TU)

(TU)

(TU)

(TU)

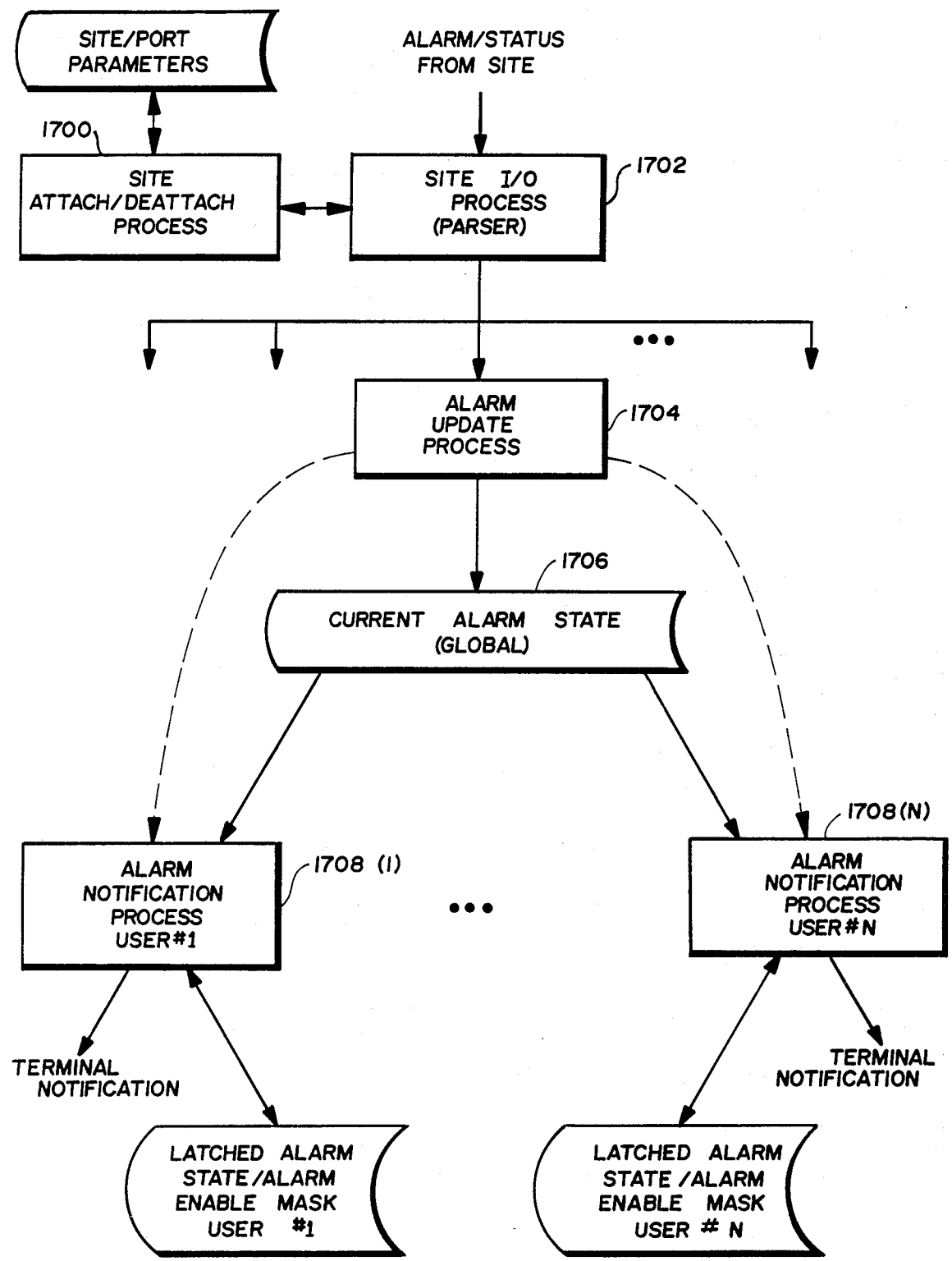
FIG. 29 REAL TIME ALARM NOTIFICATION

| SITE ID | RESOURCE ID | ELEMENT ID | ALARM STATE | TIME |
|---------|-------------|------------|-------------|------|
| SITE ID | RESOURCE ID | ELEMENT ID | ALARM STATE | TIME |
| SITE ID | RESOURCE ID | ELEMENT ID | ALARM STATE | TIME |
| SITE ID | RESOURCE ID | ELEMENT ID | ALARM STATE | TIME |
| ⋮ | ⋮ | ⋮ | ⋮ | ⋮ |
| SITE ID | RESOURCE ID | ELEMENT ID | ALARM STATE | TIME |

FIG. 30 GLOBAL ALARM STATE ARRAY

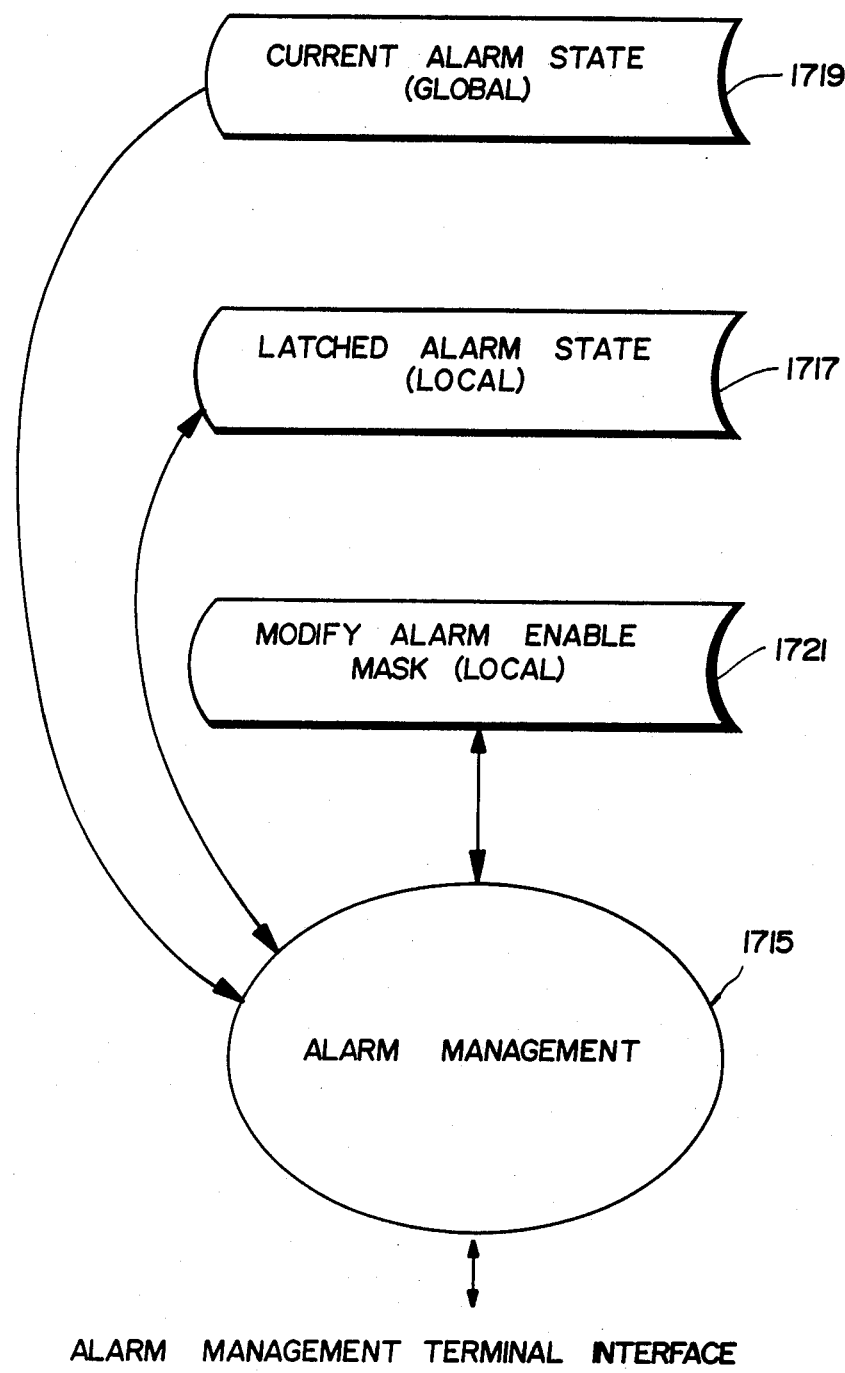
FIG. 31 ALARM MANAGEMENT

RADIO TRUNKING FAULT DETECTION SYSTEM

CROSS-REFERENCES TO RELATED APPLICATIONS

This application is related to the following commonly-assigned U.S. patent applications all filed on June 3, 1987: application Ser. No. 056,922 of Childress et al entitled "Trunked Radio Repeater System "; application Ser. No. 057,046 of Childress et al entitled "Failsoft Architecture for Public Trunking System "; application Ser. No. 056,924 of Childress entitled "Adaptive Limiter/Detector Which Changes Time Constant Upon Detection of Dotting Pattern"; application Ser. No. 056,923 of Childress et al entitled "Apparatus and Method for Transmitting Digital Data Over a Radio Communications Channel". This application is also related to the following commonly-assigned copending applications filed on Aug. 14, 1987: application Ser. No. 085,572 of Nazarenko et al entitled: "Processor-to-Processor Communications Protocol for a Public Service Trunking System"; application Ser. No. 085,490 of Dissosway et al entitled "Mobile Radio Interface"; and application Ser. No. 085,491 of Cole et al entitled "A Method for Infrequent Radio Users to Simply Obtain Emergency Assistance". The disclosures of each of those related copending patent applications are incorporated by reference herein.

This invention is generally directed to the art of trunked radio repeater systems. It is more particularly directed to a radio frequency repeater site architecture with failure detection features which allow trunking and other communications capabilities to be provided despite failure of major components of the architecture (e.g., the primary site controller 410).

Radio repeater trunking (time sharing of a single repeater communications channel among many users) is well-known. Early trunking systems used analog control signals while some more recent systems have utilized digital control signals. Control signals have been utilized on a dedicated control channel and/or on different ones of the working channels for various different reasons and effects. A non-exhaustive but somewhat representative sampling of publications and patents describing typical prior art trunked radio repeater systems is identified below:

U.S. Pat. No. 3,292,178, Magnuski (1966)
U.S. Pat. No. 3,458,664, Adlhoch et al (1969)
U.S. Pat. No. 3,571,519, Tsimbidis (1971)
U.S. Pat. No. 3,696,210, Peterson et al (1972)
U.S. Pat. No. 3,906,166, Cooper et al (1975)
U.S. Pat. No. 3,936,616, DiGianfilippo (1976)
U.S. Pat. No. 3,970,801, Ross et al (1976)
U.S. Pat. No. 4,001,693, Stackhouse et al (1977)
U.S. Pat. No. 4,010,327, Kobrinetz et al (1977)
U.S. Pat. No. 4,012,597, Lynk, Jr. et al (1977)
U.S. Pat. No. 4,022,973, Stackhouse et al (1977)
U.S. Pat. No. 4,027,243, Stackhouse et al (1977)
U.S. Pat. No. 4,029,901, Campbell (1977)
U.S. Pat. No. 4,128,740, Graziano (1978)
U.S. Pat. No. 4,131,849, Freeburg et al (1978)
U.S. Pat. No. 4,184,118, Cannalte et al (1980)
U.S. Pat. No. 4,231,114, Dolikian (1980)
U.S. Pat. No. 4,309,772, Kloker et al (1982)
U.S. Pat. No. 4,312,070, Coombes et al (1982)
U.S. Pat. No. 4,312,074, Pautler et al (1982)
U.S. Pat. No. 4,326,264, Cohen et al (1982)
U.S. Pat. No. 4,339,823, Predina et al (1982)
U.S. Pat. No. 4,347,625, Williams (1982)
U.S. Pat. No. 4,360,927, Bowen et al (1982)
U.S. Pat. No. 4,400,585, Kamen et al (1982)
U.S. Pat. No. 4,409,687, Berti et al (1983)
U.S. Pat. No. 4,430,742, Milleker et al (1984)
U.S. Pat. No. 4,430,755, Nadir et al (1984)
U.S. Pat. No. 4,433,256, Dolikian (1984)
U.S. Pat. No. 4,450,573, Noble (1984)
U.S. Pat. No. 4,485,486, Webb et al (1984)
U.S. Pat. No. 4,578,815, Persinotti (1985)

The Bowen et al system is an example of prior art switched channel repeater systems which avoid using a dedicated control channel—in part by providing a handshake with the repeater site controller 410 on a seized "idle" working channel before communication with the called unit(s) is permitted to proceed.

There are many actual and potential applications for trunked radio repeater systems. However, one of the more important applications is for public service trunked (PST) systems. For example, one metropolitan area may advantageously utilize a single system of trunked radio repeaters to provide efficient radio communications between individual radio units within many different agencies. Each agency may, in turn, achieve efficient communication between individual units of different fleets or subunits (e.g., the police department may have a need to provide efficient communications between different units of its squad car force, different units of detectives or narcotics agents and the like). Sometimes it may be important to communicate simultaneously to predefined groups of units (e.g., all units, all of the squad cars, all of the foot patrolmen, etc.). At the same time, other agencies (e.g., the fire department, the transportation department, the water department, the emergency/rescue services, etc.) may be in need of similar communication services. As is well-known to those familiar with trunking theory, a relatively small number of radio repeaters can efficiently service all of these needs within a given geographic area if they are trunked (i.e., shared on an "as-needed" basis between all potential units).

There are a variety of trunked communications systems on the market today, each with its own set of advantages and disadvantages. The one thing all such systems have in common is architectures which (1) prohibit the use of optimum signaling baud rates, (2) inhibit diagnosis, localization and correction of hardware failures; and (3) cannot continue to support trunked operation should any non-RF signal point failure occur. The importance of each of these three points will be discussed individually.

(1) Optimum Signaling Rates

The telecommunications industry invested substantial time and money towards determining the optimal way of transmitting data at 800 MHz for the cellular telephone network. Data transmission efficiency is important since it increases both frequency efficiency and user efficiency of a system. It was concluded that the optimal baud rate is the highest baud rate of bilevel encoded data that the channel bandwidth would support. For Public Service Trunking (PST) systems having a 25 KHz channel bandwidth, 9600 baud is the highest rate that can be supported. Nevertheless, due to hardware and architecture which are unable to support the higher processing requirements associated with a higher baud rate, existing systems either use low baud rates (300 baud) or suboptimal baud rates (3600 baud).

(2) Localization and Correction of Hardware Failures

A computer primary site controller 410 which oversees site activity and detects site faults expedites the failure detection and correction process. On the other hand, if that same computer embodies all intelligence at the site, then fault detection within the controller itself becomes difficult to perform. Existing systems either have no computer to effectively detect failures, or a computer which contains all site intelligence (and thus cannot effectively diagnose or recover from its own failure).

(3) Trunked Fail Soft Operations

There are at least three reasons why site controller 410 failure should not eliminate trunking capability. First, since the system is trunked, more radios probably reside on the system than if it were a conventional system—and consequently, elimination of the trunked mode causes system overload (since a trunked system can handle far more traffic than a non-trunked system). This can result in units being forced off the system—or units being unable to access the system to begin with.

Second, changing the mode of operation as seen by the users (e.g., from a trunked system to a system in which users must select their own operating frequencies manually) creates additional confusion, particularly when a user is forced to listen to all conversations— even those that don't pertain to him/her (in a typical trunked system, only those units intended to be a part of a communication tune to the frequency on which the communication takes place).

Third, site controller 410 failures are not statistically independent from emergency situations in the field. For example, the very storm that might cause emergencies in the field could cause power problems damaging the site controller 410. The advantages provided by a trunked communication system may thus be needed most at the time the site controller 410 fails.

Fault tolerance can be the most sophisticated portion of a system, and is not achieved effectively as an afterthought to the system design process. Yet to date, trunked communication systems have been designed with little regard towards fault tolerance, forcing the end user to tie up capital in redundant hardware in order to obtain reliability. Affording the end user with a truly fault tolerant trunked communications system requires system design and engineering considerations throughout the development cycle, beginning with the very conception of the system itself.

A trunked communication system must be evaluated based on all aspects of system operation, including its fault tolerance. A repeater site architecture for a trunked (or even a non-trunked) communications system has been developed which has excellent fault tolerance and fault detection and therefore overcomes the aforementioned shortcomings inherent in all other known existing trunking systems. Briefly, the present invention provides a unique site architecture which separates error detection functions from data processing and control functions.

A "failsoft" architecture is desirable in copending commonly-assigned application service number 057,046 of Childress et al entitled "Failsoft Architecture For Public Trunking System". Briefly, signal processing hardware (embodied in a so-called "trunking card", or "TC") dedicated to each radio frequency channel (and to a radio transmitter and receiver operating on the channel) provides the signal processing required for its associated channel. Each dedicated signal processing trunking card operates essentially independently except for higher-level required control coordination with other trunking cards and with the primary site controller 410 computer. During normal operation of the system, most control functions are performed by the site controller 410 (e.g., a high speed computer with advanced, real time control capabilities)—leaving the trunking card processors free to devote all of their processing resources to processing signals associated with the specific RF channels they are dedicated to. Synchronization lines and serial communications lines are shared among all of the channel processing trunking cards—but flow of control information during normal system operation is between the trunking cards and the site controller 410.

Error detection is a very important aspect of a fault tolerance system. Fault tolerant reconfiguration cannot take place unless and until an error is detected. The present invention provides a arrow detection system which operates independently from the signal processing and data processing portions of a repeater system to detect faults and provide information relating to detected faults to various portions of the repeater system. Such fault detection information can be used to prompt the system to reconfigure itself (e.g., using the "failsoft" techniques described in copending commonly-assigned application Ser. No. 057,046 of Childress et al).

Technology has finally made fault tolerant trunked communication systems a reality. The fault detection architecture provided by the present invention, with just one general purpose site controller 410, makes possible a three times greater trunking reliability than the trunking reliability of a non-fault tolerant architecture with a custom site controller 410 supported by a "hot" standby site controller 410 unit.

In light of today's communication needs, and what current technology can deliver, fault tolerant trunked communication systems are mandated. Appraising a system's capabilities requires understanding the trade-offs made by the designers in establishing a balance between functionality, cost, and fault tolerance. And in the end, the effective evaluation of a system enables one to weed out those that talk fault tolerance from those that deliver it.

BRIEF DESCRIPTION OF THE DRAWINGS

These as well as other features and advantages of this invention will be more completely understood and appreciated by carefully studying the following detailed description of the presently preferred exemplary embodiment taken in conjunction with the accompanying drawings, of which:

FIGS. 2 and 3 are more detailed schematic block diagrams of the repeater site architecture shown in FIG. 1;

FIG. 4 is a detailed schematic block diagram of the power monitor unit shown in FIGS. 2 and 3;

FIG. 5 is a detailed schematic block diagram of the test, alarm and control unit shown in FIGS. 2 and 3;

FIG. 6A-6B are detailed schematic diagrams of exemplary alarm input connections for the FIG. 5 test, alarm and control unit;

FIG. 9 is a state diagram of the states the alarm and control unit shown in FIG. 5 may operate in;

FIGS. 10-19B are detailed schematic flowcharts of exemplary program control steps performed by the alarm and control unit shown in FIG. 5;

FIG. 20 is a state diagram of the states the test unit shown in FIG. 5 may operate in;

FIGS. 27-32 are flowcharts and schematic diagrams describing the structure and operation of the system manager shown in FIG. 1.

DETAILED DESCRIPTION OF PRESENTLY PREFERRED EXEMPLARY EMBODIMENTS

OVERALL SYSTEM ARCHITECTURE

Figure 1:
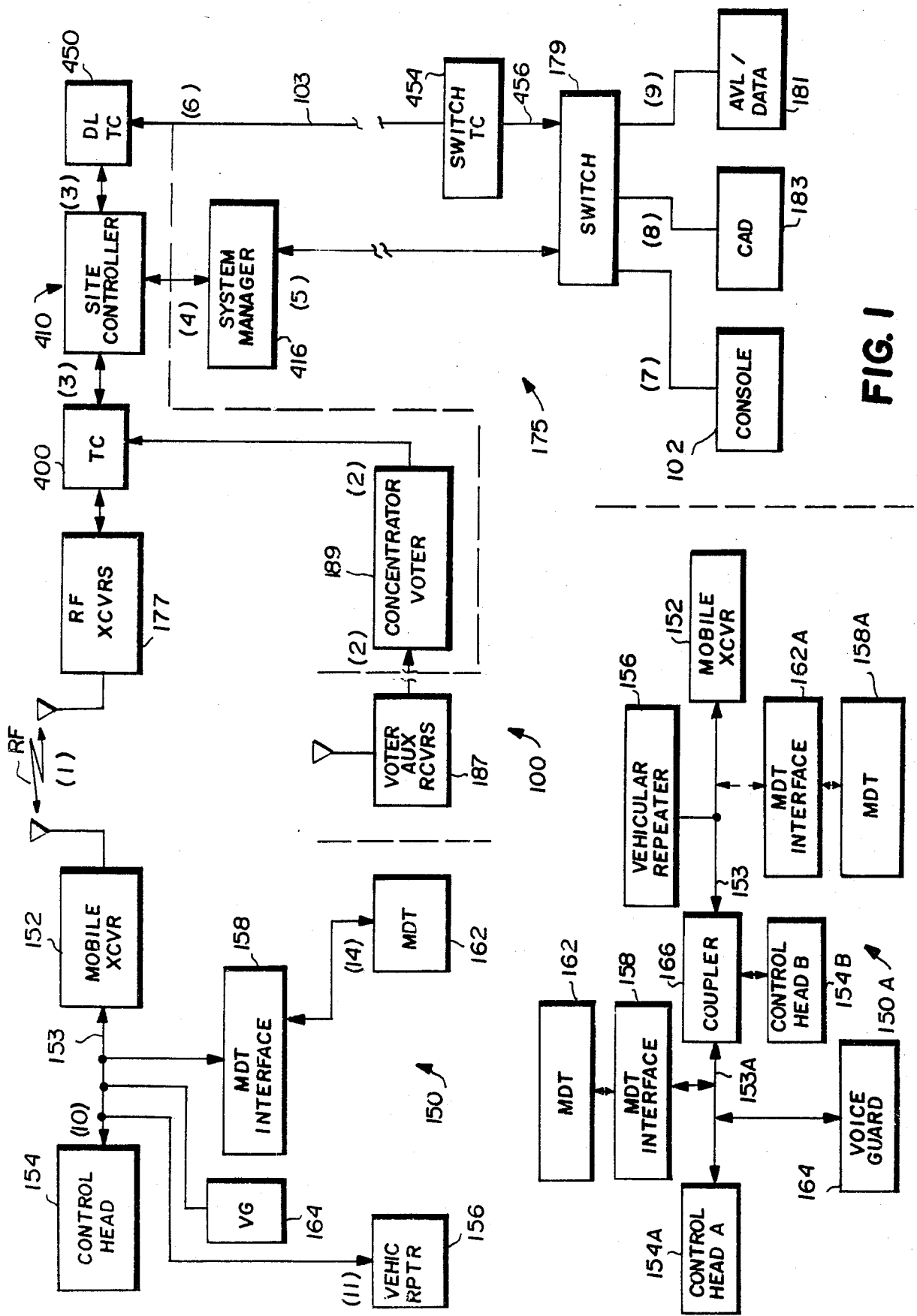
FIG. 1 is an overall block diagram of a digitally trunked radio repeater system in accordance with the presently preferred exemplary embodiment of the present invention.

An exemplary trunked radio repeater system 100 in accordance with this invention is generally depicted in FIG. 1. System 100 includes at least one (and typically many) mobile (or portable) radio transceiving stations 150 and an RF repeater station 175. Mobile transceiving station 150 communicates via an RF link and repeater station 175 with other mobile transceiving stations and/or with landbased parties connected to the repeater station by conventional dial-up landlines.

Repeater station 175 includes a site controller 410, individual repeater channel transceivers 177, and a multiplexing telephone interconnection network ("switch", or "MTX") 179. Site controller 410 is preferably a mainframe digital computer which oversees the general operation of repeater station 175. In particular, site controller 410 controls the operation of RF transceivers 177 by transmitting digital signals to and receiving digital from "trunking cards" ("TC") 400 connected between the site controller and individual transceivers (although only one transceiver 177 and one trunking card 400 are shown in FIG. 1, there typically are many such trunking card/transceiver combinations in repeater station 175—one for each RF channel the repeater station operates on.

Site controller 410 communicates with one or more dispatch consoles 102 via a "downlink" 103 which includes a "downlink" trunking card 450 and a "switch" trunking card 454. The downlink 103 also typically is channeled through switch 179. Also connected to switch 179 are AVL (automatic vehicular locating system) 181 and CAD (computer aided dispatch system) 183. A system manager computer system 416 (hereafter referred to as the "system manager") is connected to site controller 410 and to switch 179 to allow a system manager to oversee and control the overall operation of system 100.

A remote receiver 187 and associated concentrator/voter 189 may be connected to trunking card 400 to allow so-called "RSSI" signal strength measurements to be based on the stronger of the signal level received at the central repeater station site and the signal level received at a remote site —thereby increasing the reliability of such measurements.

An RF link ("RF") connects RF transceivers 177 with mobile transceiving stations 150. Mobile station 150 is capable of transmitting digitized voice or digital data signals (encrypted or unencrypted) to and receiving such signals from repeater station 175 over the RF link.

In the configuration shown in the upper left-hand portion of FIG. 1, mobile station 150 includes a mobile RF transceiver 152 connected to a control head 154 via a serial digital bus 153. Mobile transceiver may also be connected to a vehicular repeater 156 via the serial bus. A mobile data terminal interface 158 may connect the serial bus to a mobile data terminal (MDT) 162. A separate digital voice guard module 164 performs data encryption and decryption on digitized voice and/or digital data signals using the conventional DES algorithm.

In the alternate mobile radio configuration shown in the lower left-hand corner of FIG. 1, a coupler 166 is used to connect dual control heads 154A, 154B to serial bus 153. In this configuration, a mobile data terminal 162 and associated interface 158 may be connected directly to serial bus 153 and/or to bus 153A (on the output of the coupler 166). Voice guard module 164 is preferably connected to bus 153A when dual control heads 154A, 154B and associated coupler 166 are used.

As illustrated, individual radio units (mobile or portable radio transceivers) of various groups communicate with one other (both within and possibly outside of their own groups) via shared radio repeater channels. A dispatch console 102 supervises the operation of repeater system 102. There may be multiple dispatch consoles 102 (one for each separate fleet of mobile/portable units) and a master or supervisory dispatch console for the entire system if desired.

CENTRAL SITE ARCHITECTURE

Figure 2:
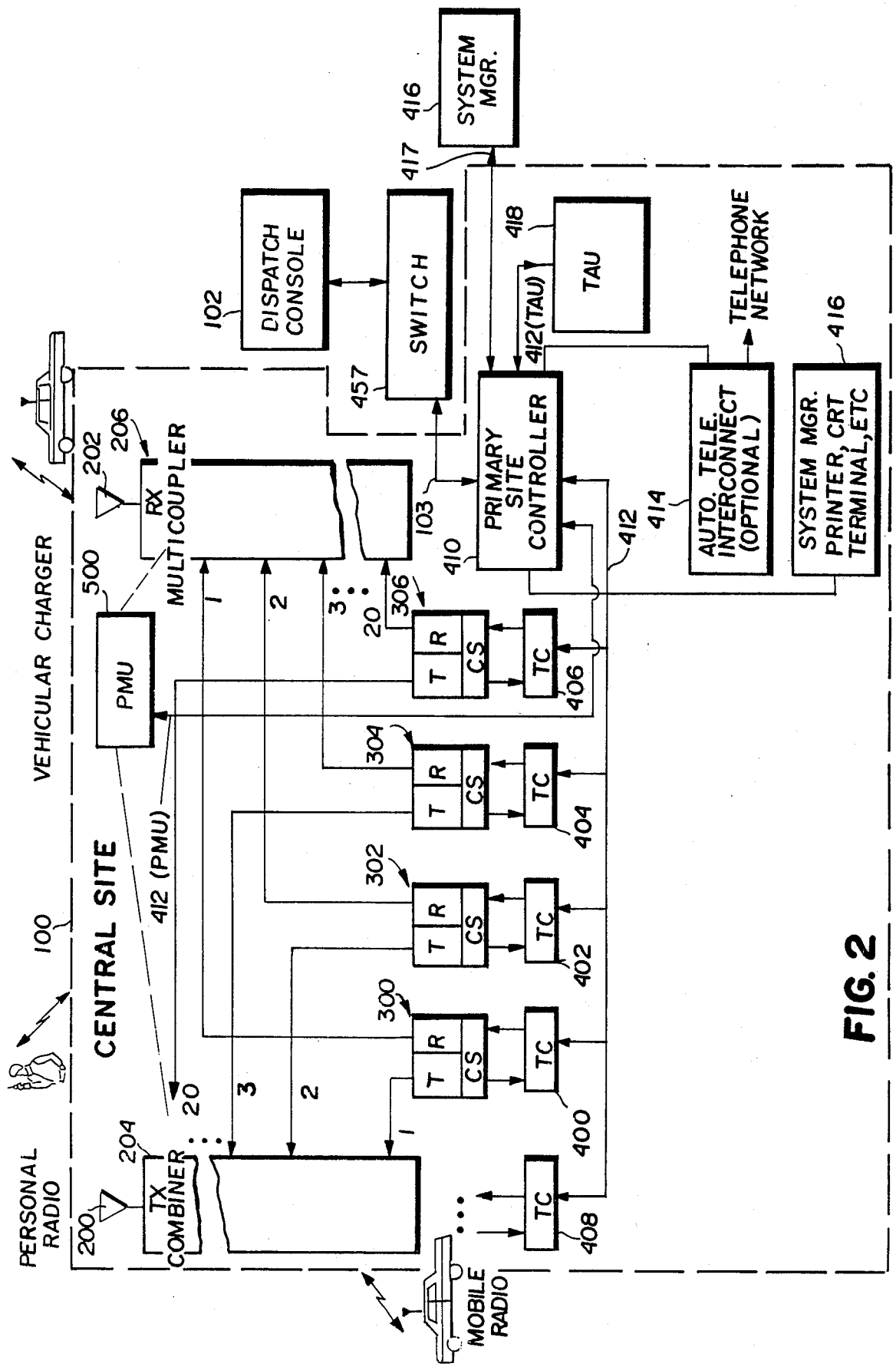

Referring now more particularly to FIG. 2, a transmitting antenna 200 and receiving antenna 202 (which may sometimes be a common antenna structure) may be utilized with conventional signal combining/decombining circuits 204, 206 as will be apparent to those in the art. The transmitting and receiving RF antenna circuitry 200-206 thus individually services a plurality of duplex RF channel transmit/receive circuits included in a plurality of RF repeater "stations" 300, 302, 304, 306, etc. Typically, there may be 24 such stations. Each station transmitter and receiver circuitry is typically controlled by a dedicated control shelf CS (e.g., a microprocessor-based control circuit). Such control shelf logic circuits associated with each station are, in turn, controlled by "trunking cards" TC (e.g., further microprocessor-based logic control circuits) 400, 402, 404 and 406. Another trunking card 408 may be dedicated for digital data communications if desired.

All of the trunking cards 400-408 communicate with one another and/or with a primary site controller 410 via control data links 412. The primary site controller (and optional backup controllers if desired) may be a commercially available general purpose processor (e.g., a PDP 11/73 processor with 18 MHz-J11 chip set). Although the major "intelligence" and control capability for the entire system resides within controller 410, alternate backup or "fail soft" control functions are incorporated within the trunking cards 400-408 so as to provide continued trunked repeater service even in the event that controller 410 malfunctions or is otherwise taken out of service.

An optional telephone interconnect 414 may also be provided to the public switched telephone network. A system manager 416 is also provided for overall system management and control (together with one or more dispatcher consoles 102).

A power monitoring unit (PMU) 500 allows site controller 410 to monitor the actual RF parameters associated with repeater system 100. For example, PMU 500 constantly monitors power output of each repeater channel, as well as insertion loss and VSWR (voltage standing wave ratio) of each repeater antenna. PMU 500 is connected to site controller 410 via a high speed data link 412 (PMU).

A test, alarm and control unit (TAU) 418 is provided for detecting and diagnosing error conditions. This test, alarm and control unit 418 operates independently of other site hardware in the preferred embodiment, but is connected to site controller 410 via data link 412(TAU). Unit 418 provides a variety of different functions, including:

monitoring states of a variety of user and system alarms and generating messages to the site controller 410 and the system manager 416 in response to such alarms;

permitting the site controller 410 and/or the system manager 416 to directly control various site functions (e.g., hardwire resets) via control relays;

monitoring the outbound control channel traffic and determining whether the control channel transceiver has malfunctioned;

testing a selected working channel transceiver using simulated working channel calls; and providing technicians and service personnel at the site with visual system status indications and control capabilities, as well as RF communications capabilities.

The error detection and control capabilities provided by test, alarm and control unit 418 and the power monitor unit 420 are used to implement commands issued by the site controller and/or the system manager and to provide the site controller and system manager with indications of system operation and faults. The indications, in turn, permit the site controller 410 and/or the system manager to take corrective action (e.g., by reconfiguring the system and/or initiating "fail soft" features) which eliminates faults or minimizes their impact.

A slightly more detailed view of the site architecture for control data communication is shown in FIG. 3. Here, the PDP 11/73 controller 410 is seen to communicate over 19.2 kilobyte buses 412 with up to 24 trunking control cards TC controlling spective duplex repeater circuits in those individual channels. Another high-speed 19.2 Kilobyte bus 420 is used in the down link to/from the dispatch console 102 (this downlink including a downlink trunking card). Other data communication with the central processor 410 is via additional links as shown in FIG. 3. The site controller 410 may include, for example, a 128 Kilobyte code PROM, 1 Megabyte of RAM and 32 DHV-11/J compatible RS-232C ports (connected to respective ones of busses 412). Controller 410 may typically be programmed using micropower Pascal to provide a multi-tasking, event-driven operating system to manage all of the various data communication ports on an acceptable real time basis.

At each controlled repeater channel, the 19.2 Kilobyte data bus 412 (as well as another similar bus connected to an optional backup site controller if desired) is monitored by an 8031 microprocessor in the TC module. The TC trunking control module may typically also receive hardwired inputs providing clock synchronization and a "fail soft" indication (e.g., indicating that normal control by the central controller 410 is not available and that an alternate distributed control algorithm should then be implemented within each of the trunking control modules TC). Control over the control shelf CS and its associated repeater is then achieved conventionally with dedicated audio and signaling audio and control buses. In the preferred embodiment, conventional dedicated audio signal paths (not shown) connect each control shelf CS with console 102, and a conventional audio path switch (also not shown) is capable of connecting audio signal paths of selected control shelves to other selected control shelves, the telephone interconnect block 414, the console 102, etc.

During the normal mode of operation of system 100, backup serial link BSL is not used or needed. The independent operations of the various trunking cards are coordinated by primary site controller 410, and signal processing operations performed by the various trunking cards are loosely synchronized by synchronization signals produced by one of the trunking cards assigned to the control channel, these synchronization signals being communicated to the rest of the trunking cards via frame sync control line 520.

Frame sync control line 520 is a single line that connects all of the trunking cards together in daisy-chain fashion. This control line 520 is used by whichever trunking card is assigned to the control channel to notify all other trunking cards of the beginning of each slot on the outbound control channel.

One of the trunking cards and associated repeater transmitter and receiver is assigned to operate on the predetermined full duplex control communications channel. This control channel is monitored by mobile units whenever they are not actually engaged in communications (such communications being performed on working channels assigned to the other trunking cards). Briefly, the control channel is "slotted" (i.e., time division multiplexed), and "outbound" control channel signals are continuously transmitted by the control channel transmitter. Mobile units monitoring the control channel synchronize with the frame synchronization signals transmitted continuously on the outbound control channel, reducing the time required by the mobile units to synchronously receive and transmit control channel signals.

In the preferred embodiment, the trunking card assigned to supervise control channel operations originates the control channel frame synchronization timing signals, and places those timing signals on frame sync control line 520 (as well as passing them to its associated control channel repeater transmitter for transmission on the outbound control channel). Although any trunking card is capable of driving frame sync control line 520 (since any channel can be called upon to execute the control channel function), only the trunking card currently assigned to the control channel actually drives this line. The beginning of each control channel slot is marked by a positive going pulse on the frame sync control line 520.

Each of the other trunking cards of system 100 continuously monitors the frame sync control line 520, and the microprocessors of these other trunking cards synchronize signal processing functions with the pulses on the sync control line (and thus with the timing of the control channel). When a mobile unit receives a command transmitted on the outgoing control channel to change frequency to a working channel, the mobile unit is already synchronized with the control channel timing. Since all working channels are synchronized with the control channel by frame sync control line 520—and the mobile unit remains synchronized with the control channel timing until it begins receiving working channel signals (which are loosely synchronized with the control channel signals), communications between the mobile unit and the working channel transmitter and receiver is very rapidly established and no lengthy process of resynchronizing the mobile unit with independent working channel timing is necessary.

HIGH-LEVEL DESCRIPTION OF POWER MONITOR, TEST, AND ALARM AND CONTROL UNITS

Test, alarm and control unit 418 in the preferred embodiment includes an alarm and control unit (ACU) 600, and a test unit (TU) 700. The Power Monitor Unit (PMU) 500, the Alarm and Control Unit 600 and the Test Unit 700 each perform specific roles in monitoring site conditions and reporting them to the site controller 410.

The PMU 500 measures output RF power on up to 20 different channels (transmitters), and insertion loss and standing wave radio (SWR) on 2 antennas. The PMU 500 front panel allows programming of power level thresholds and VSWR. When the output power of a transmitter is below its corresponding power threshold, or if insertion loss or SWR of an antenna is exceeded, then the PMU 500 sends an alarm to the site controller 410.

In addition, the power monitor unit 500 in the preferred embodiment provides four internal 2-amp general purpose control relays for controlling various different functions. Finally, PMU 500 may also include a modem port through which the system manager can access the PMU independently of the site controller 410. If desired, the system manager may read status information, control relay states (for performing various resets on the system) and perform other command diagnostic functions via this modem port and system manager 416.

The test, control and alarm unit 418 performs three important functions:

1. Remotely controlled channel monitoring and testing of the PST repeater stations at the site.
2. Remote reporting of the inputs from user supplied alarm sensors.
3. Remote control of relays used to operate user supplied devices.

The TAU 418 is directed by the site controller 410 (an site controller 410 computer in the preferred embodiment). Like the site controller 410, the TAU 418 is located at the site.

ALARM AND CONTROL UNIT

The TAU alarm and control unit 600 (ACU) provides 32 alarm inputs, 8 relay outputs, and site status displays in the preferred embodiment. The alarm and control unit 600 monitors and debounces 32 alarm inputs and reports any changes in alarm status to the site controller 410. Alarm and control unit 600 also, on command from the site controller 410, sets or resets any combination of its 8 relays. Finally, each alarm input is displayed on the alarm and control front panel and each relay state, along with the perception of the alarm and control unit 600 alarm status and the site controller 410 perception of system status.

The communications path between the site controller 410 and the alarm and control unit 600 is an RS-232C link 412 (AC). The site controller 410 subsequently reports some or all of the information carried over this link 412 (AC) to the system manager 416.

The alarm and control unit 600 also provides remote controlled relays which can operate user supplied equipment connected to the alarm and control unit at the site. The operation of the relays is directed by the site controller 410. Activation of the relays may be a function of the alarm inputs, or handled by manual commands executed at the system manager 416.

TEST UNIT

The test unit 700 provides remotely controlled channel monitoring and testing of the repeater stations at the site. The test unit 700 includes a standard 16 PLUS mobile transceiver (of the type used in the field to communicate with repeater stations 300), with special software to perform the test and monitor functions. The test unit 700 is controlled by the site controller 410 over an RS-232C link. A 16 PLUS control head permits the test unit 700 to be operated as a regular PST mobile radio, so that an operator or technician at the site may have RF communications.

The test unit 700 normally continuously monitors the control channel. Should a failure occur, test unit 700 reports the failure to the site controller 410. In a second mode of operation, called the user call mode, which allows a service technician to use test unit 700 as a stand alone mobile unit for contacting other radios in any of the groups the test unit is preprogrammed to communicate with.

DETAILED DESCRIPTION OF POWER MONITOR UNIT 500

As is shown in FIG. 4, power monitor unit 500 is connected to site controller 410 via a high speed data link 412 (PMU), and may also in some applications be connected directly to system manager 416 via a modem on landline link (shown in phantom). System manager 416 is connected to site controller 410 via a data link 417.

Power monitor unit includes power sender unit 502a-502n (one for each RF channel of system (100) connected between the RF repeater transceiver outputs and inputs to RF transmit antenna combiner network 204. These power sensors 502 allow power monitor unit 500 to include the power output of each RF transceiver individually. In addition, power sensors 504 connected between the outputs of combiner network 204 and the site antennas 200 permit power monitor unit 500 to measure standing wave radio (VSWR) and insertion loss.

In the preferred embodiment, power monitor unit 500 includes an off-the-shelf Decibel Products "DB SENTRY 8000" power monitor unit (see descriptions of this conventional commercially available instrument in, for example, "Operations Guide For The Decibel Antenna Sentry System" published July 1986 by Decibel Products, Inc. of Dallas, Texas, the entire disclosure of which is incorporated herein by reference). This unit typically operates as a stand-alone antenna monitoring unit. In the preferred embodiment, however, the unit has been modified to communicate with site controller 410 via link 412 (PMU) (this link is connected into the units parallel port typically used in other applications to drive a printer) and has been modified to measure power output of up to 20 RF channels simultaneously.

The Power Monitor Unit (PMU) 500 has 22 inputs in the preferred embodiment which it can monitor to make sure up to 20 different power levels for 20 transmitters remain above a specified threshold, and that insertion loss and SWR are not exceeded for 2 antennas. The site controller 410 sends on-channel messages to the PMU 500. From these messages, the PMU 500 can decide when a channel is or is not "on the air", and power monitoring of each input is restricted to those transmitters which are actually transmitting (or are supposed to be transmitting) in the preferred embodiment. Should a transmitter power output not exceed its corresponding power threshold, an alarm is "declared" and the PMU 500 sends a status message to the site controller 410. If insertion loss or SWR thresholds are exceeded for an antenna, the PMU 500 also declares an alarm and sends a status message to the site controller 410. The system manager may contact the PMU 500 via the modem port to determine if the alarm is caused by insertion loss or SWR.

Independent power threshold levels may be preprogrammed for each of the 20 monitored channels. The power threshold for each input is programmed into the PMU 500 via its front panel keypad or by site controller 410 commands. Insertion loss and VSWR values are programmed into the PMU 500 via its front panel keypad, or via site controller messages. As mentioned previously, the PMU 500 only monitors output power on a transmitter input when it has determined that the corresponding channel is transmitting in the preferred embodiment. The site controller 410 notifies the PMU 500 that a channel is transmitting or is about to stop transmitting by sending an ON-CHANNEL message to the PMU. Power detection on an input can begin 250–500 msec following receipt of the corresponding channel assignment message, and stops immediately upon receiving a corresponding DROP CHANNEL message.

If a transmitter input fails to produce analysis which exceeds the minimum power threshold, or if an antenna input exceeds insertion loss or SWR thresholds, an alarm is declared for that input and the site controller 410 is notified via a status message automatically sent to it by the PMU. Anytime the state of an alarm changes, the PMU 500 sends a status message reflecting the current state of all alarms to the site controller 410. Alarm reporting only occurs after the PMU 500 completes a 250 msec scan multiplexing cycle in the preferred embodiment. This allows new alarms occurring since the last scan cycle to be reported to the site controller 410 all at once, rather than by sending separate reports for each alarm as it occurs.

As a background process, the site controller 410 periodically polls PMU 500. When the PMU 500 is polled, it responds with a status message indicating the current state of its alarms.

Four internal relays and a modem port are included in the PMU 500 for forcing site controller resets. The system manager has a menu-selectable commands for resetting site hardware. The system manager may control the PMU 500 relays via messages transmitted through site controller 410.

The following parameters may be programmed manually using the controls on the power monitor unit 500 front panel:
(1) Alarm thresholds
(2) Maximum VSWR The message formats and protocols used to communicate between site controller 410 and the trunking cards 400 are also used to communicate with PMU 500. The electrical interface 412 (PMU) between the site controller 410 and PMU 500 is a conventional RS-232C serial bus, 2400 baud, 8 bits, no parity, 1 stop bit. Each message consists of:
(1) Frame byte (AA)
(2) Start byte (Identifies message type and length)
(3) Data
(4) Parity byte (Inverted exclusive-OR of items 2-3)

The following lists format of some of the messages which can be sent from PMU 500 to site controller 410 in the preferred embodiment.

STATUS MESSAGE—(AA) (B1) (d1) (d2) (d3) (d4) (P)

Provide alarm status information to the site controller 410. This message is sent whenever there is an alarm status change, or when the PMU 500 is polled.

FORMAT $(d1) =$ A7 A6 .............. A1.0

$(d2) =$ A15 A14 .............. A8

$(d3) =$ A22 A21 ............ A16 where: A3 = Alarm 3
1 = Alarm state present
0 = No alarm

Note: Bit 0# of field (d1) must be 0
The channels (transmitters) are numbered 1-20. The antennas are numbered 21 and 22.

CHANNEL POWER—(AA) (B4) (d1) (d2) (P)

Send the latest power reading for a particular specified input.

The power output is represented by a 16-bit binary number, sent least significant byte (d1) first. The value sent is 10 times the power level, and can range from 0-9999.

FORMAT $(d1) =$ L7 .............. L0

$(d2) =$ L15 .............. L8

Where: L15-L0 = 16-bit power level in binary.

The following describes the repertoire and format of messages which can be sent from the site controller 410 to the PMU 500 in the preferred embodiment.

CLEAR ALARMS—(AA) (B0) (P)

Instruct the PMU 500 to clear all 22 alarms.

ENABLE MASK—(AA) (B2) (d1) (d2) (d3) (P)

Tell the PMU 500 which inputs are enabled. The PMU 500 only monitors and reports changes in alarms that are enabled. All disabled inputs are "clamped" as inactive and thus ignored.

(d1) = I7 I6 .............. I1. 0

(d2) = I15 I14 ............. I9

(d3) = I22 I21 ............ I16

Where: I# = Input #
1 = Input enabled
0 = Input disabled

Note: Bit #0 of (d1) must be A
The channels (transmitters) are numbered 1–20. The antennas are numbered 21 and 22.

POLL—(AA) (B1) (P)

Request PMU 500 status.

ON-CHANNEL—(AA) (B6) (d1) (d2) (d3) (P)

Notify the PMU 500 which channels are active or inactive. The PMU 500 is to start monitoring the power on each specified active transmitter within 250–500 msec, and to stop monitoring the inactive transmitters.

(d1) = I7 I6 .............. I1. 0

(d2) = I15 I14 ............. I9

(d3) = I20 I19 ........ I16

Where: I# = Input #
1 = Input active
0 = Input inactive

Note: Bit #0 of (d1) must be 0
The channels (transmitters) are numbered 1–20.

PROGRAM THRESHOLD - (AA) (B3) (d1) (d2) (d3) (P)
Set the alarm threshold (power level) for a specific input.

(d1) = C4 ...... C0

(d2) = L7 ...... L0

(d3) = L15 ...... L8

Where: C4–C0 specified transmitter channel number in binary (1–20)
L15–L0 = 16-bit power level in binary POWER REQUEST - (AA) (B4) (d1) (P)
Request the power reading for a specific input.

(d1) = C4 ...... C0

Where: C4–C0 = specified transmitter channel number in binary, (1–20)

Referring now to FIG. 5, test and alarm unit 418 includes an alarm and control unit 600, a test unit 700, a serial interface board 800, a power regulator 850 and a rear bulkhead panel 860. Bulkhead panel 860 includes connectors for an external power supply, two high speed data links from primary site controller 410, and two high speed data links from a backup site controller (if one is used).

Alarm and control unit 600 in the preferred embodiment includes a display assembly 602, an alarm/control interface board 604, and a logic board 606. Test unit 700 includes a 16 PLUS control head 702 and a standard 16 PLUS mobile transceiver 704.

STRUCTURE OF TEST, ALARM AND CONTROL UNIT

Most of the modules are enclosed in a single Rack Enclosure housing in the preferred embodiment (bulkhead panel 860 is a part of this enclosure). The main part of the test unit 700 mounts in a 19 inch rack, occupying six rack units (10.5) inches of space. Mounted on the front panel of the TAU 418 is a display assembly consisting of a polycarbonate display panel, a metal panel frame, the ACU display assembly 602, and associated hardware. When the front panel is swung down, access is gained to the 16 PLUS control head 702, which is mounted on a special bracket on the rear side of the front panel.

A second assembly is lowered to provide access to the serial interface board 800 and the logic board 606, both of which are mounted on the assembly. Access is also provided to the power regulator 852 which is mounted in a shielded enclosure on the inside of the rear housing of the TAU 418. The alarm/control interface board 604, and the rear bulkhead panel 860 are all accessible from the rear of TAU 418.

The 16 PLUS mobile 704 is mounted separately from the main housing in the preferred embodiment on a special shelf in the rack.

The alarm/control interface board 604, which is part of the alarm and control unit 600, provides the interface between the alarm and control unit logic board 606 and various user supplied alarm and control devices. The operation of the alarm/control interface 604 is divided into two sections: alarm input processing and control output processing. In the preferred embodiment, the alarm/control interface board is the same as used in the GE Cellular Test Unit (GE part No. 19D901331); (see, *GE Mobile Radio Maintenance Manual*, "Cellular Test & Alarm Unit", Maintenance Manual LBI-31510C, General Electric Company, July 1985).

The alarm/control interface board 604 includes thirty-two optically isolated alarm input circuits in the preferred embodiment. Each independent and identical circuit may be configured by means of a jumper to accept a relay-contact closure, a low voltage (5–16 VDC) drive or a high voltage (15–48 VDC) drive. Connections to the input circuits are made via 50-pin connectors on the alarm/control interface board at the rear of the test unit 700. The connectors accept standard 25 pair, connectorized telephone cables in the preferred embodiment. However, in order to insure adequate system noise immunity and voltage surge protection, the connections must maintain the electrical isolation of the test unit 700. FIGS. 6A–6B show four typical alarm input connections.

When the LED of an alarm input opto-isolator circuit is conducting (active), the output pin of the opto-coupler produces a logic "0". The alarm and control unit 600 may be programmed to interpret either the "on" (logic "0" or "off" (logic 1) state as indicating an alarm (as will be explained). A microprocessor on the logic board 606 periodically samples the 32 alarm inputs.

The alarm/control interface board 604 contains 8 output circuits to control the operation of externally connected user equipment. Each output circuit includes a double-pole-double-throw (DPDT) latching relay with set/reset coils. One set of contacts (SPDT) of each relay is made available to the user. The other set of contacts is used to report the relay condition to the logic board 606. The logic board microprocessor can set or reset each output relay independently.

Figure 7:
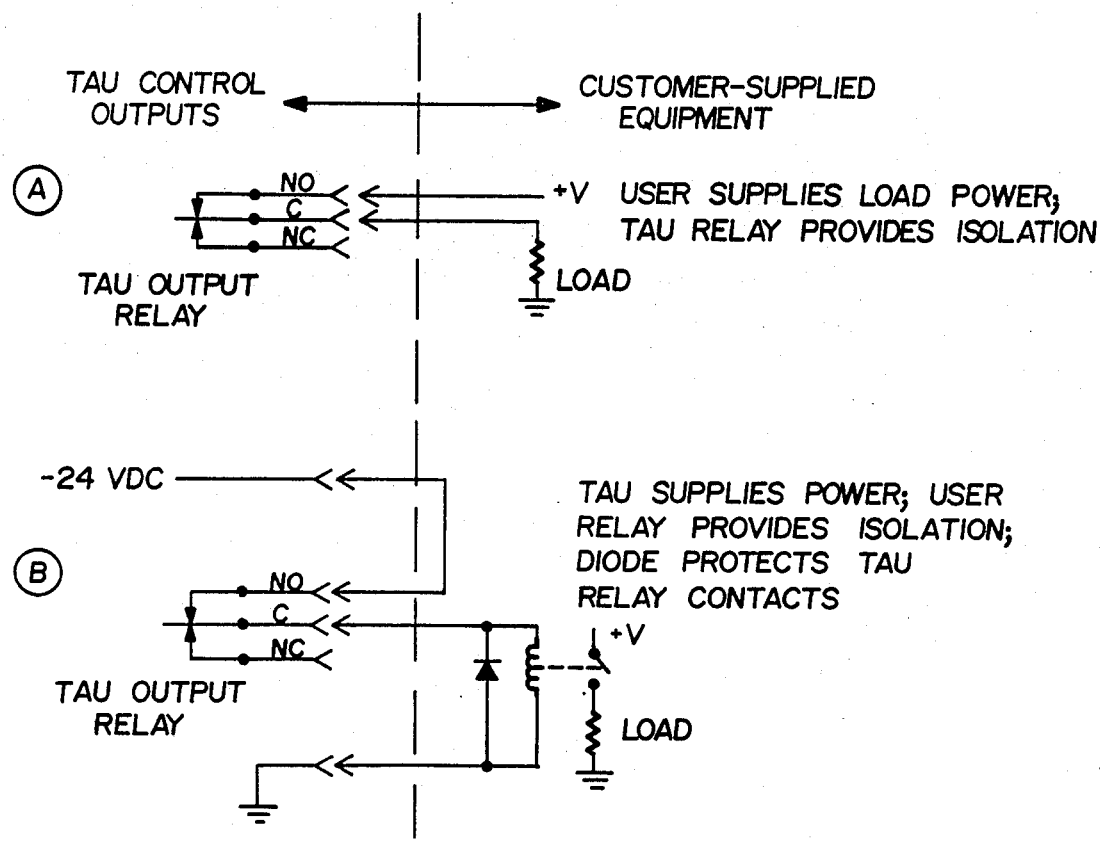
FIG. 7 is a detailed schematic diagram of exemplary control output connections for the test, alarm and control unit shown in FIG. 5.

Connections to the control outputs are made via a 50-pin connector on the alarm/control interface board 604. Isolation must be maintained between the alarm and control unit 600 and user-provided devices. The alarm and control unit 600 internal power may be used to drive the load, provided that the load input circuit maintains isolation. The relay contacts are capable of switching resistive loads of up to one ampere. A typical control output connection to user equipment is shown in FIG. 7.

The display assembly 602 provides an LED indication of alarm inputs, control outputs, and the status of system log and test, alarm and control unit 600. The LEDs are located on the display assembly 602, which is mounted directly behind the display panel. A small window in the display panel exists in front of each LED to enable the indicator display to be received from the front of the TAU 418.

Fifty-six LEDs on the front of the TAU 418 are for the following functions:
32 Alarm/status indicators
8 Control output indicators
8 Site system indicators
8 Possible alarm and control unit 600 status indicators Display assembly 602 interprets commands from the logic board 606 and turns on/off appropriate LEDs in response.

The logic board 606 directs and coordinates the operation of the alarm and control unit 600. The logic board includes a microprocessor which accepts instructions from the site controller 410 and interfaces with other alarm and control unit 600 circuitry for command execution. The logic board is similar to that used by the GE cellular test and alarm unit (GE part No. 19D901330) in the preferred embodiment (although the microprocessor software is specific to this PST application).

During normal operation, the microprocessor on the logic board 606 accepts commands sent via the serial link 412 from the site controller 410, and issues appropriate instructions to other alarm and control unit 600 circuitry to implement them.

The interface between logic board 606 and the alarm/control interface board 604 allows for sampling of alarm/status information and remote control of user equipment. The logic board 606 samples the 32 alarm/status inputs and reports any alarm input changes. The logic board 606 also directs the alarm/control interface board 604 to set or reset any of the 8 control outputs.

The interface between logic board 606 and display assembly 602 allows the logic board to direct the display of the alarm/status inputs, control outputs and system status via the LED indicators on the display board.

SERIAL INTERFACE BOARD

The serial interface board ("S-I board") 800 is used by both the alarm and control unit 600 and test unit 700 in the preferred embodiment to establish connection between these units and site controller 410.

The S-I board 800 receives four independent serial communications links 412 from the rear bulkhead panel 860. Two links are from the master site controller 410 and the other two links are from the backup site controller (not shown). On the S-I board 800, one set of master and backup serial links is multiplexed to the serial data lines of the 16 PLUS test unit 700, while the other set of master and backup serial links is multiplexed to the serial data lines of the ACU logic board 606. The site controller 410 is thus able to communicate with test unit 700 and alarm and control unit 600 over independent serial links 412. The S-I board also provides the level translation from the RS-232C levels used by the site controller 410 to the open collector or TTL levels used by the alarm and control unit 600 and the test unit 700.

Figure 8:
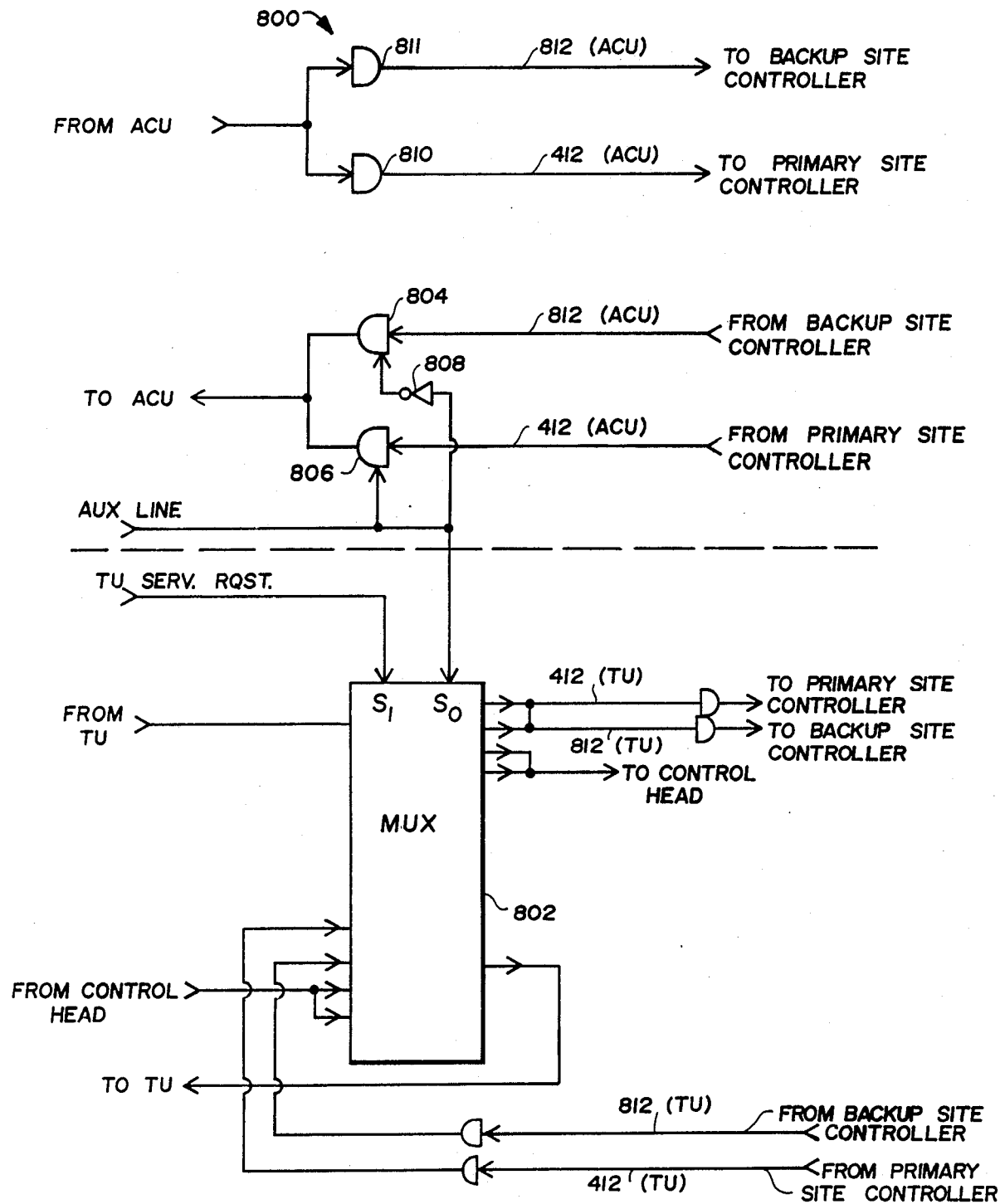
FIG. 8 is a detailed schematic diagram of the test, alarm and control unit serial interface board shown in FIG. 5.

FIG. 8 is a schematic diagram of serial interface board 800. Serial interface 800 includes a multiplexer 802, line receivers 804 and 806, line drivers 810 and 812, and an inverter 808.

The line of a link 412 (ACU) coming into the serial interface 800 from primary site controller 410 is connected to the input of receiver 806, and the line of a similar link 812 (ACU) coming into the serial interface 800 from a backup site controller and connected to the input of receiver 804. The output of receiver 804, 806 are connected together to the ACU logic board 606. Receivers 804, 806 are alternately enabled in response to the level of a signal appearing on an AUX line produced by test unit 700 to select one of the backup and the primary site controller to provide incoming commands to ACU 600.

The outgoing serial data line from ACU logic board 606 is connected to a pair of drivers/gates 810, 811. Driver 810 drives the outgoing line of link 412 (ACU) to the backup site controller. The ACU 600 thus transmits messages to both primary site controller 410 and the backup site controller in the preferred embodiment in order to update the backup site controller with current status information and prepare it to be instantly switched into system 100 to replace the primary site controller.

Multiplexer 802 alternately connects test unit 700 to the primary site controller 410, the backup site controller, and control head 702 in response to the AUX signal and another signal called TU SER RQST (both produced by mobile 704). In the preferred embodiment, the state of TU SER RQST selects between control head 702 and the site controller 410, on the state of the AUX line selects between the primary and the backup site controller. In particular, whenever TU SER RQST has a first level, the messages produced by mobile unit 704 are connected to the control head 702, and messages from the control head are routed to the mobile (this mode is used in the "user call" state to allow technicians to use mobile unit 704 for standard RF communications). When TU SER RQST is at a second (normal) level, the messages produced by test unit 704 are sent to both primary site controller 410 and the backup site controller, and the messages transmitted by one of the primary and backup site controllers (carried by links 412 (TU) and 812 (TU) respectively) are routed to the input of test unit 704 (the one site controller being selected by the state of the AUX line).

Thus, switching between the master site controller 410 and the backup site controller 410 serial link is controlled by a test unit 700 AUX line. Switching between the serial link to the control head and the site controller 410 serial link for the test unit 700 only is controlled by the test unit 700 SER RQST line.

When an operator or technician at the site requires RF communications, the position of a slide switch mounted on the S-I board 800 is changed—changing the state of an IGN SENSE line of the mobile radio 704. The mobile unit 704 then changes the state of the SER RQST line, which sets a relay on the S-I board 800 to supply power to the control head 702, and also connects the mobile unit 704 serial data link to the control head serial path. The mobile unit 704 can then be used as a regular PST mobile. The audio output signal from the transceiver is routed to the small speaker mounted on the S-I board 800 in the preferred embodiment.

While the test unit 700 is operating as a mobile radio transceiver, it does not communicate with either primary or backup site controller 410. The alarm and control unit 600 however, maintains its serial link with the primary or backup site controller 410. When the test unit 700 SER RQST line changes state again, the serial link between the test unit 700 and the site controller 410 is re-established and the relay resets—removing power from the control head 702.

During normal test unit 700 operation, a microprocessor board in the mobile transceiver 704 accepts commands from the site controller 410 via the serial link 412(TU), directs the mobile to perform the required tasks, and sends an acknowledgement or other data back to the site controller 410. For example, the test unit 700 may monitor the control channel, or test a working channel by simulating a call sequence. As mentioned, the test unit 700 is also responsible for directing the S-I board 800 to switch between the master and backup site controller 410 serial links for both the alarm and control unit 600 and test unit 700 functions.

ALARM AND CONTROL UNIT 600

The alarm and control unit 600 continually samples and debounces its 32 alarm inputs and reports any changes to site controller 410. In addition, the alarm and control unit 600 sets or resets any combinations of its 8 relays on command from the site controller 410.

In the preferred embodiment, the site controller 410 can define the following parameters on each alarm provided by alarm and control unit 600:
Enable/Disable
Active Hi/Low
Major/Minor alarm The alarm and control unit 600 also displays the status of the 32 alarm inputs, the 8 relay states, system status information, and alarm and control unit status on the front display panel of the TAU housing. The front panel, as illustrated below, includes 58 LEDs (light emitting diodes) partitioned into 4 areas. The area encompassing the left half of the front panel includes 32 LEDs which display the state of the 32 alarm inputs. The area located on the top left side of the right half of the front panel includes 8 LEDs that display the states of the 8 relays. The area located in the upper right corner is the system status region, which includes 8 LEDs, displaying general site status information. The area located in the bottom right corner is the alarm and control unit 600 status region and includes 8 LEDs indicating a particular state or condition internal to the alarm and control unit 600.

| Alarm 1 | Alarm 17 | Relay 1 | Main Cntl Active |
| Alarm 2 | Alarm 18 | Relay 2 | Backup Cntl Active |
| Alarm 3 | Alarm 19 | Relay 3 | Ant Pwr Fail |
| Alarm 4 | Alarm 20 | Relay 4 | Chn Pwr Fail |
| Alarm 5 | Alarm 21 | Relay 5 | GETC Fail |
| Alarm 6 | Alarm 22 | Relay 6 | Channel Settings |
| Alarm 7 | Alarm 23 | Relay 7 | Interconnect Fail |
| Alarm 8 | Alarm 24 | Relay 8 | Backup Ser Link Fail |
| Alarm 9 | Alarm 25 | | |
| Alarm 10 | Alarm 26 | | |
| Alarm 11 | Alarm 27 | ACU STATUS | |
| Alarm 12 | Alarm 28 | | |
| Alarm 13 | Alarm 29 | Major Alarm | Ready |
| Alarm 14 | Alarm 30 | Minor Alarm | Polled |
| Alarm 15 | Alarm 31 | ACU Error | |
| Alarm 18 | Alarm 32 | Relay Error | Not Ready |

The alarm and control unit 600 monitors and debounces its 32 alarm inputs. Any change in the state of the alarms is reported immediately to the site controller 410 via a status message. In addition, a status message is sent any time the alarm and control unit 600 is polled by the site controller 410.

Debouncing of alarm inputs must meet the following two specifications in the preferred embodiment:
(1) Debounce time: 50 msec–200 msec
(2) The rate of change on any one input which is reported to the site controller is restricted to 1 transition every 10 seconds.

There are three alarm masks provided to the ACU 418 by the site controller 410. These are:
(1) Enable/Disable—32 bit bitmap with a '1' in any position representing an alarm which the alarm and control unit 600 should monitor. Only changes in state of an enabled alarm are reported to the site controller 410.
(2) Active Hi/Low—32 bit bitmap with a '1' in any position representing an alarm whose input should be considered active when high, and a '0' in any position representing an alarm whose input should be considered active when low.
(3) Major/Minor—32 bit bitmap with a '1' in any position representing a major (as opposed to a "minor") alarm input. The alarm and control unit 600 uses this information for display purposes only.

All disabled alarms are set to inactive and held there until the alarm is enabled by the site controller 410. Any change of state in a disabled alarm is not reported by the alarm and control unit 600. Also, any active high/low or major/minor designation for a disabled alarm is ignored by the alarm and control unit 600.

The alarm and control unit 600 sets or resets relays when given the "Set Relays" message by the site controller 410. The alarm and control unit 600 also continually monitors the relay settings. The current state of the relays is provided in each status messages sent by the alarm and control unit 600 to the site controller 410. The site controller 410 can then confirm that the relays are in their proper states. The alarm and control unit 600 also compares the current state of the relays to their desired positions. If the current states are incorrect, an error designation is displayed on the front panel of the alarm and control unit 600 and indicated in the status byte sent to the site controller 410.

The 8 System LEDs on the alarm and control unit front panel display system information provided by the site controller 410, and are updated continuously (i.e., by site controller poll messages). The system information displayed in the preferred embodiment includes:

(1) Main Cntl Active: LED is lit when the main site controller 410 controls site activity.
(2) Backup Cntl Active: LED is lit when the backup site controller controls site activity.
(3) Ant Pwr Fail: LED is lit when there is an antenna power failure.
(4) Chn Pwr Fail: LED is lit when there is a channel power failure.
(5) GETC Fail: LED is lit when there is a trunking card 400 logic failure
(6) Channel Settings: LED is lit when the trunking card switch settings are incorrect.
(7) Interconnect Fail: LED is lit when there is a failure in the interconnect system.
(8) Backup Serial link Fail: LED is lit when there is a failure on the backup serial link or the frame sync link.

System status information is provided to the alarm and control unit 600 in every message from the site controller 410 in the system status byte. If the alarm and control unit 600 has not received a poll message after a specified time interval, the alarm and control unit 600 turns off both the main and backup controller active LEDs.

The 8 alarm and control unit 600 status LEDs on the front panel display the internal status of the alarm and control unit 600 and are updated continuously. The alarm and control unit 600 status information displayed is:

(1) Major Alarm: LED is lit when an active alarm has been defined as being a major alarm.
(2) Minor Alarm: LED is lit when an active alarm has been defined as being a minor alarm.
(3) ACU Error: LED is lit when the alarm and control unit 600 detects an internal logic error.
(4) Relay Error: LED is lit when the alarm and control unit 600 determines that the current relay settings do not match the designated settings.
(5) Polled: LED is flashed whenever the alarm and control unit 600 receives a Poll message from the site controller 410.
(6) Not Ready: LED is lit after the alarm and control unit 600 powers up or is reset, and remains lit until the alarm and control unit 600 receives the initial alarm masks and relay settings from the site controller 410.
(7) Ready: LED is lit after the alarm and control unit 600 receives the initial alarm masks and relay settings from the site controller 410.
(8) Not Used This alarm and control unit 600 status information is also given to the site controller 410 in the status byte of the status message.

ACU MESSAGES

The following lists the repertoire and format of messages transmitted from alarm and control unit 600 to site controller 410 in the preferred embodiments:

STATUS MESSAGE — (AA) (81) (d1) ... (d6) (P)

$$(d4)-(d1) = \frac{A31 \ A30 \ldots\ldots\ldots\ldots A\emptyset}{\text{— — —}}$$

$$(d5) = \frac{R7 \ R6 \ldots\ldots\ldots\ldots R0}{\text{— — —}}$$

$$(d6) = \frac{S7 \ S6 \ldots\ldots\ldots\ldots S\emptyset}{\text{— — —}}$$

Where: A# = Alarm
 0 = no alarm
 1 = alarm

R# = relay
 0 = open
 1 = closed

S# = ACU status
 0 = inactive
 1 = active

The ACU status byte is defined as follows:
S0 = Major Alarm
S1 = Minor Alarm
S2 = ACU Error
S3 = Relay Error
S4 = Ready
S5 = Polled
S6 = not used
S7 = Not Ready The following describes messages transmitted in the preferred embodiment from site controller 410 to alarm and control unit 600:

RESET—(AA) (8∅) (d1) (P)

Reset the alarm and control unit 600. All alarms are disabled and the relays are left in their existing positions. All front panel LEDs are lit during the power-up sequence after a reset.

$$(d1) = \frac{S7 \ S6 \ldots\ldots\ldots\ldots S\emptyset}{\text{— — —}}$$

Where: S# = System Status
 0 = inactive,
 1 = active

The system status byte is defined as follows:
S0 = Main Controller Active
S1 = Backup Controller Active
S2 = Antenna Power Fail
S3 = Channel Power Fail
S4 = GETC Fail
S5 = Channel Settings
S6 = Interconnect Fail
S7 = Backup Serial Link Fail

POLL—(AA) (81) (d1) (P)

Request status from the alarm and control unit 600.
(d1) = System status byte

ALARM MASK—(AA) (82) (d1) (d2)..(d5) (d6)..(d9) (d10)..(d13) (P)

Specify the three alarm masks.
 (d1) = System status byte $$(d5) \ldots (d2) = \frac{N31 \ N3A \ldots N\emptyset}{\text{— — —}}$$
Enable/disable mask
 H31 H30 ... H∅

-continued
(d9) ... (d6) = — — —
Active hi/low mask
    M31 M30 ... M∅
(d13) ... (d10) = — — —
Major/minor mask
    Where: For N31-N∅,  1 = enable,
                         0 = disabled H31-H∅,  1 = active high
                    0 = active low M31-M∅,  1 = major alarm
                    0 = minor alarm

SET RELAYS—(AA) (85) (d1) (d2) (P)

Set the relays to the specified position.

(d1) = system status byte
       R7 ... R∅
(d2) = —    —
Where: R# = Relay number
            1 = closed
            0 = open

ACU SELF-TEST—(AA) (86) (P)

The alarm and control unit 600 enters a self-test mode in response to this message. This command is generally given to the alarm and control unit 600 via a local (suit case) terminal connected to the alarm and control unit 600 site controller 410 port. In the self-test mode, the alarm and control unit 600 turns on/off all front panel LEDs, sets and resets all relays, and turns on an alarm LED when the corresponding opto-coupler is conducting. The alarm and control unit 600 exits this mode only when it receives the Reset command.

Minor alarms are detected by the alarm and control unit 600 which have been designed as "minor" in an "alarm mask" message and reported to the site controller 410. Major alarms are all alarms labelled as "major" in the major/minor "alarms masks", and any hardware failure alarms detected by the site controller 410.

Any change in alarm status is time stamped and recorded in algorithm activity queue, and are also maintained in a site controller 410 alarm state table. Whenever the system manager calls the site, the alarm messages are downloaded into the activity data for permanent storage, just as are all other activity messages in the activity queue. In addition, the system manager always requests the current alarm state table. Should alarms be set, the system manager software automatically displays the table.

Whenever a major alarm occurs, the site controller 410 immediately initiates a call to the system manager. In this case, the alarm state table is immediately downloaded. Should an alarm occur while site activity is being downloaded, the download process is suspended and the alarm state table is downloaded immediately.

The alarm masks for the alarm and control unit 600 must be uploaded from the system manager to the site controller 410 at power-up and any time they are altered.

Any time the system manager has connected to the site controller 410 (regardless of whether the site controller or the system manager initiated the call), the system manager requests the alarm state table from the site. If there are no alarms, other communications can continue. If there are alarms, the alarm state table is downloaded immediately and the operator is notified. If activity is being downloaded or database information is being uploaded, these other processes are suspended by the site controller 410 so the alarm table can be downloaded.

The system manager 416 displays the site alarm state table. This display terminal prompts the user to define 16-character alphanumeric character strings for each alarm and control unit 600 alarm input, as well as for which alarms are enabled, whether they are active hi or low, and whether they are a major or minor alarm. In addition, the system manager stores an alarm datafile containing the alphanumeric character strings associated with each non-user-specifiable error detectable by the system.

An error classification convention categorizes errors and defines appropriate data representations so that once errors are detected, the system software can easily work with the data - passing it through the site controller 410 to the system manager. Error messages formats are defined to provide a minimal number of messages with fields assigned so error parsing can be done easily at the system manager.

FIG. 9 is a state diagram describing the operation of alarm and control unit 600. ACU 600 operates in one of four states in the preferred embodiment: the power-up state 902, the wait state 904, the ACU monitoring state 906, and the ACU self-test state 908.

When power is first applied to ACU 600, it operates in the power-up state 902. In this power-up state 902, ACU 600 performs a variety of initialization tasks, such as obtaining the current states of the control relays and alarm inputs from the alarm/control interface board. Upon entering power-up state 902, ACU 600 sets a bit called NOT READY to indicate that it is yet to be initialized with alarm mask and relay masks. After ACU 600 performs initialization tasks in the power-up state 902, it sends a status message to site controller 410 and then enters wait state 904.

Power-up state 902 is entered not only upon initial application of power to ACU 600, but also whenever the ACU is reset using a manually keyed in or site controller 410 originated reset command.

In wait state 904, ACU 600 waits for alarm masks and set relay messages from site controller 410. When these messages are received, ACU 600 initializes appropriate internal data, sets control relay states in accordance with the site controller set relay message, and then clears the NOT READY bit and sets the READY bit to indicate the ACU is ready to perform monitoring and control functions. After these tasks are successfully performed, ACU 600 leaves wait state 904 and enters the monitoring state 906.

In monitoring state 906, ACU monitors its serial port for messages from site controller 410, monitors the state of its control relays, and monitors its alarm input. If an alarm input becomes active, ACU 600 reports the active alarm to site controller 410 (so long as the site controller has previously requested the ACU to monitor its alarm input via an alarm masks message). If the state of a relay somehow becomes different from its desired state, ACU 600 notifies site controller 410 of the difference and tends to set or reset the relay appropriately. When ACU 600 is operating in the monitoring state 906, it is also capable of receiving new set relay messages from site controller 410—in response to which it changes the states of the control relays (ACU 600 can also accept new alarm masks at that time).

From either wait state 904 or monitoring state 906, ACU 600 enters the self-test state 908 in response to a diagnostic command. In self-test state 908, ACU 600 performs various diagnostic routines which allow a technician at the site to determine whether the various circuits within the ACU are operating correctly. The self-test state 908 is exited only in response to a reset command. Upon receipt of a reset command, ACU 600 exits whichever state it is operating in and enters the power-up state 902.

FIG. 10 is a flow chart of the steps performed by alarm and control unit 600 in the power-up state 902. Power-up routine 910 shown in FIG. 10 first turns off all light emitting diodes (LEDs) of display assembly 602 (block 912), and then performs a check of internal and external random access memory and read only memory components disposed on logic board 606 in a conventional manner (block 914). If the tests performed by block 914 reveal errors (as tested for by decision block 916), ACU 600 sets the ACU error bit in an ACU error status byte maintained within a register of the logic board 606 microprocessor (block 918). In the preferred embodiment, ACU status byte is stored in the logic board memory, is displayed by display assembly 602, and is also transmitted to site controller 410 as part of most or all of the messages sent by the ACU to the site controller.

ACU 600 then performs additional routine initialization tasks, such as turning on all LEDs, initializing time out timers and installing a serial port handler for use in indicating serial data between the ACU and site controller 410 (block 920). ACU 600 also establishes and initializes a five second clock which is used for determining when the site controller has ceased transmitting poll messages to the ACU (block 922).

ACU 600 then sets its NOT READY bit to indicate it has not yet entered the monitoring state (block 924), reads the current state of its eight control relays, and sets an internally-stored byte called RLYMSK to correspond to these current relay states (block 926). The states of the 32 alarm inputs are also read (block 928), and the status byte as well as the relay states and alarm input states are written to display assembly 602 (block 932) (ACU turns off all LEDs before writing to the display), and ACU 600 then transmits a current status message (see message format described above) to site controller 410 over serial link 412 (ACU) (block 934). ACU 600 then enters wait state 904 shown in detail in the FIG. 11 flow chart.

Referring now to FIG. 11, ACU 600 updates display 602 with any additional status information it has received from site controller 410 (block 940), and then determines whether a message has been received from the site controller (decision block 942). If the message has been received, ACU 600 decodes the message (block 944) in order to determine message type (and also to take specific action for specific types of received messages as will be discussed in greater detail in connection with FIGS. 17-18C).

After all recently received messages have been decoded by block 944, ACU 600 determines whether site controller 410 has received an alarm mask message and a relay setting message from site controller 410 (decision blocks 946, 948). If site controller 410 has not yet specified alarm masks information as well as relay setting information, ACU 600 returns to block 940 and executes blocks 940-948 until both these types of information have been received from the site controller.

When ACU 600 has successfully received both alarm mask information and relay setting information from site controller 410, the ACU clears its NOT REAY bit and sets its READY bit to indicate it is ready to perform alarm and control functions (block 950). ACU 600 updates display 602 (e.g., by extinguishing the "NOT READY" lamp and illuminating the "READY" lamp (block 952)), updates the portion of this display pertaining to overall status of system 100 (block 954) in response to information received previously from site controller 410, and then prepares for normal monitoring operation (e.g., by clearing a relay status register, reading a debounced timer, clearing alarm time out clocks, and starting a 1-second clock (block 956, 958)), and then begins operating in monitoring state 906.

FIG. 12 is a detailed flow chart of the monitoring state 906. Upon entering the monitoring state ("main loop"), ACU 600 determines whether a message has recently been received from site controller 410 (decision block 970), and if it has, decodes the recently received message (block 944a). ACU 600 then determines whether a 1-second timer (started in FIG. 11, block 958) has timed out (decision block 972). In block 974, ACU updates alarm line of clock every second.

ACU 600 then performs a routine called "process relays" to perform functions relating to the control relays (block 976), and performs another routine (process alarm) to perform functions relating to the alarm inputs (block 978).

ACU 600 then determines whether a poll time-out has occurred (decision block 980). In normal operation, site controller 410 sends a poll message to ACU 600 about once every two seconds. The 5-second timer initialized in FIG. 10, block 922, is used to determine whether too much time has passed since the last controller poll message was received. If more than five seconds passes between receipt of site controller poll messages, ACU 600 indicates on display 602 that a site controller is no longer active and that it no longer is being polled by the site controller by clearing the POLL bit in the ACU status byte, clearing the "active" bit in a stored system status byte, and updating display 602 (blocks 982, 984). ACU 600 updates display 602 anyway even if no poll time-out has occurred, and loops back to decision 970 to determine whether a message has been received from site controller 410. In normal operation, ACU 600 continuously executes the "main loop" of blocks 970-984 until it is commanded to perform diagnostics, it is reset, or power is turned off.

FIG. 13 is a detailed flow chart of the check alarm clock routine 974 shown in FIG. 12. In the preferred embodiment, an independent 10-second alarm "clock" is stored by ACU logic board 606 corresponding to each alarm input. The alarm "clock" of an input is normally set to 0, so that ACU 600 immediately responds to any changes in alarm input. However, once an alarm input has changed state, its corresponding alarm "clock" is set to the value of 10, and decremented once each second. Routine 974 checks all alarm "clocks," and only non-zero clocks are decremented. Hence, ACU 600 in the preferred embodiment waits 10 seconds after an alarm input has changed state before determining whether that input has again changed state.

Upon entering the check alarm routine 974, ACU 600 first resets the 1-second timer (block 990), and then executes a loop consisting of block 992-998 thirty-two times—once for each alarm input. ACU 600 weights the value of each alarm "clock" and determines whether it is equal to 0(block 992, 994). Alarm clock values that are not equal to 0 are decremented by one second (block 996) (since routine 974 is performed once every second). This process continues until all alarm input clocks have been checked (as tested for by decision block 998). After all alarm input clocks have been checked, control returns to monitoring state 906 and the process relays routine 976 is executed.

FIG. 14 is a detailed schematic diagram of the process relays routine 976. Upon entering this routine, ACU 600 first tests whether it has received a relay mask message from site controller 410 (decision block 1002). If a relay mask message has been received, a flag indicating the message was received is cleared in preparation for a receipt of the next relay mask message (block 1004), and the states specified in the relay mask message are written to the control relays in order to change the relay states to those requested by site controller 410 (block 1006). A relay debounce timer is then initialized to inhibit ACU 600 from testing the values of the relays for the next 100 milliseconds (since during that time, relay contact bounce will yield unexpected or erroneous results) (block 1010).

If a relay mask message has not been received (the N branch of decision block 1002), decision block 1012 determines whether a relay bounce timer has timed-out (this debounce timer is the same one initialized in block 1010). If the debounce timer has timed-out, the states of the relays are read by ACU 600 (in the preferred embodiment, the control relays are DPDT relays, with one set of contacts being used to control external devices and the other set of contacts being used to allow the ACU to positively read the state of the relay contacts) (block 1014). The read relay states are then compared to the desired states (as communicated to ACU 600 in the last relay mask message received from site controller 410 (block 1016)).

Under normal conditions, the relay states should be equal to their desired states. If such is the case (as tested for by decision block 1018), a relay error bit in the ACU status byte is cleared (block 1020) and the process relays routine 976 is exited. If, however, the actual relay states are not equal to their desired states, a relay error bit in the ACU status byte is set (block 1022), and blocks 1006 and 1010 are executed again in an attempt to force the relays to their desired states.

FIG. 15 is a flow chart of the FIG. 12 "process alarm" routine 978. This process alarm routine is performed continuously to determine whether any alarm input states have changed into "send messages" indicating alarm input state changes to site controller 410.

ACU 600 first reads the actual states of all thirty-two alarm inputs and then converts the actual alarm input states according to the following formula:

$$ALNOW = ENABLE\ mask + \overline{(ACTIVE\ MASK\ XOR\ ALIN)}$$

(Blocks 1030, 1032).

In the preferred embodiment, ACU 600 maintains a database containing four values for each alarm input: ALIN, ALNOW, ALSOT and ALSND. The portion of this database corresponding to one alarm input is shown in FIG. 16. The value ALIN specifies the actual alarm input state as read the last time block 1030 was executed. The value ALNOW is the converted value of the ALIN as converted by block 1032 in the equation set forth above. This conversion process takes into account alarm mask information specified by site controller 410 in the alarm mask message (as will be recalled, site controller 410 can enable or disable specific alarm inputs, and may also specify whether the "normal" value of a specific alarm input is logic level 0 or logic level 1). The value of ALLST is the "last" value of ALNOW (i.e., an historical ALNOW value, and the value ALSND is an even "older" ALNOW value).

Decision block 1034 compares the value ALNOW with the value ALLST. If these values are not equal, the value ALLST is overwritten with the value of ALNOW and routine 978 is exited (since a change in alarm input values over a very short time it takes to execute the monitoring state loop shown in FIG. 12 is ignored, as it may be attributable to a transient rather than to a bona fided change in alarm state). If, however, the values ALNOW and ALLST are equal (indicating that the alarm input state has stabilized), and the value ALLST (as written into by block 1036) is not equal to the "older" historical value ALSND, ACU 600 determines that an actual change in alarm input state has occurred (decision block 1038) and obtains the number of the alarm which changed state (block 1040) (in the preferred embodiment, routine 978 is performed on data corresponding to all thirty-two alarm input states in parallel.

Decision block 1042 then determines whether the alarm clock for the corresponding alarm input has a 0 value. If the alarm clock value is 0, it is reset to the value of 10 and an alarm bit in the ACU status byte is set to indicate an alarm has occurred (block 1044) (the value of ALSND of the corresponding alarm is also over written with the value of ALST at this time). If, on the other hand, the alarm clock value of the alarm which has changed state is non-0, the change of state is ignored (since a non-0 alarm clock value indicates that the corresponding alarm has changed state within the last ten seconds, and the preferred embodiment responds only to alarm state transitions once every ten seconds). Blocks 1040–1044 may be repeated until all alarms which have changed state have been investigated.

When decision block 1046 determines that all alarm inputs which have changed state have been investigated, decision block 1048 determines whether any alarm bits were set by block 1044. If at least one alarm bit has been set, ACU 600 updates display 602 and sends a message to site controller 410 informing the site controller of the newly-received alarm (block 1050, 1052). It will be understood that block 1052 reports all alarm input state changes detected by block 1038 in a single status message rather than sending a separate message for each alarm input which has changed state.

Figure 17:
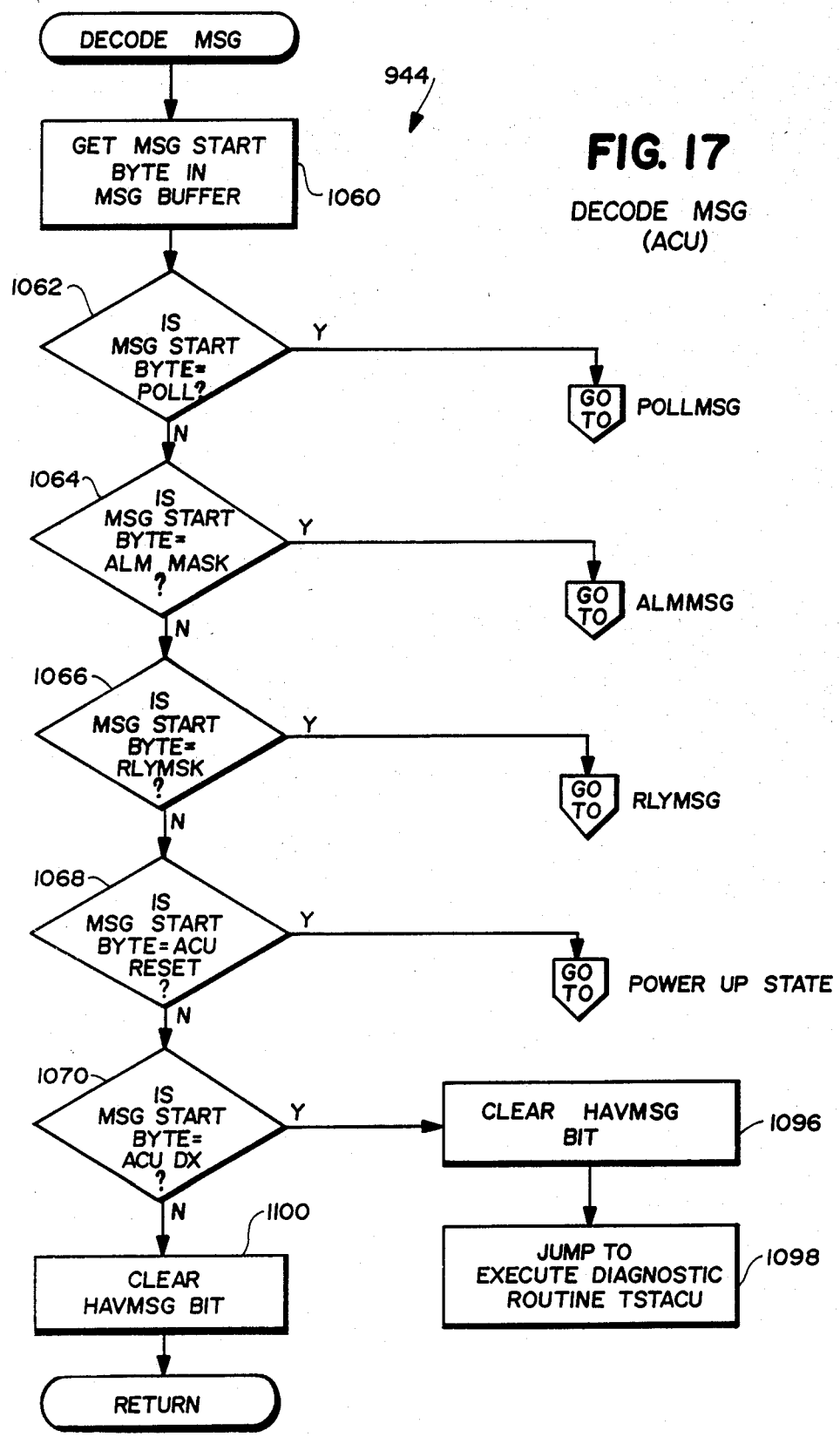

FIG. 17 is a detailed flow chart of the decode message routine 944 shown in FIGS. 11 and 12. Routine 944 analyzes messages received from site controller 410 over serial data link 412 (ACU), and performs appropriate initial processing on the received messages.

In the preferred embodiment, interrupt-driven serial port high/low handler removes messages from link 412 (ACU) and deposits them in a received message buffer. When an entire message has been received, the input handler (which is conventional in function and operation) sets a flag called HAVMSG to indicate to ACU 600 that a new message has been received. Routine 944 is called only when this HAVMSG flag has been set.

If routine 944 removes a newly-received message from the received message buffer (block 1060), and determines the value of the first (i.e., "message start") byte in the message. As explained previously, ACU 600 receives five different types of messages from site controller 410: poll messages, alarm mask messages, relay mask messages, reset messages and ACU diagnostic messages. Decision blocks 1062–1070 decode the message start byte to determine the type of message which has been received.

If decision block 1062 determines a poll message has been received, the poll message routine shown in FIG. 18A is executed. Referring now to FIG. 18, ACU 600 copies the system status information contained in the poll message into its own system status byte (block 1072), clears the HAVMSG flag (block 1074), and then changes the state of the poll bit in the ACU status byte (block 1076) (in the preferred embodiment, the value of this poll bit, and thus the extinguished/illuminated state of the corresponding LED of display 602, toggles with every poll message receipt). ACU 600 then reinitializes its poll timer (i.e., a 5-second timer initialized in FIG. 10, block 922) (block 1078), transmits to site controller 410 a status response message in response to the received poll message (block 1080), and returns to decode message routine 944.

If FIG. 17 decision block 1064 determines that an alarm mask message has been received from site controller 410, the alarm mask message routine shown in FIG. 18B is executed. Referring now to FIG. 18B, the ACU system status byte is rewritten with the system status information contained in the alarm mask message (block 1082), the enable, and active and major/minor mask information discussed above is transferred into the ACU 600 random access memory (block 1084), the HAVMSG flag is cleared, and the GOTMSK flag is set.

If FIG. 17 decision block 1066 determines a relay mask message has been received from site controller 410, the FIG. 18C routine is executed to obtain new system status information from the newly-received message (block 1088), replace the old relay mask information stored in the ACU with the newly-received relay mask information (block 1090), clear the HAVMSG flag (block 1092), and set the GOTRLY flag (also block 1092) (this GOTRLY flag is used by FIG. 14 decision block 1002 to determine whether a new relay mask message has been received).

Referring now once again to FIG. 17, if the received site controller message is a reset message (as tested for by decision block 1068), control returns to FIG. 10 block 910 to execute the steps included in the power-up state.

Figure 19A:
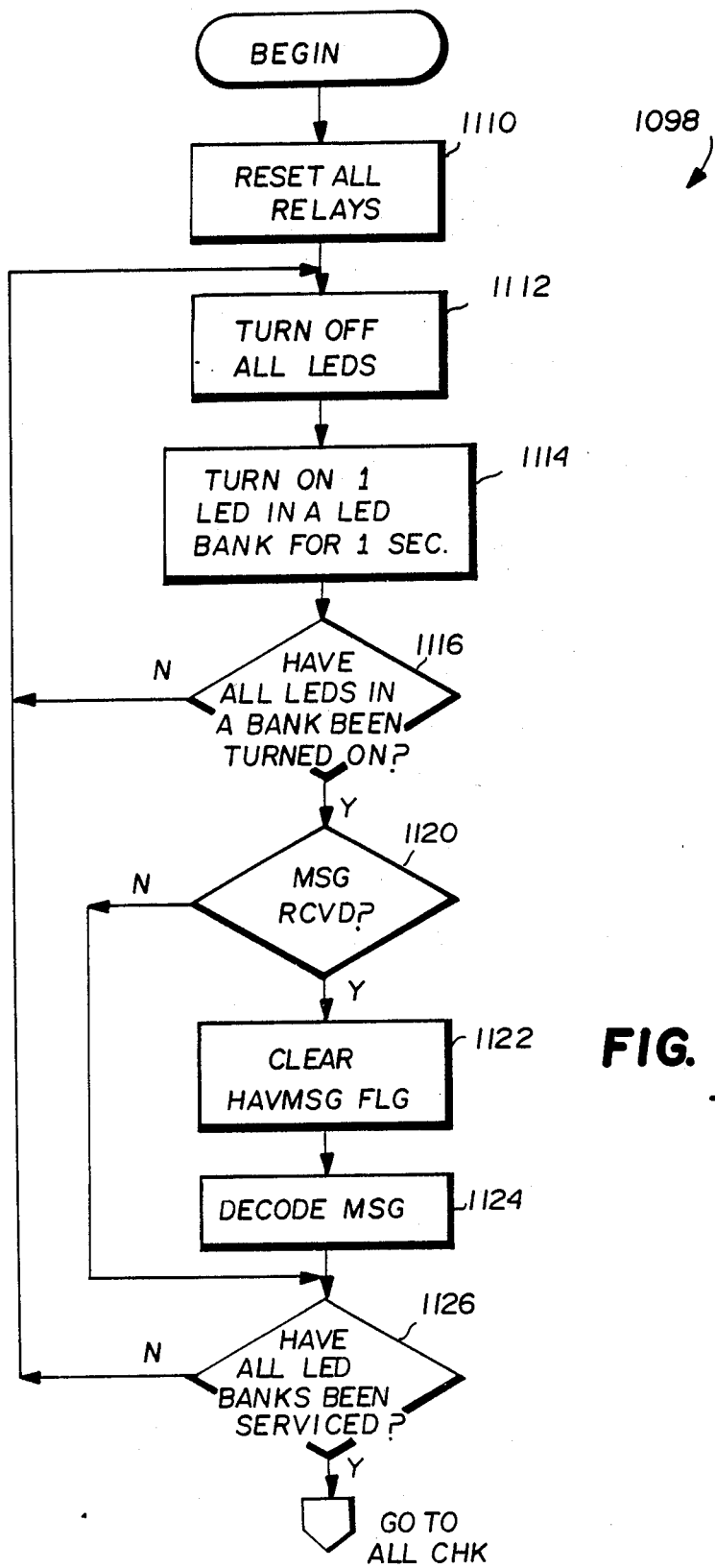
Figure 21:
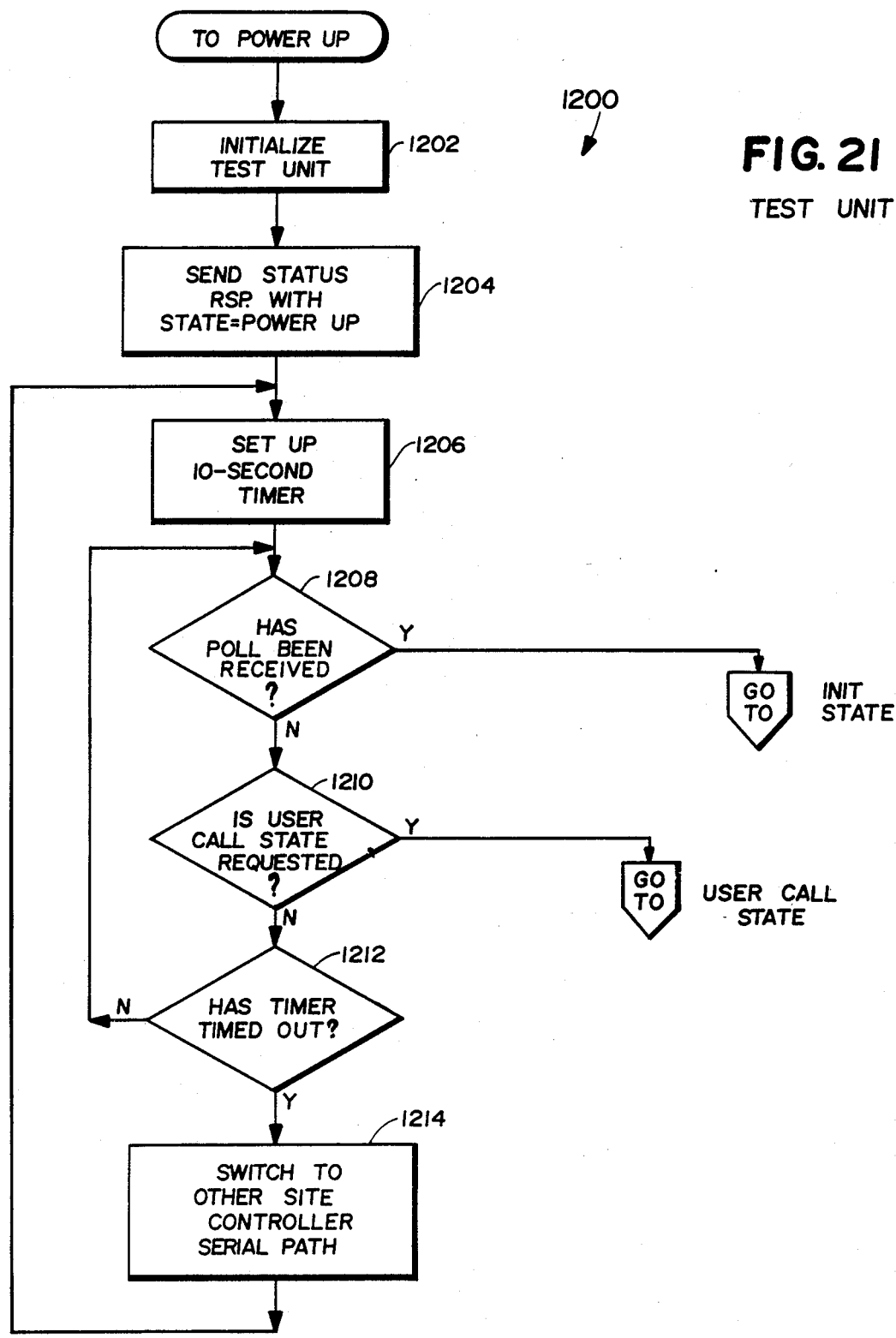
FIGS. 21-26 are detailed schematic flowcharts of exemplary program control steps performed by the test unit shown in FIG. 5.

If decision block 1070 determines the received site controller message the diagnostic message, is a HAVMSG flag is reset (block 1096), and the diagnostic routine shown in detail in FIGS. 19A–19B is executed (block 1098). If none of decision blocks 1062–1070 can identify the received message, it is ignored and the HAVMSG flag is cleared in preparation for the next message (block 1100).

FIGS. 19A–19B together are a flow chart of the TSTACU "self-test" diagnostic routine 1098. This self-test is typically executed in response to a received message originated, not from site controller 410, but from a "suitcase" data terminal connected by a technician at the site to the ACU 600 serial I/0 port. Upon entering the self-test diagnostic state, ACU 600 resets all relays (block 1110), turns off all LEDs of display 602 (block 1112), and then turns on each LED of display 602 in sequence for two seconds each (blocks 1114, 1116). When all LEDs have been turned on and off in this manner, ACU 600 tests whether a message has been received (decision block 1120). While ACU 600 ignores most received messages during the time it is executing self-test routine 1098, it will respond to the reset message by entering the power-up state (as will be explained). When all LEDs and all banks of display 602 have been turned on and off for two seconds (as tested for by decision block 1126), ACU 600 turns off all LEDs (block 1128), and then turns on all LEDs in a bank for two seconds (block 1130). After checking whether a message has been received (blocks 1132, 1134), blocks 1128, 1130 are repeated for each "bank" LEDs of display 602 until all banks of LEDs have been turned on and off (decision block 1136).

After display 602 has been tested in the manner described, the ACU status byte is cleared and each of the control relays are set for two seconds and then reset (at the same time a control relay is set, its corresponding LED of display 602 is lit) (blocks 1140, 1142).

After checking whether a message has been received (blocks 1144–1148), ACU 600 sets up a 1-second timer (block 1150), reads the state of each of the thirty-two alarm inputs (block 1152), and writes the complement of the actual alarm inputs to display 602 (block 1154) (thus allowing a technician to observe the actual alarm input states by merely looking at display 602).

After one second has passed (as tested for by decision block 1156) and ACU 600 has tested once again whether a reset message has been received (blocks 1158–1162), control returns to blocks 1150–1154 to repeat the alarm input state display.

TEST UNIT

The test unit receives commands from the site controller 410, and monitors and tests the control channel and the working channels. The test unit 700 may enter the following active states:
Power-up
Initialization
Set Up
Monitor
Test call
User call The following discussion of state transitions refers to the state diagram shown in FIG. 20:

POWER-UP STATE

The test unit 700 is in the POWER-UP state at power-up or after a hardware or software reset. In the POWER-UP state, the test unit initializes itself and performs self-diagnostics. When these tasks are finished, the test unit sends a STATUS RESPONSE message to site controller 410, and then waits for a status request message from the site controller. If a STATUS REQUEST message has not been received within 10 seconds, the test unit 700 switches to the backup site controller 410 serial link to wait for the status request message. Every 10 seconds thereafter, the test unit 700 switches between the master and backup serial lines until it receives a STATUS REQUEST message.

INITIALIZATION STATE (INIT)

The test unit enters the INITIALIZATION (INIT) state after it has received the status request message from the site controller 410. Upon entering the INIT state, the test unit 700 sends a STATUS RESPONSE message to the site controller 410. The STATUS RESPONSE message contains a bit indicating the validity of the preprogrammed personality EEPROM in the test unit 700 mobile transceiver. If the mobile transceiver has not been programmed, the test unit 700 waits for the SETUP command from site controller 410. Otherwise, the test unit 700 automatically proceeds to the SETUP state.

SET UP STATE

If the test unit 700 mobile transceiver has been pre-programmed with "personality data," it enters the SETUP state directly from the INIT state after it has sent the STATUS RESPONSE message to the site controller 410. If the test unit 700 mobile transceiver 704 does not have a programmed personality, then the test unit enters the SET UP state only if it has been given the SETUP command from the site controller 410. The test unit 700 also reverts to the SET UP state from the MONITOR state if it detects a control channel failure.

If the test unit enters the SET UP state because it received the SETUP command from the site controller 410, the test unit 700 is initialized for the following parameters given in the SETUP command:

1. The site ID number; and
2. Each channel number (with its corresponding frequency) for every channel at the site.

The logical ID for the test unit 700 is always 00H in the preferred embodiment.

The test unit 700 remains in the SETUP state until it receives another command from site controller 410.

MONITOR STATE

The test unit 700 enters the MONITOR state after it has received the MONITOR command from the site controller 410. Upon entering the MONITOR state, the test unit 700 is initialized to the channel number given in the MONITOR command as the control channel and begins monitoring the control channel.

While in the MONITOR state, the test unit 700 synchronizes with the control channel sync timing and monitors the outbound control channel. If the test unit 700 detects a failure or other critical condition on the control channel, it sends the CCFAIL message to the site controller 410 and goes to the SET UP state.

TEST CALL STATE

The test unit 700 enters the TEST·CALL state upon receiving the TEST CALL command. In the TEST CALL state, test unit 700 transmits a test call to test the operation of a selected working channel.

In the TEST CALL state the test unit 700 first initiates an individual call on the inbound control channel and then waits for a working channel assignment from the site controller 410. When the assigned working channel has been obtained, the test unit 700 verifies the high speed and low speed data transmitted on the corresponding outbound working channel.

When the test call has been completed, the test unit 700 sends the test call results to the site controller 410, returns to the MONITOR state and resumes control channel monitoring. The test unit 700 must be in the MONITOR state in order for a TEST CALL to be performed.

USER CALL STATE

The test unit 700 enters the USER CALL state only when an operator at the site changes the position of the switch on the serial interface board 880 (which changes the state of the IGN A+ line connected to the test unit 700 mobile transceiver). When the test unit 700 notices the change in the IGN A+ line, it then sends the test unit 700 STATUS RESPONSE message to the site controller 410 indicating the USER CALL state. When the message has been sent, the test unit 700 changes the state of the normally high test unit SER RQST line to low —in turn, causing the normally open relay on the serial interface board 880 to close and connect power to the control head 702. The low test unit SER RQST line also enables the serial link to the control head 702 and disables the serial link to the site controller 410. The test unit 700 may now be operated as a regular 16 PLUS mobile radio transceiver 704.

The test unit 700 may enter the USER CALL state from any other state except the TEST CALL state.

The test unit 700 terminates the USER CALL state when either:

(1) the operator changes the position of the serial interface board switch, or (2) there is no PTT (push to talk) activity for a predetermined time period.

When the test unit 700 leaves the USER CALL state, the test unit 700 SER RQST line is set high. This changes the state of the relay and disconnects power to the control head 702. The serial link between the test unit 700 and the site controller 410 is also re-established. The test unit 700 then returns to its previous state and sends a STATUS RESPONSE message to the site controller 410. While in the USER CALL state, the test unit 700 does not have any communication with the site controller 410.

MESSAGES

The site controller 410 is connected to the test and alarm unit via a conventional serial data link 412 (TU-)—an RS-232C 19.2 kilobaud bus in the preferred embodiment using standard 8 bit, no parity, 1 stop bit protocol. Each message includes:

| (1) Frame byte | (AA) |
|---|---|
| (2) Start byte | (Identifies message type and length) |
| (3) Data | |
| (4) Parity byte | (Inverted exclusive-OR of items 2 through 3) |

TEST UNIT MESSAGES

The following describes the messages sent from site controller 410 to test unit 700 in the preferred embodiment.

RESET message—(AA) (FD) (P)

Reset the test unit 700. The test unit 700 enters the POWER-UP state and performs the POWER-UP functions in response to this message.

SC STEERING message—(AA) (02) (d1) (P)

Through this message, the site controller 410 informs the test unit 700 if it should be steered to the master or backup site controller 410.

(d1) = 0 0 0 0 0 0 0 B

Where: For B, 0 = primary site controller 410
1 = backup site controller

STATUS REQUEST MESSAGE - (AA) (07) (P)

-continued
Request status from the test unit 700.
MONITOR CONTROL CHANNEL message - (AA) (08) (d1)
... (d7) (P)
Monitor the control channel.
```
        0  0  0 C4 ... C0
(d1) = - - - -        -
        S7  .  .  . S0
(d2) = - - - -       -
(d3) ... (d7) = all 00
```
Where: For C4–C0 = control channel
number (in binary)
S7–S0 = site id in binary
TEST CALL message - (AA) (10) (P)
Perform a test call.

The following messages are transmitted from test unit 700 to site controller 410 in the preferred embodiment.

STATUS RESPONSE message - (AA) (91) (d1) (d2) (P)
```
        P  B  F S4 ... S0
(d1) = --- --- --- --- --- ---
        0  0  0  0  PR IN EX SYN
(d2) = --- --- --- --- --- --- --- ---
```
Where field (d1) is used to indicate test
unit 700 status and field (d2) indicates
test unit errors;
For P,   1 = programmed personality,
      0 = no personality B,    0 = master site controller
       410,
      1 = backup F,    1 = site in failsoft,
      0 = no failsoft PR,   1 = error in program ROM,
      0 = no error IN,   1 = error in internal RAM,
      0 = no error EX,   1 = error in external RAM,
      A = no error SYN,  1 = synthesizer not locked,
      0 = synth. locked S4–S0 - indicate test unit state
```
        00000 = POWER-UP
        00001 = INIT
        00010 = SETUP
        00100 =
        01000 = TEST CALL
        10000 = USER CALL
```
CALL RESULTS message - (AA) (92) (d1) (d2) (P)
```
        0 T6 T5 T4 T3 T2 T1 T0
(d1) =
        0  0  0 W4 ... W0
(d2) =
```
Where: For
T6,   1 = no control channel found for test call
T5,   1 = no channel assignment
T4,   1 = no working channel high speed data
T3,   1 = no working channel low speed date
T2,   1 = no drop channel message
T1,   1 = control chan. synth. not locked
T0,   1 = working chan. synth. not locked
W4–W0 = Working channel number (in binary)
CC FAIL message - (AA) (93) (d1) (d2) (P)
```
        F7 F6 F5 0 0 F2 F1 0
(d1) =
        0  0  0 C4 ... C0
(d2) =
```
Where: For
F7,   1 = no control channel found
F6,   1 = lost sync on control channel
F5,   1 = 4 consecutive messages undecodable
F2,   1 = no site id detected -continued
F1,   1 = Wrong site id detected
C4–C0 = control channel number, (in binary)

DISCUSSION OF STEPS PERFORMED BY TEST UNIT

The following is a discussion of exemplary program control steps performed by test unit 700 in the preferred embodiment. These steps are shown in the FIG. 21–26 flowcharts.

Upon initial power up, test unit 700 enters the POWER UP state and performs initialization functions (e.g., check internal ROM and RAM, initialize an internal modem and serial I/0 port, and download "personality" data from ROM into a working area of memory) (block 1202).

The test unit 700 then transmits a STATUS RESPONSE message to site controller with the status field indicating the POWER UP state (block 1204). A 10-second timer is set up (block 1206), and TU 700 tests whether a poll message has been received from site controller 410 (block 1208). If a site controller poll message has been received, TU 700 enters the INIT state.

If no poll message has yet been received, on the other hand, decision block 1210 determines whether a user has requested the USER CALL state (i.e., by testing the state of the IGN +A line, which changes level when a switch mounted on the serial interface board 800 is operated). If the USER CALL state is requested, mobile transceiver enters the USER CALL state.

Decision blocks 1208, 1210 are repeatedly executed until either a site controller poll or a user call request is received, or until the 10-second timer times out (tested for by decision block 1212). If the timer times out, TU 700 controls serial board 800 (via the mobile transceiver AUX line) to monitor the backup site controller link 812(TU) (block 1214), and blocks 1208–1212 are repeated. TU 700 toggles the level of the AUX line every 10 seconds while executing blocks 1208–1214 until a poll message or a user call request is finally received.

Figure 22:
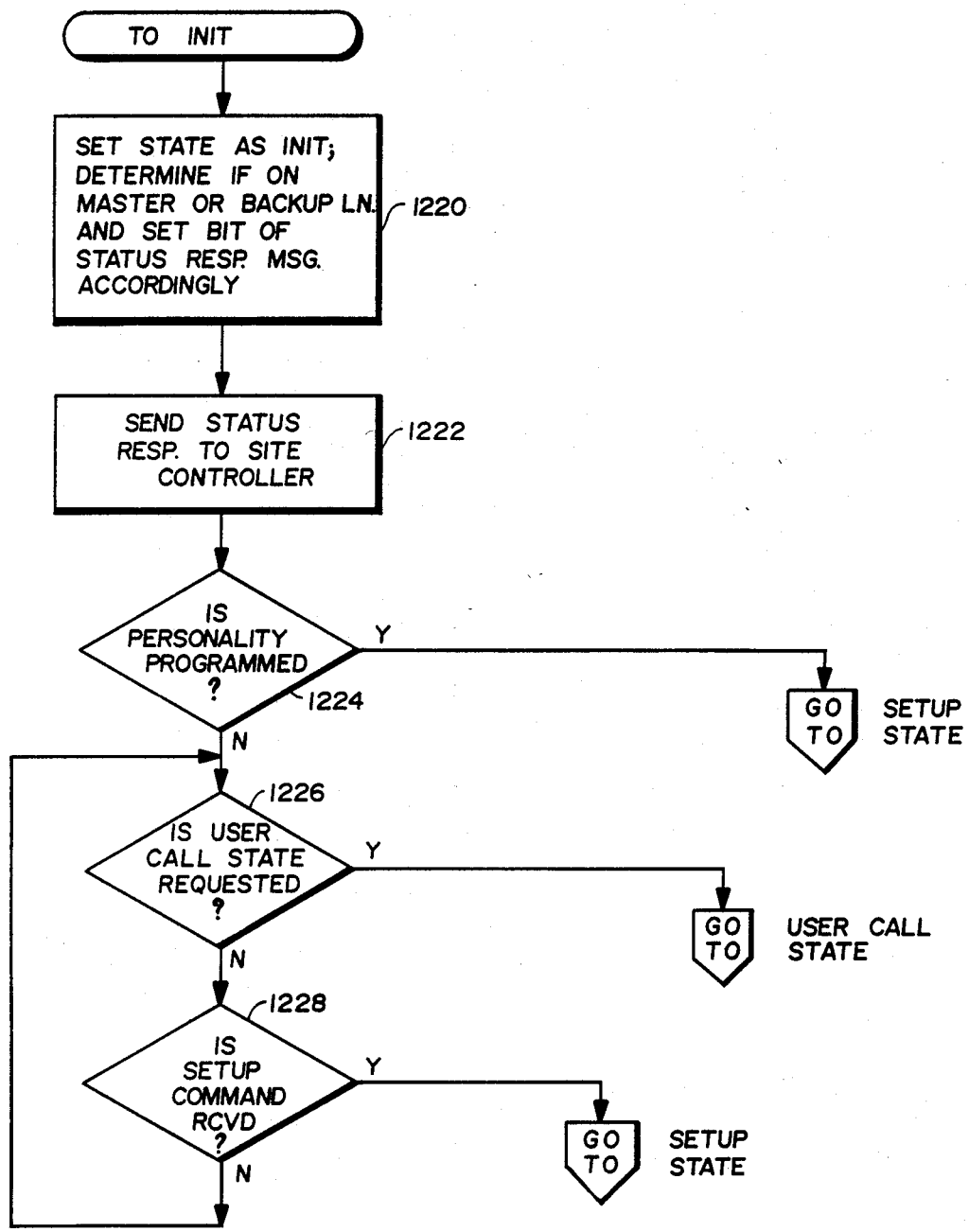

FIG. 22 is a flowchart of the steps performed by TU 700 in the INIT state. This INIT state is entered from the POWER UP state only upon receiving a poll message from the site controller. TU 700 first sets its state as INIT, and then determines if it received the poll message from the primary or backup site controller 410 (e.g., by testing the level of its own AUX line) (block 1220). TU 700 then sets the value of an internally stored status byte which indicates whether the primary or the backup site controller is active (block 1222), and transmits a status response message to the active site controller 410 indicating the INIT state and also indicating the site controller it is monitoring.

TU 700 then determines whether it has a programmed "personality" (decision block 1224). In the preferred embodiment, test unit 700 must somehow be initialized to contain certain site-specific data (e.g., the frequencies corresponding to system channel numbers, the group(s) the test unit transceiver 704 is a member of, etc.) Test unit 700 may be initialized either by installing an EEPROM memory device containing such personality information into test unit transceiver 704, or by having site controller 410 program the test unit via a set-up command. If the TU 700 is already programmed with personality data, it enters the set-up state to receive personality programming from site controller 410.

If TU 700 does not already have a programmed "personality", it enters the USER CALL state if requested to do so (decision block 1226). Otherwise, TU 700 determines whether a set-up command has been received (decision block 1228), and enters the SETUP state if such a command has been received. Blocks 1226–1228 are repeated indefinitely until TU 700 receives either a SET UP command or a user call is requested.

Figure 23:
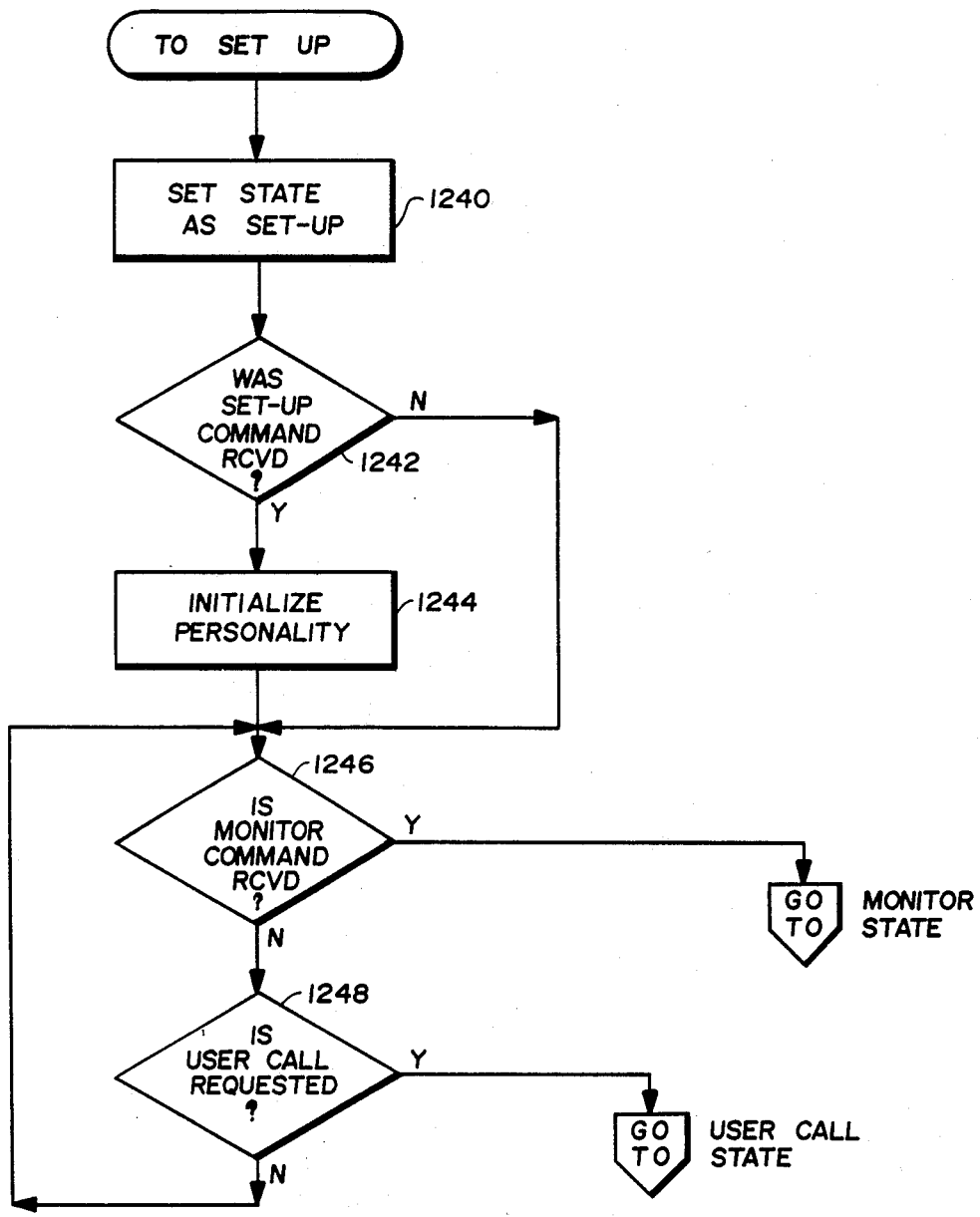

If TU 700 receives a SET UP command or if the TU does have a programmed "personality", the TU enters the SET UP state. Exemplary program control steps controlling the operation of TU 700 in the SET UP state are shown in FIG. 23. TU 700 first sets its state as SET UP, and then determines whether it entered the SET UP state because it received a SET UP command (decision block 1242). If a SET UP command was received, the TU does not already have a programmed "personality" and loads this programming from the site controller (i.e., from the receive data buffer associated with the site controller link 412(TU)). On the other hand, if the SET UP state was entered because of, for example, detection of a control channel failure, or it has a programmed personality, TU 700 waits for receipt from the site controller of a MONITOR command or a request to enter the USER CALL state (decision blocks 1246, 1248).

Figure 24B:
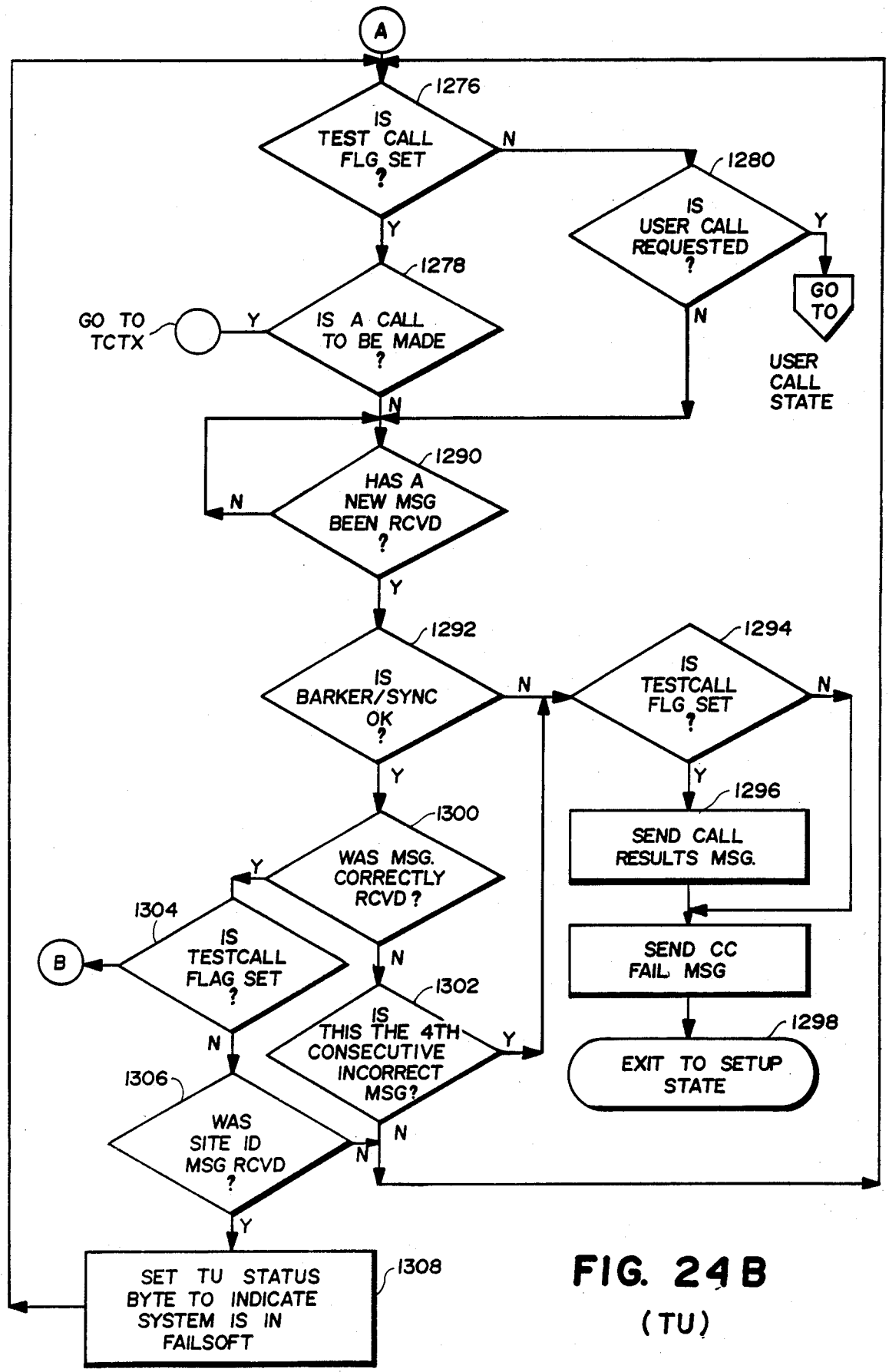

FIGS. 24A–24B are together a detailed flow chart of the steps performed by TU 700 while in the MONITOR state. Upon entering the MONITOR state, TU 700 first sets its state to MONITOR (block 1250), and then initializes various temporary storage locations it needs for operating in the MONITOR state (block 1252). TU 700 then sets an "error counter" to the value 4 (corresponding to the four consecutive times it can receive a "bad" control channel message before declaring a control channel failure) (block 1254), and determines whether the "test call" flag is set (decision block 1256). As will be explained shortly, TU 700 can make "test calls" on system working channels in order to test out control channel assignment messages and the operation of selected working channels. Upon receipt of a TEST CALL message from site controller 410, TU 700 sets this "test call" flag and also initializes a retry counter.

If no "test call" message has been received, TU 700 determines whether a user call has been requested (decision block 1258) (user call requests are ignored when the TU is in the TEST CALL state). If not, TU 700 begins monitoring the system control channel.

Control channel monitoring is an important function of the test unit 700, and includes several tasks:

(1) obtaining sync on the control channel;
(2) monitoring the outbound control channel signaling; and
(3) verifying the Site ID Control channel monitoring is extremely valuable in testing the operation of system 100. For example, when the site controller 410 decides to bring up a control channel, it first transmits the MONITOR command to the test unit 700 specifying the number of the control channel. The test unit 700 then enters the MONITOR state and attempts to obtain sync on the new control channel. If successful, the test unit 700 begins monitoring the control channel as described above. The site controller 410 should not direct the mobile radio transceivers in the field to begin monitoring the new control channel until it has ascertained through test unit 700 that the new control channel is functioning properly.

Upon entering the MONITOR state, test unit 700 initializes mobile transceiver 704 to operate on the control channel specified in the mobile transceiver "personality" programming (block 1260), and then attempts to synchronize with the timing of the assigned control channel (block 1262). If the test unit 700 cannot obtain sync with in 0.5 seconds (as tested for by decision block 1264 and blocks 1266, 1268), it issues a CCFAIL RESPONSE message to the site controller 410 (block 1274) indicating no sync was obtained. Before transmitting the CCFAIL message, TU may first transmit a Call Results message (with the "no control channel" bit set) if it was in the TEST CALL state (since it may have been monitoring the control channel in an attempt to obtain a channel assignment to be used to perform a test call) (blocks 1270, 1272). The test unit 700 then leaves the MONITOR state and enters the SETUP state, where it waits for further instructions from the site controller 410.

Once sync has been obtained, TU 700 determines once again whether a test call is to be made (decision blocks 1276, 1278) (and also checks again to determine whether a user call has been requested, decision block 1280). If a test call is to be made, control is transferred to routine TCTX shown in FIG. 24C. When the test unit 700 receives the TEST CALL command, it enters the TEST CALL state and requests an individual call to itself on the inbound control channel (block 1288). The test unit 700 then waits for a working channel assignment on the outbound control channel FIG. 24B, block 1290). TU 700 will retry its channel request several times (blocks 1282, 1284) before it "gives up" and sends a CALL RESULTS message to site controller 410 indicating "no channel assignment".

Referring once again to FIG. 24B, once control channel sync is acquired, the test unit 700 monitors the outbound control channel and waits for an outbound control channel message (block 1290). When a message is received, TU 700 tests whether the Barker word sync information carried on the outbound control channel is correct (decision block 1292). If the word sync information is not correct (indicating the TU has lost control channel synchronization), the TU sends a CC FAIL message to the site controller 410 indicating "lost sync") (block 1298) and exits to the SET UP state. TU 700 may send a CALL RESULTS message before the CC FAIL message if in the TEST CALL state (blocks 1294, 1296).

If sync has not been lost (decision block 1292), TU 700 receives the signaling on the outbound control channel, and performs conventional error checking algorithms on it (e.g., by voting on the three repeats of a message and deciding if the voted message is correct) (block 1300). If four consecutive messages are received which are not correct (tested for by decision block 1302), the test unit 700 sends the CCFAIL RESPONSE message indicating "4 consecutive bytes undecodable" to the site controller 410 (block 1298), exits the MONITOR state and enters the SETUP state. The test unit 700 remains in the SETUP state until it receives further commands from the site controller 410.

The test unit 700 then decodes all correct messages. When a Site ID message is received (decision block 1306), the Test Unit compares the site ID contained in the message with the site ID received in the MONITOR command. If the two ID's do not match, the CCFAIL message is sent to the site controller 410 and the test unit 700 then returns to the SETUP state. The test unit 700 also sends the CCFAIL message to the site controller 410 if it does not detect any site ID information. If a correct site ID message is received but the control channel information also indicates the system is in the failsoft mode, TU 700 sends a status message to site controller 410 indicating the system is in failsoft (since often the TU will detect the system has switched to the failsoft mode before the site controller can detect this on its own).

Figure 24C:
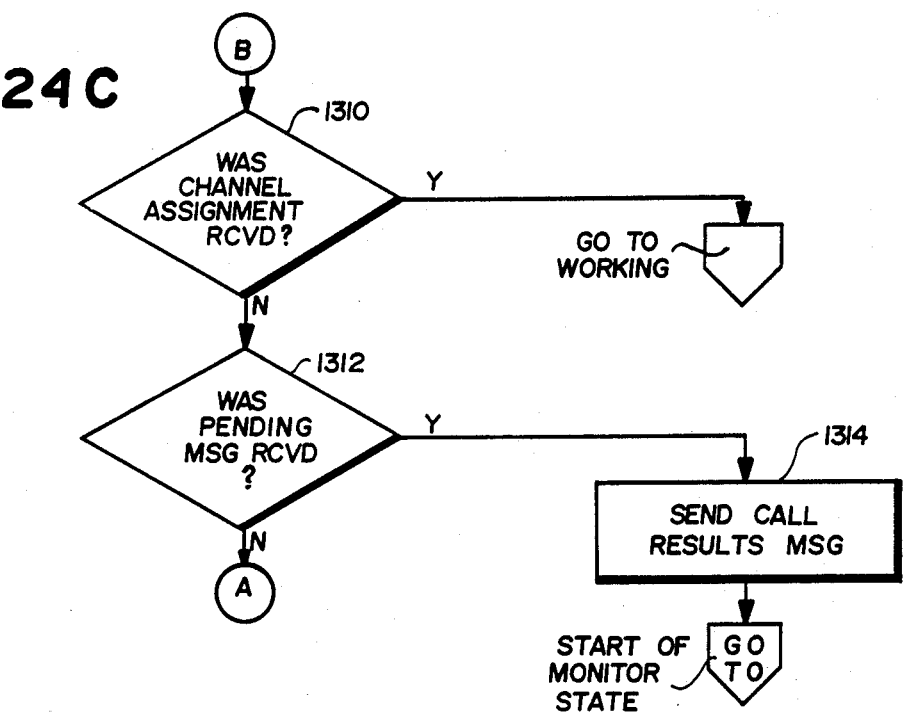
Figure 24D:
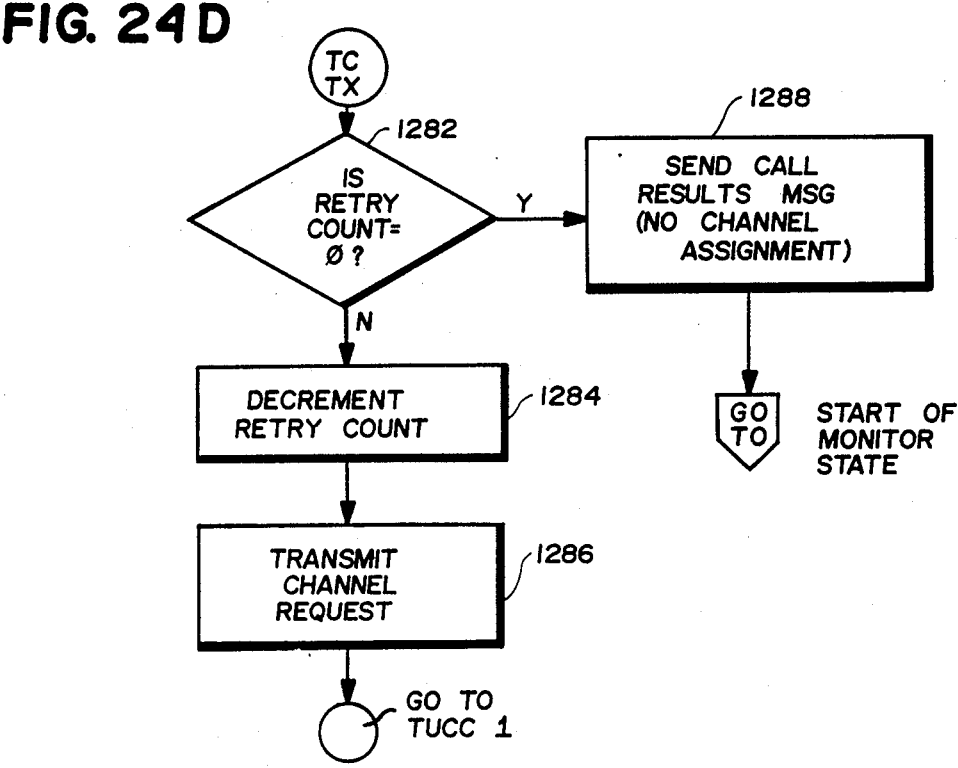
Figure 25:
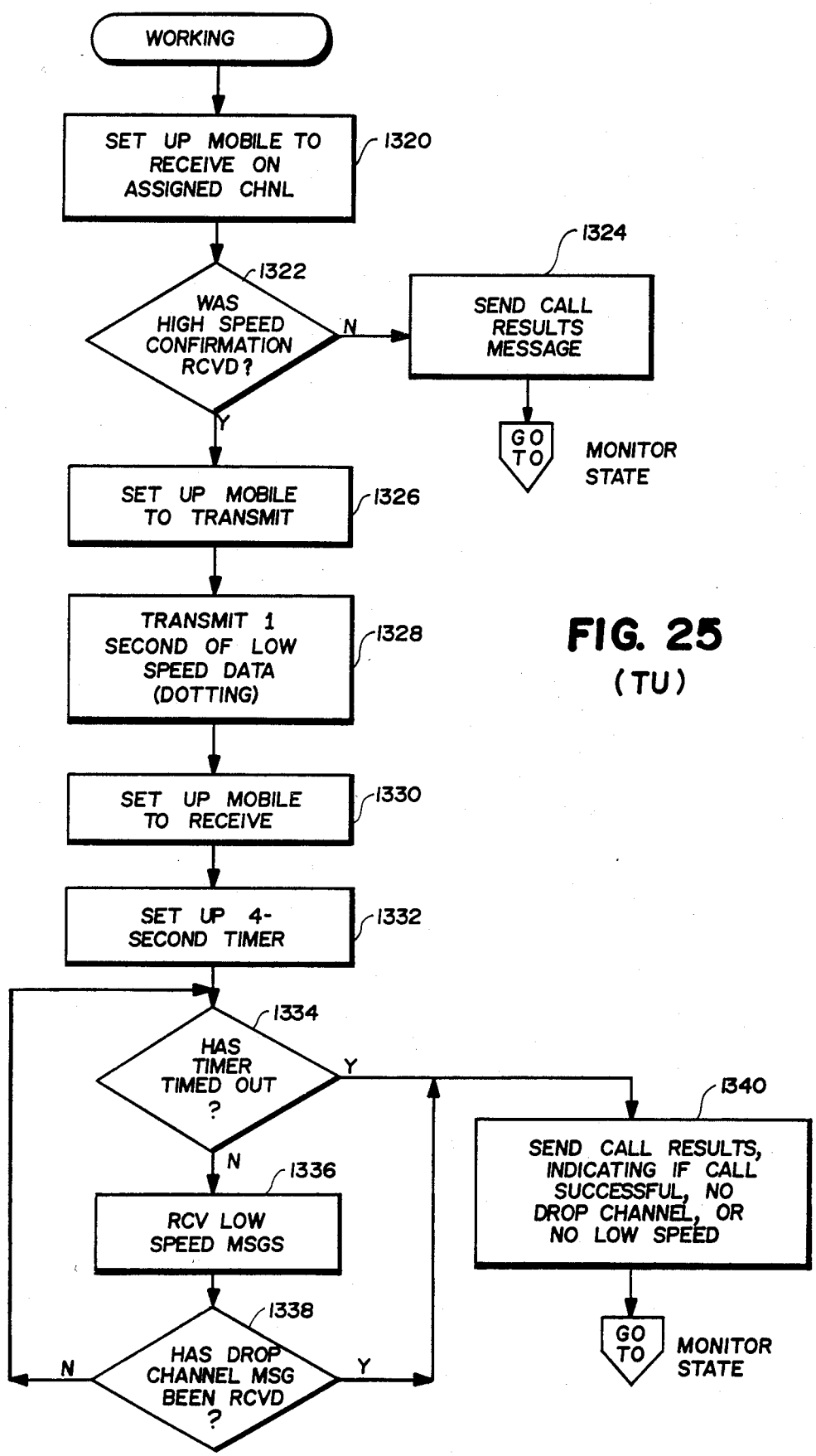

If decision block 1300 detects a correctly received message and TU 700 is in the TEST CALL state, the TU must determine whether the received message is a working channel assignment (decision block 1304). Referring now to FIG. 24C, if a channel assignment message was received (decision block 1310), the TU enters the WORKING state. If the received message was not a channel assignment message but instead was a "pending" message (decision block 1312), the TU 700 sends a CALL RESULTS message to site controller 410 indicating "no channel assignment" (block 1314). Since site controller 410 itself requested a test call, the site controller guarantees that the working channel to be tested is available and reserved for TU 700. If a "call pending" message is received (indicating the working channel to be tested is in use), the site controller 410 made an error and TU 700 aborts its attempt to test the working channel.

When TU 700 detects the channel assignment message, the mobile unit 704 retunes to the working channel specified in the channel assignment message (block 1320) where it monitors the high speed data handshaking (block 1322). If high-speed signaling is not received, a CALL RESULTS message is sent to site controller 410 indicating "no working channel high-speed data" (block 1324). If high speed signaling is correctly received, the test unit 700 then transmits low speed data (e.g., dotting) on the inbound working channel (blocks 1326, 1328), and switches to the receive mode (block 1330) where it monitors the low speed data on the outbound working channel (block 1336) until it receives a DROP CHANNEL message (block 1338). The site controller 410 specifies message trunking for the test call and also specifies at least a 2 second hang time to permit test unit mobile unit 704 to switch back to receive and monitor working channel low speed signaling and a drop channel message.

The test unit 700 then sends the CALL RESULTS message to the site controller 410 (block 1340) and returns to the MONITOR state to resume control channel monitoring. The CALL RESULTS message specifies if no low speed data was received, if no dropped channel message was received, or if the call was successfully completed.

If more than four seconds elapses and TU 700 fails to receive a drop channel message (blocks 1332, 1334), TU 700 reports to site controller (in a CALL RESULTS message) that no dropped channel message was received. This failure mode may indicate, for example, that the working channel failed to receive the TU originated low speed data; that the working channel was not placed in the message trunked mode; or that the working channel transmitter has completely failed.

Figure 26:
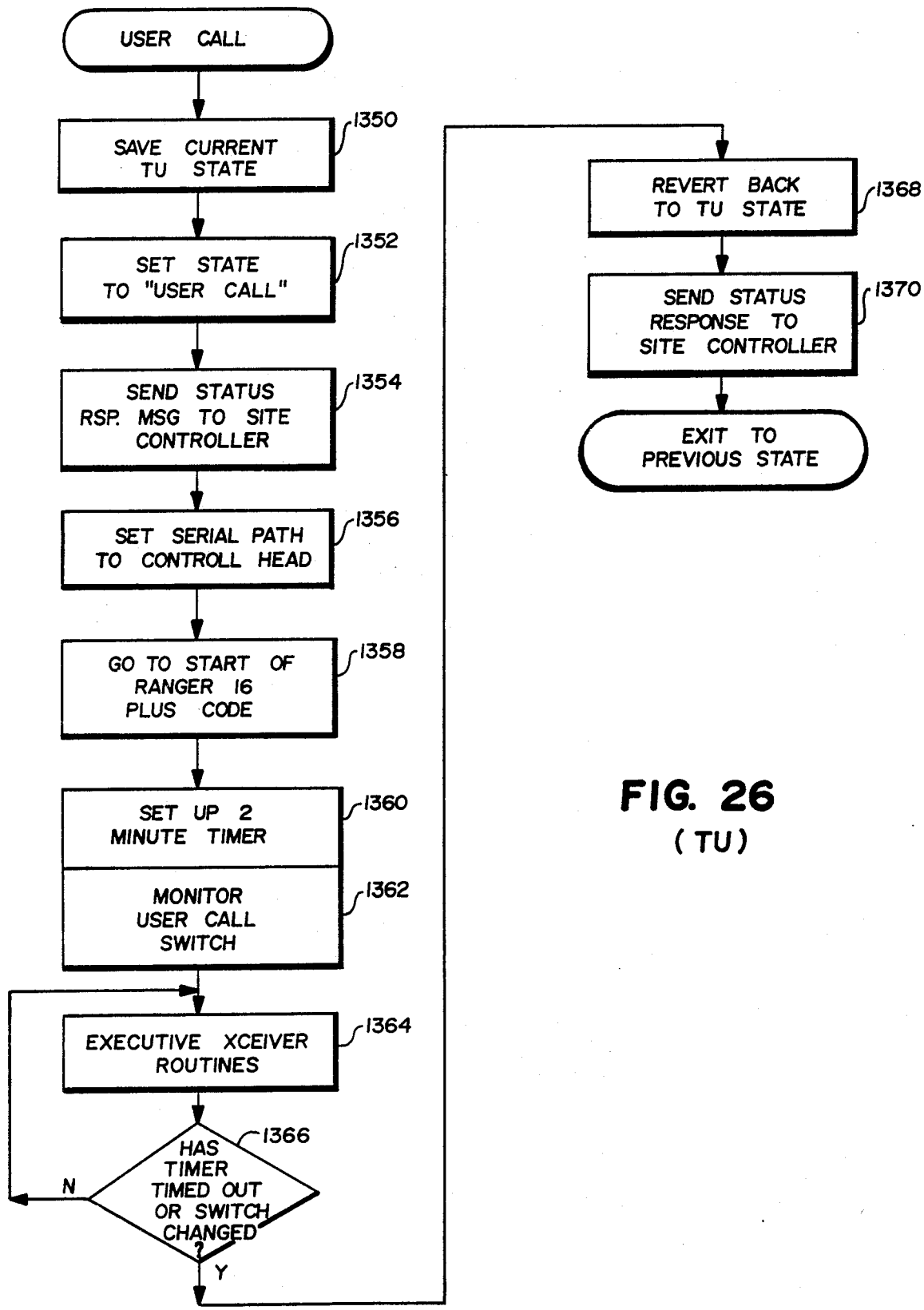

FIG. 26 is a detailed flowchart of steps performed by TU 700 in the USER CALL state. Upon entering the USER CALL state, TU 700 first saves its current state (block 1350) and sets its state to USER CALL (block 1352). TU 700 then transmits a status response message to site controller 410 indicating it has entered the USER CALL state and will therefore not be receiving messages sent to it by the site controller (block 1354). After sending the status response message, TU 700 sets its serial path to communicate with control head 702 rather than with the site controller (by changing the level of its SERVICE RQST line in the preferred embodiment) (block 1356), and performs initialization and other functions transceiver unit 704 normally performs as a mobile radio transceiver.

In the preferred embodiment, transceiver 704 includes not only the test unit programming which has been described, but also includes all of the software performed by "normal" trunked radio transceivers. In addition, transceiver includes one or more sets of "system personality" data in addition to the "personality" data it uses to operate as a test unit—to enable transceiver 704 to communicate with system 100 and with other systems as a normal mobile radio transceiver. Such communications capabilities can be invaluable to technicians servicing the repeater site, as they may need to call for help or technical advice, they may need to request a dispatch operator to issue console commands (or may request the system manager to issue manager commands) in order to facilitate troubleshooting and failure analysis at the site.

While operating as a "normal" radio transceiver, TU 700 monitors the state of the user call switch (block 1362) and also keeps track of how much time has passed since the user last issued a PTT command (blocks 1360, 1366). The TU 700 reverts back to operation as a test unit upon change of state of the user call switch, and also if the user forget to change the switch position to the test unit position and a sufficient period of time has elapsed. Immediately after exiting the USER CALL state, TU 700 sends a message to site controller 410 indicating that it once again is operating as a test unit and is able to receive site controller commands (block 1370).

SITE CONTROLLER ALARM HANDLING PROCESSES

As has been described, alarm and control unit 600, test unit 700 and power monitor unit 500 are all driven by control processes performed by site controller 410. Site controller 410 commands PMU 500, ACU 600 and TU 700 to perform test, diagnostic and control functions, and receives all of the informational messages produced by these units. For example, site controller 410 receives the CCFAIL and CALL RESULTS messages produced by TU 700 which report errors occurring on the control and/or working channels of system 100. Site controller 410 also receives indications of alarms detected by ACU 600, and indications of improper RF parameters detected by PMU 500. This vital error indicating information is used by site controller in a variety of ways, as will be explained.

Site controller 410 performs a variety of tasks under software control in order to provide system diagnostic functions. These tasks are divided into processing families all executing under the Micropower Multi-Tasking Operating System Kernel performed by site controller 410 in the preferred embodiment. Each family of tasks has a specific system function. These tasks will be described in connection with FIG. 27.

Tasks performed by site controller 410 may be divided into three main processing families: normal system operation tasks, channel failure mode tasks, and channel recovery tasks.

Figure 27:
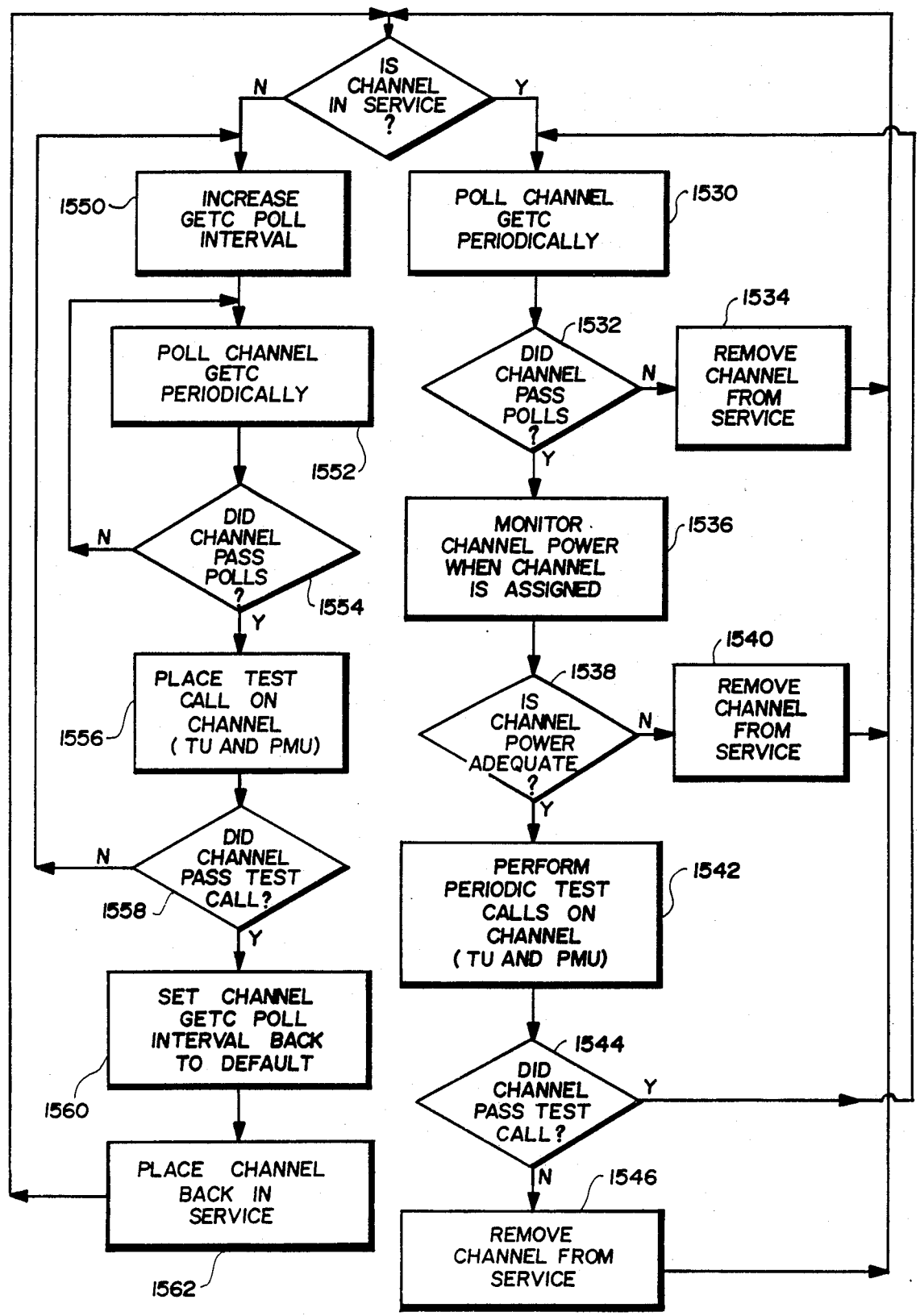

During normal system operation, site controller 410 continuously performs diagnostic checks on a channel-by-channel basis to insure that each channel is operating properly. For example, each channel (i.e., each RF trunking card 400) is periodically polled by site controller 410 and requested to report its status back to the site controller (FIG. 27, block 1530). These poll responses involve most of the operating portions of the RF trunking cards (e.g., data links 412, the trunking card internal microprocessor and memory, and other trunking card components). Site controller poll requests and responsive trunking card (and other system units) poll responses thus provides a relatively good test of the overall operation of each of the major components of system 100.

Also during normal operation, site controller 410 uses test unit 700 to continuously monitor the control channel. As mentioned previously, the continuous control channel monitoring performed by test unit 700 is interrupted only when the test unit is used for test calls or in the user call mode. If control channel signaling fails, TU 700 immediately notifies site controller 410.

Power monitoring unit 500 also continuously monitors the RF parameters of all active RF channels (block 1536). Since the RF control channel is always active, PMU 500 continuously monitors the control channel power output. As described above, PMU 500 notifies site controller 410 whenever the power output of a channel falls below a prespecified threshold, and also notifies the site controller of antenna problems (i.e., excessive VSWR).

Site controller 410 also periodically commands test unit 700 to make "test calls" on working channels (block 1542). Site controller 410 commands TU 700 to routinely make such test calls over working channels that site controller 410 assumes are operational (the site controller is thus often able to detect working channel failure before a working channel is discovered to be non-operational by RF transceivers in the field requiring communications). The "dummy" test calls made by test unit 700 allow site controller 410 to test the high and low speed signaling of both the control channel and selected working channels.

Also during normal system operation, the alarm and control unit 600 reports user alarms to site controller 410, which in turn forwards the alarms to system manager 416. System manager 416 may issue control commands to the ACU 600, which are forwarded to the ACU through site controller 410. Site controller 410 generally acts only as a communications channel between system manager 416 and ACU 600, and does not typically process the alarm or control information flowing between the system manager 416 and the ACU.

Through the normal system operation diagnostic task described above, site controller 410 has three ways to determine if an RF channel has failed. An RF channel trunking card may fail to respond to site controller poll requests; PMU 500 may notify the site controller that the RF output power of an active channel is inadequate; or test unit 700 may notify the site controller that the signaling on a channel is erroneous. These three failure detection mechanisms are redundant and overlapping in order to guarantee site controller 410 will detect all RF channel failures.

Site controller 410 determines an RF trunking card (or other system unit) has failed to properly respond to site controller poll requests when a "polling fault count" (a measure of the number of poll response errors in a given time period) increases above a predefined threshold (block 1532). RF channels that fail to produce poll responses cease to be used for communications (block 1534), although they continue to be polled by site controller 410. Site controller 410 begins using a RF channel previously determined to have erroneous poll response behavior only when the site controller determines they once again are successfully responding to poll requests (each successful poll response from an RF channel increments an "poll success channel" similar to the "fault counter"). If site controller 410 detects a poll response failure on the RF control channel, it immediately assigns another RF channel to operate as the control channel.

When PMU 500 reports that the RF output level of an RF channel that is supposed to be transmitting has fallen below a predetermined threshold (decision block 1538), site controller 410 ceases to use the failed channel but continues to poll the associated RF trunking card. If the failed channel is the control channel, site controller 410 assigns another RF channel to operate as the control channel.

An RF channel "fails" diagnostic test call criteria when site controller 410 requests TU 700 to perform a test call on the channel and the TU reports failure of any of the signaling involved in channel access (decision block 1544). Site controller 410 immediately ceases using the "failed" channel for communications (block 1546), but continues to poll its associated RF trunking card.

When site controller 410 detects that an RF channel has failed one or more of the three criteria described above, it attempts to recover from the failure by testing whether the channel correctly responds to poll requests, has correct signaling, and has adequate power output. If a channel meets all three test criteria, site controller 410 begins using the channel once again for useful communications. The channel recovery routines performed by site controller 410 allow RF channels which operate correctly intermittently to be operated during the times they operate correctly, and also prevent erroneous error indications from shutting down RF channels that are operating correctly.

Channel recovery in the preferred embodiment is a three step process. All three steps must be completed successfully or the RF channel is not returned to normal service.

When site controller 410 determines that an RF channel has failed, it increases the interval between successive poll requests sent to its associated RF trunking card (block 1550) in order to avoid wasting system resources polling inoperative channels. Site controller 410 does, however, continually send poll responses periodically to all RF trunking cards—including those associated with failed RF channels (block 1552). Successful poll responses by "failed" RF channels cause site controller 410 to increment an "success counter" associated with the channel. When the contents of the "success counter" increase above a predetermined threshold level (indicating that over a certain recent time interval the channel responded correctly to site controller poll requests), site controller 410 commands test unit 700 to place a test call on the channel (block 1556). Upon receipt of the TEST CALL command from site controller 410, TU 700 places a test call (as described previously) and reports the results back to the site controller. At the same time, PMU 500 monitors the RF power output of the channel during the test call and reports channel power output to site controller 410 (block 1556).

If either PMU 500 or TU 700 reports an error condition at the conclusion of the test call (as tested for by decision block 1558), site controller 410 continues to consider the channel to be in a failure mode, does not place the channel back into service, further increases the interval between polls it sends to the failed channel RF trunking card (in order to minimize system resources devoted to failed channels) (block 1550), but continues to poll the failed channel (block 1552). Blocks 1550-1558 continue to be repeated until the RF channel finally passes all three tests. When the RF channel finally responds correctly to site controller poll and behaves normally during a test call, site controller 410 resets the poll interval corresponding to that channel back to its normal default value (block 1560) (so that the channel will receive polls at the same frequency as all of the other channels), and begins using the channel once again for useful RF communications (block 1562).

SYSTEM MANAGER 416

As mentioned previously, system manager 416 plays an important role in controlling system 100. For example, system manager 416 handles all of the alarm and control functions provided by ACU 600, and also receives notification of alarm and other error conditions generated by test unit 700 and power monitor unit 500. System manager 416 in the preferred embodiment is intended to be operated by the system manager operators, people who are responsible for the overall operation and maintenance of system 100.

Figure 28:
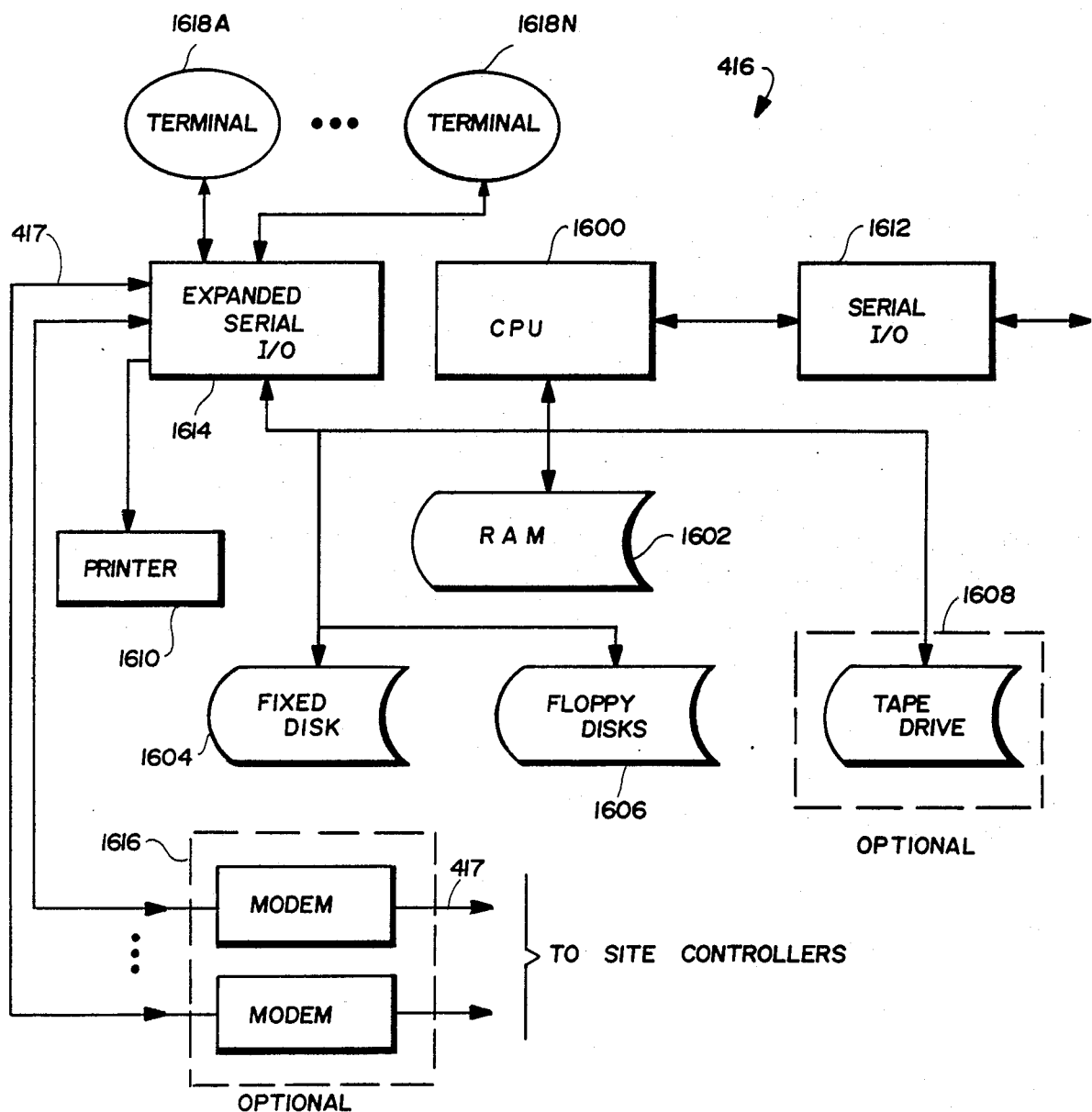

FIG. 28 is a detailed schematic diagram of the structure of system manager 416. System manager 416 includes a central processing unit 1600, a random access memory 1602, a fixed disk 1604, floppy disk drives 1606, an optional tape drive 1608, a printer 1610, a serial I/0 interface 1612, an expanded serial I/0 interface 1614, serial modems 1616, and one or more display terminals 1618. Central processing unit 1600 may be any desired conventional general purpose digital computer in the preferred embodiment (e.g., an IBM PC) connected to which is random access memory device 1602, serial I/0 interface 1612, 1614, tape drive 1608, fixed disk 1604 and floppy disk drive 1606. In the preferred embodiment, site controller 410 includes no hard disk drive, o that one of the responsibilities of system manager 416 is to store system parameters on fixed disk 1604 and download those parameters to site controller 410 upon power-up of system 100.

CPU 1600 communicates simultaneously with one or more display terminals 1618 (each including the CRT display and a keyboard) via expanded serial I/0 interface 1614 (of conventional design). Printer 1610 is provided to permit printing of a running log (or other desired reports) of system events. CPU 1600 communicates with site controller 410 via a serial data link 417 (and communicates with a backup site controller via an additional serial data link). System manager 416 in the preferred embodiment is capable of managing plural sites simultaneously, and thus may be in contact simultaneously with several repeater sites. Modems 1616 (of conventional design) may be provided to allow communication between the site controller 410 and system manager 416 over a conventional landline.

The functions performed by system manager 416 in the preferred embodiment include:
real-time alarm notification;
alarm management;
activity collection;
activity reporting;
alarm database maintenance; and
alarm database uploading.

The real-time alarm notification processes performed by system manager 416 provide users with notification of alarm conditions in real time. Alarm conditions include not only those alarms detected by ACU 600 in response to user alarm inputs, but also include error conditions detected by PMU 500, TU 700, and site controller 410. Real-time notification of such alarms is provided to allow human operators to take corrective action upon the occurrence of errors. For example, if ACU 600 detects the presence of a burglar at the site, an operator monitoring system manager terminal 1618 would receive notification of the user alarm in real time and could respond by requesting the police to investigate. Similarly, if PMU 500 detects an antenna problem, system manager 416 would receive real-time notification of the problem and could respond in an appropriate manner (e.g., by activating an antenna deicer, by dispatching a repair crew to look into the problem, or the like). The real-time alarm notification features provided by system manager 416 also allow operators to more effectively use system manager control features, and provides operators with a real-time indication of overall system status.

FIG. 29 is a flow chart of the real-time alarm notification steps performed by system manager 416. When site controller 410 determines that a system alarm has changed state (i.e., an alarm condition has arisen or an alarm condition has been resolved), it sends an alarm/status record message to system manager 416 over link 417. The alarm/status record message indicates the site number, the resource causing the generation of the message, and the specific element of the resource that initiated the change in alarm state. If system manager 416 is not already connected to site controller 410, the system manager may have to connect to the site controller (FIG. 29 block 1700) in a conventional manner.

Site controller 410 continuously receives alarm notification messages from ACU 600, TU 700 and PMU 500, as is explained above. Tasks performed by site controller 410 process these alarm messages and also "parse" them to determine which alarm messages should be sent on to system manager 416 (FIG. 29 block 1702). After site controller determines that a particular message is an alarm message, site I/0 process (block 1702) calls an "alarm update" process (block 1704) which actually sends alarm notification to system manager 416. Site controller 410 site I/0 process 1702 also handles all other messages received by the site controller, and calls various other tasks and processes (not shown) if messages other than alarm messages are received.

Alarm update process 1704 receives alarm messages from I/0 process 1702 and uses the received messages to update a global current alarm state array stored in primary site controller random access memory (block 1706). This current alarm state array is altered only by alarm update process 1704 so as to avoid conflicting operations from being performed on the array. Current alarm state array 1706 includes records schematically shown in FIG. 30.

As is shown in FIG. 30, global current alarm state array 1706 includes a plurality of records (one for each alarm condition currently existing in system 100), each record including the following fields: site id, resource id, element id, alarm state, and time. The site id field is included in array 1706 because system manager 416 may act as the system manager for several different sites, and therefore, alarm notifications must include designations of the sites from which the alarm originated. The resource id field identifies the specific resource which caused the record to be generated (e.g., PMU, TU, site controller, etc.). The element id field specifies the element of system 100 which is in the error or alarm state (e.g., control channel, working channel number, user alarm input number, etc.). The alarm state field is optional, since only records corresponding to active alarm states are stored in array 1706. The time field indicates the time the alarm event occurred.

After updating current alarm state array 1706, alarm update process 1704 notifies system manager 416 by transmitting an alarm notification message to the system manager over link 417.

In the preferred embodiment, as mentioned previously, system manager 416 may include several terminals 1618 for several corresponding users. In the preferred embodiment, each user is permitted to specify to site controller 410 whether or not he or she is to be notified of alarm conditions. More particularly, individual users are able to specify which alarms they are to receive notifications of. For example, one user may only be concerned with alarms occurring at a specific site, and may not wish to be notified of alarms pertaining to other sites. Another user may only be concerned with user alarms originated by ACU 600, and may choose to ignore all other types of alarms.

In the preferred embodiment, system manager 416 stores on fixed disk 1604 a user "alarm enable mask" for each user authorized to log on to system manager via a terminal 1618. When a user "logs on" to system manager 416 via terminal 1618, CPU 1600 searches for user profile information stored on fixed disk 1604 which specifies, among other things, a unique user password and the user alarm enable mask. If the user keys in the password information correctly, system manager 416 activates an alarm notification process 1708 which notifies the user, during the time he is "logged on," of all alarm conditions he is "enabled" to receive.

In somewhat more detail, alarm notification process 1708 "builds" an independent "latched alarm state table" for each individual user based upon the user alarm enable mask. System manager 416 reads the entire contents of current alarm state array 1706 maintained by site controller 410, and copies into the user latched alarm state table all of those entries which are selected by the user alarm enable mask.

After alarm notification process 1708 creates the user latched alarm state table, messages corresponding to each entry in the state table are displayed on user terminal 1618 to notify the user of existing alarm conditions. An alarm notification display message in the preferred embodiment consists of a message line printed at the bottom of the user's terminal 1618 and indicating that an alarm has occurred at a specific site. This message is displayed in reverse, blinking, bold video and is preceded by a number of audible beeps in the preferred embodiment. The alarm notification messages repeated periodically (e.g., every 30 seconds) until the user executes the alarm management function and reads additional details about the alarm state.

Because every user has an individual alarm enable mask, individual users can customize their latched alarm state tables to reflect the specific alarms they may be interested in without interfering with the ability of any other user to view or customize his own alarm enable mask. As any active alarm is enabled, an alarm message is printed to the user's screen—regardless of a specific task the user was performing at the time.

ALARM MANAGEMENT FUNCTION

FIG. 31 is a flow diagram of the alarm management function performed by system manager 416. Users call this alarm management function in order to either investigate a recently occurring alarm, or to redefine the user alarm enable mask. In either case, the user must select the site he or she wishes to manage the alarms of (since in the preferred embodiment, the user is able to define different alarm enable masks for different sites, and the alarm management function displays alarms pertaining to only one site at a time to avoid user confusion).

Once the user specifies a site, alarm management process 1715 displays the user latched alarm state table corresponding to that site (block 1717). The following is an exemplary latched alarm state table display:

```
                    GE 16-PLUS TRUNKING SYSTEM V6.0
                              ALARM CONTROL

LATCHED
                                                    Site Number:    1
                    11111111112                     Site Name:      SITE01
         Chnl       12345678901234567890
         PMU                       dA A
         Poll       ██████████████
         TU                        d a
         RIC                       d
                    111111111122222222223333
         Alarm #    123456789012345678901234567890123456789012
         ACU
         Downlink          Antenna Feed
         F6         F7     F9     F10    F11         F12
         EXIT       SAVE   NEXT   CLEAR  LATCHED     CURRENT
```

Note that the display set forth above designates the site by number and name, and includes two main portions: a channel alarm portion and a user alarm portion.

The channel alarm portion of the display shows four alarm sources (PMU, POLL, TU, RIC) for each of twenty RF channels. Each element in the alarm channel portion contains one of four symbols indicating the state of the alarm (either "A", "a", "d", or a blank). The symbol "A" indicates that the particular source of the alarm has an active latched alarm state and that the user has requested (via his or her user enable mask) to receive notification of this alarm. The symbol "a" indicates an alarm condition exists, but that the user has requested that he not be notified of this particular alarm condition. The symbol "d" indicates the user is disabled from being notified of the alarm condition, but that there is no current alarm for that condition. A blank indicates that there is no alarm condition, but that should one arise, the user is enabled to be notified of the condition.

The user alarm portion of the exemplary display set forth above individually lists each of the thirty-two user alarm inputs provided by ACU 600 along with a symbol specifying whether any alarm condition exists for that user alarm input.

The display also includes individual listings for downlink 103 error conditions (detected by site controller 410) and antenna feed error conditions (detected by PMU 500).

The latched alarm state table indicates all alarms that have become active since the last time the latched alarm state table was cleared. The latched alarm state table is thus particularly useful for indicating a short-lived alarm condition (i.e., an alarm condition that became active and then became inactive again shortly thereafter). The elements of the latched alarm state table can be reset individually in the preferred embodiment by the user (e.g., to reset an entry in the latched alarm state table, the user simply places his display terminal 1618 cursor under the table entry to be reset, keys in a R for "reset", and then depresses function key F7 to "save the screen"—thereby overwriting the latched alarm state table with the entries the user keyed in). Since there is a latched alarm state table corresponding to each user in the preferred embodiment, entries reset by one user do not cause corresponding entries in another user's latched alarm state table to be reset.

In the preferred embodiment, the current alarm state may be observed at will by the user (block 1719). To call up a display of the current alarm state, a user simply depresses function key F12 on his user display terminal 1618 in the preferred embodiment, and a display similar to the one shown above is displayed on the user display terminal screen. In contrast to the latched alarm table display, however, the current alarm display has indications corresponding only to those alarms which are currently active, and the user cannot reset any of the entries.

Alarm management "modify alarm enable mask" task 1721 also permits a user to modify his alarm mask enable profile. For example, in the preferred embodiment, a user invokes this modify task 1721 by displaying the latched alarm state table, keying an E or D (for "enable" or "disable") over the display of the desired element in the latched alarm state table to enable or disable alarm notification for that element, and then saving the alarm state table using the F7 save key.

ACTIVITY COLLECTION

System manager 416 collects alarm and other data concerning overall system activity in response to messages sent to it by site controller 410. When activity data is downloaded from the site to the system manager (either in response to a request by the system manager or in response to a decision by site controller that insufficient space remains in its buffer to store additional activity data), the site I/0 process 1702 receives the messages and routes them to a system activity collection process (which stores the activity data, including alarm activity data, into files corresponding to site and date). These files are stored on system manager fixed disk 1604. Although various different types of activity data are collected, the following discussion concerns the alarm activity data gathered by site controller 410 in response to messages it receives from PMU 500, ACU 600 and TU 700.

When the user of a system manager terminal 1618 requests access to alarm activity data, system manager 416 prompts the user for a designation of which activity file is to be processed (e.g., the user is prompted to enter a date and a site ID). In addition, the user specifies the device he wishes a report of alarm activity data to be printed or displayed. The user has an option of having the activity output displayed on his terminal display 1618 or directed to the system manager printer 1610. If the user selects the terminal, the requested activity data file is processed and its contents are dumped to the screen, one page at a time.

ACU ALARM AND RELAY DATABASE MAINTENANCE

System manager 416 also performs alarm database operations. As mentioned previously, ACU 600 requires site controller 410 to specify various information about the user alarm inputs (e.g., the inputs which are to be enabled, whether each individual alarm input has an active logic level 0 or 1 level, and whether the alarm inputs cause generation of a "major" or "minor" alarm). In the preferred embodiment, the database containing these specifications is stored on system manager fixed disk 1604 and is downloaded to site controller for communication to ACU 600.

When the user requests alarm database operations, the following exemplary display is displayed on the user terminal 1618 in the preferred embodiment:

| CE 16-PLUS TRUNKING SYSTEM ACU PARAMETERS (screen 1 of 2) | | | | | | |
|---|---|---|---|---|---|---|
| SITE #:1 SITE NAME: SITE01 | | | | | | MODIFY |
| ALARM NAME | ENABLE | ACT HI | MAJOR | | ALARM NAME | ENABLE ACT HI MAJOR |
| 1  1NAME1 | - Y - - - - | N - - - - | N - | \| \| 2  1NAME2 | - Y - - - - N - - - - Y - |
| 3  1NAME3 | - Y - - - - | N - - - - | N - | \| \| 4  1NAME4 | - Y - - - - Y - - - Y - |
| 5  ■■■■■■■ | - N - - - - | N - - - - | N - | \| \| 6 | - N - - - - N - - - - N - |
| 7 | - N - - - - | N - - - - | N - | \| \| 8 | - N - - - - N - - - - N - |
| 9 | - N - - - - | N - - - - | N - | \| \| 10 | - N - - - - N - - - - N - |
| 11 | - N - - - - | N - - - - | N - | \| \| 12 | - N - - - - N - - - - N - |
| 13 | - N - - - - | N - - - - | N - | \| \| 14 | - N - - - - N - - - - N - |
| 15 | - N - - - - | N - - - - | N - | \| \| 16 | - N - - - - N - - - - Y - |
| F6      F7 EXIT  SAVE | | F9      F10 NEXT  CLEAR | | | | NEXT SCREEN |

This display allows the user to more easily enter and change data in the alarm database. Occasionally this data is uploaded from system manager 416 to site controller 410 and transferred from the site controller to the Alarm and Control Unit 600.

Upon display of the format shown above, the user is prompted to select the site for which he wishes to alter the alarm database. If no corresponding database exists, system manager 416 assumes the user wishes to create a new database, and enters the "create" mode. When in the "create" mode, the user must supply the alarm name and corresponding process information (i.e., enable/disable, Active hi/active lo, and major/minor) for every one of the 32 ACU 600 user alarms. When the user has finished specifying the required information, he or she depresses the SAVE function key (F7) to store the information in the corresponding alarm database.

The user is permitted to modify a previously created alarm database in a similar manner (except that to modify a database, the user only needs to key in the database entries to be changed).

At the direction of a system manager 416 user, system manager 416 uploads the contents of the alarm database to the ACU 600 via site controller 410. Upon entering the appropriate upload command, system manager 416 automatically "attaches" (i.e., connects to) the site controller 410 of the desired site and sends the appropriate database contents to the site controller. After all data has been sent, the system manager "detaches" from the site controller 410 and a completion status is sent to the user. The site controller 410 then sends a message to ACU 600 containing the new alarm information. Techniques similar to the alarm database process just described may also be used to maintain and upload a database corresponding to ACU 600 control relay states.

SYSTEM MANAGER MESSAGE FORMATS

The following describes exemplary messages and message conventions communicated between system manager 416 and site controller 410.

MESSAGE PROTOCOL

Messages are transmitted between system manager 416 and site controller 410 in 8-bit data packets delimited by frame start characters and checksum characters. Each packet starts with a frame byte character of 0AA hex. The internal structure of a packet is as follows:

*ff tt dd dd dd ... dd cc* where
- ff is the frame sync character (AA hex),
- tt is the message type byte (which defines the content of the message),
- dd are data bytes, and
- cc is a checksum (formed by taking the exclusive OR of each byte in the message, starting with the message ID byte, and then negating the result).

Figure 32:
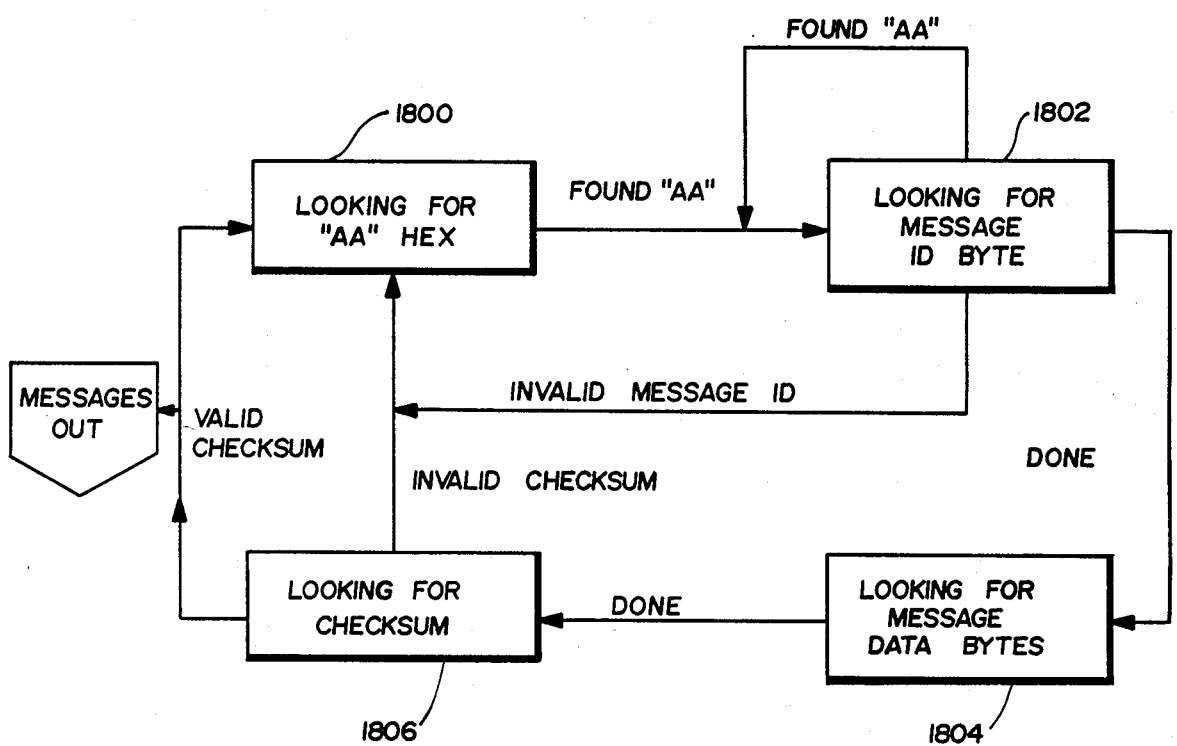

Messages are parsed by both site controller 410 and system manager 416 in the preferred embodiment using a software-controlled state machine implementation (see FIG. 32). The primary state 1800 searches for the frame start character (AA hex). When the frame start character is found, it is discarded without a state change to allow resynchronization by strings of start characters. If an invalid message ID byte is received (state 1802 shown in FIG. 32), the process returns to state 1800 to search for a frame start character. If a valid message ID byte is received, on the other hand, state 1804 is entered to receive the number of data bytes specified by the message ID byte (in the preferred embodiment, each message ID signifies a number of data bytes 1-n to follow, since each different type of message always includes the same number of data bytes).

After the data bytes are received, state 1806 receives the next received byte as a checksum byte and compares the value of this byte to a checksum value calculated based on the received data. A match causes an acknowledgment message to be transmitted and a valid message to be outputted. No match causes a negative acknowledge message to be transmitted. State 1800 then is reentered to wait for receipt of the next message.

ACKNOWLEDGEMENT RULES

Any valid message received is acknowledged. A valid message is defined as one in which the checksum of the data bytes matches the checksum transmitted. If a packet is received but has an invalid checksum, a negative acknowledgement (NACK) is sent.

Messages are transmitted singly threaded, waiting for an acknowledgement before sending the next message. Receiving a negative acknowledgement results in immediate retransmission of the packet. If an acknowledgement is not received within two seconds, the same message is retransmitted. Retransmission should occur three times before erroring out.

An acknowledgement message has the following form:

| ff | AA |
|---|---|
| tt | 0 |
| cc | FF (checksum of 0) |

A negative acknowledgement message has the following form:

| ff | AA |
|---|---|
| tt | FF |
| cc | 0 |

SITE CONTROLLER—SYSTEM MANAGER MESSAGES

MESSAGE 20 SIGNOFF

The signoff message is sent just prior to hanging up the modem (or dropping DTR). It is a warning to the system manager to set its line status to disconnected and prepare for loss of carrier.

| ff | AA |
|---|---|
| tt | 20 |
| cc | DF (checksum of 20) |

MESSAGE 22 LOGIN

Message 22 is used to send the site password to the system manager. A logical connection will be honored by the system manager only if the password in this message matches the one stored in its database for the site number (also sent in this message). This message will cause the site controller to initiate a connection to the system manager (i.e., dial modem if necessary).

| ff | AA |
|---|---|

| | |
|---|---|
| tt | 22 |
| dd | site number (1 byte) |
| | password (12 bytes) |
| cc | checksum as calculated |

MESSAGE 23 LOGICAL DATABASE REQUEST

Message 23 is used to request a total upload of the logical id database from the system manager. This message will cause the site controller to initiate a connection to the system manager.

| | |
|---|---|
| ff | AA |
| tt | 23 |
| cc | DC (checksum of 23) |

MESSAGE 24 GROUP DATABASE REQUEST

Message 24 is used to request a total upload of the group id database from the system manager. This message will cause the site controller to initiate a connection to the system manager.

| | |
|---|---|
| ff | AA |
| tt | 24 |
| cc | DB (checksum of 24) |

MESSAGE 25 ALARM/STATUS RECORD

Message 25 is used to send site alarm/status data to the system manager. Alarm records are sent unsolicited when alarms occur, or on request from the system manager. Alarm classes range from 1 to 255. Use of the four alarm bytes is defined on a class by class basis.

| | |
|---|---|
| ff | AA |
| tt | 25 |
| dd | alarm class (1 byte) |
| | alarm data (array [0 ... 3] of byte) |
| | (or [0.31] of boolean) |
| cc | checksum as calculated |

MESSAGE 27 CLOCK TIME/DATE REQUEST

Message 27 is used to request the clock time from the system manager. This message will cause the site controller to initiate a connection to the system manager.

| | |
|---|---|
| ff | AA |
| tt | 27 |
| cc | DB (checksum of 27) |

MESSAGE 28 MONITOR RECORD

Monitor records are sent to the system manager whenever monitor is turned on (see system manager-site controller message 28) and the status of a channel has changed at the site. During periods of heavy activity some detail may be lost, but the final state of any channel is guaranteed to be delivered.

| | |
|---|---|
| ff | AA |
| tt | 28 |
| dd | channel number (1 word) |

| | |
|---|---|
| | caller id (1 word) |
| | callee id (1 word) |
| | channel type (1 byte), see below |
| | call type (1 byte), see below |
| | time (1 word), see below |
| | elapse (1 word), not currently used |
| | message (1 word), not currently used |
| | repeater status (1 byte), see below |
| | spare (4 bytes), not currently used |
| cc | checksum as calculated |

| Channel Type | | Call Type | Status |
|---|---|---|---|
| 0 voice | 0 | group | 0 off |
| 1 data | 1 | emergency | 1 on |
| 2 dvg | 2 | special | 2 avail |
| 3 other | 3 | mob status | 3 unavl |
| 4 control | 4 | key | 4 in use |
| 5 downline | 5 | unkey | |
| 6 modem | | chn status | |
| 7 interconnect | 7 | drop | |
| | 8 | emerg key | |
| | 9 | emerg unkey | |

MESSAGE 29 ACTIVITY RECORD

Activity records are sent to the system manager where activity is turned on (see System Manager-Site Controller message 29) and the activity database is not empty.

| | |
|---|---|
| ff | AA |
| tt | 29 |
| dd | 16 byte activity record. Internal formats are defined in a separate document. |
| cc | checksum as calculated |

MESSAGE 2A SITE CONFIGURATION

| | |
|---|---|
| ff | AA |
| tt | 2A |
| dd | working channels (array [0 ... 31] of boolean) |
| | modem channels (array [0 ... 31] of boolean) |
| | RIC channels (array [0 ... 31] of boolean) |
| | control channel (byte) |
| | downlink channel (byte) |
| cc | checksum ss calculated |

MESSAGE 30 INTERCONNECT LINE DATA REQUEST

Message 30 is used to request the line database from the system manager.

| | |
|---|---|
| ff | AA |
| tt | 30 |
| cc | CF (checksum of 30) |

MESSAGE 33 INTERCONNECT ROTARY DATA REQUEST

Message 33 is used to request the rotary database from the system manager.

| | |
|---|---|
| ff | AA |
| tt | 33 |

| | |
|---|---|
| cc | CC (checksum of 33) |

MESSAGE 34 INTERCONNECT TOLL CALL DATA REQUEST

Message 34 is used to request the toll call database from the system manager.

| | |
|---|---|
| ff | AA |
| tt | 34 |
| cc | CB (checksum of 34) |

MESSAGE 35 ACU MASK REQUEST

Message 35 is used to request the ACU database from the system manager.

| | |
|---|---|
| ff | AA |
| tt | 35 |
| cc | CA (checksum of 35) |

SYSTEM MANAGER SITE CONTROLLER MESSAGES

MESSAGE 2∅ SIGNOFF

The signoff message is sent just prior to hanging up the modem (or dropping DTR). It is a warning to the site controller to set its line status to disconnect and prepare for loss of carrier.

| | |
|---|---|
| ff | AA |
| tt | 2∅ |
| cc | DF (checksum of 2∅) |

MESSAGE 22 PASSWORD

Message 22 is used to send the site password to the site controller. A logical connection will be honored by the site controller only if the password in this message matches the one stored in its personality ROM.

| | |
|---|---|
| ff | AA |
| tt | 22 |
| dd | site number (1 byte) |
| | password (12 bytes) |
| cc | checksum as calculated |

MESSAGE 23 LOGICAL ID RECORD (ALL)

The logical id record is sent to the site to update the site's resident user database. Message type 23 implies a total upload of the database. The first time it is sent it signifies the start of the upload. When a record is sent with LID of FFFF, it signifies the completion of the upload, and that the unused portions of the database should be loaded with the values contained in this record.

| | |
|---|---|
| ff | AA |
| tt | 23 |
| dd | logical id (1 word) |
| | spare (1 nibble), not currently used |
| | toll restriction level (1 nibble) |
| | rotary (1 nibble) |
| | voice priority (1 nibble) |
| | data priority (1 nibble) |
| | DVG priority (1 nibble) |
| | interconnect priority (1 nibble) |
| | regrouped (1 bit) |
| | id valid (1 bit) |
| | spare (2 bits), not currently used |
| | line number (1 byte) |
| | hang time (1 byte) (seconds) |
| cc | checksum as calculated |

MESSAGE 24 GROUP ID RECORD (ALL)

The group id record is sent to the site to update the site's resident group database. Message type 24 implies a total upload of the database. The first time it is sent, it signifies the start of the upload. When a record is sent with GID of FFFF, it signifies the completion of the upload, and that the unused portions of the database should be loaded with the values contained in this record.

| | |
|---|---|
| ff | AA |
| tt | 24 |
| dd | group id (1 word) |
| | spare (1 nibble), not currently used |
| | voice priority (1 nibble) |
| | data priority (1 nibble) |
| | DVG priority (1 nibble) |
| | interconnect priority (1 nibble) |
| | id valid (1 bit) |
| | spare (3 bits), not currently used |
| | hang time (1 byte) (seconds) |
| cc | checksum as calculated |

MESSAGE 25 ALARM/STATUS REQUEST

The alarm/status request is used to solicit alarm or status information from the site. A specific class of alarm can be requested or all classes can be requested by setting the class to ∅.

| | |
|---|---|
| ff | Aa |
| tt | 25 |
| dd | alarm class (1 byte) |
| cc | checksum as calculated |

MESSAGE 27 CLOCK TIME/DATE

The clock time and data record is sent to the site controller to synchronize its internal real time clock with that of the system manager. The site clock is used for time stamping activity records.

| | |
|---|---|
| ff | Aa |
| tt | 27 |
| dd | year - 19∅∅ (1 byte) |
| | month (1-12) (1 byte) |
| | hour of day (1 byte) |
| | minute of hour (1 byte) |
| | second of minute (1 byte) |
| | day of week (1-7) (1 byte) |
| cc | checksum as calculated |

MESSAGE 28 MONITOR ON/OFF

The monitor on/off message is used to start (or stop) the flow of monitor messages from the site.

| | |
|---|---|
| ff | AA |
| tt | 28 |
| dd | data (1 byte) - 01 starts monitor |
| | 00 stops monitor |
| cc | checksum as calculated |

MESSAGE 29 ACTIVITY ON/OFF

The activity on/off message is used to start (or stop) the flow of activity messages from t he site.

| | |
|---|---|
| ff | AA |
| tt | 29 |
| dd | data (1 byte) - 01 starts activity |
| | 00 stops activity |
| cc | checksum as calculated |

MESSAGE 2A SITE CONFIGURATION REQUEST

The site configuration request is sent to request the current site layout, in the form of site controller-system manager message 2A.

| | |
|---|---|
| ff | AA |
| tt | 2A |
| cc | checksum as calculated |

MESSAGE 2F SITE RF RECONFIGURATION

The site RF reconfiguration message is sent to change which channels are being used for working channels and which channel is the control channel. Valid channel numbers are 1–25.

| | |
|---|---|
| ff | AA |
| tt | 2F |
| dd | working channels (array [0.31] of boolean) |
| | current control channel (byte) |
| cc | checksum as calculated |

MESSAGE 30 INTERCONNECT LINE DATA

Message 30 is used to send interconnect line data to the site. Lines are numbered 1–255. Lines are placed in service by sending a record for that line. Lines are removed from service by sending another record for the line, marking it as unavailable.

| | |
|---|---|
| ff | AA |
| tt | 30 |
| dd | line number (1 byte) |
| | available (1 byte, MSB is used) |
| cc | checksum as calculated |

MESSAGE 31 LOGICAL ID RECORD (INCREMENTAL)

The logical id record is sent to the site to update the site's resident user database. Message type 31 implies an incremental upload of the database. This particular id is updated with no effect on the rest of the database.

| | |
|---|---|
| ff | AA |

-continued

| | |
|---|---|
| tt | 31 |
| dd | logical id (1 word) |
| | spare (1 nibble), not currently used |
| | toll restriction level (1 nibble) |
| | rotary (1 nibble) |
| | voice priority (1 nibble) |
| | data priority (1 nibble) |
| | DVG priority (1 nibble) |
| | interconnect priority (1 nibble) |
| | regrouped (1 bit) |
| | id valid (1 bit) |
| | spare (2 bits), not currently used |
| | line number (1 byte) |
| | hang time (1 byte) (seconds) |
| cc | checksum as calculated |

MESSAGE 32 GROUP ID RECORD (INCREMENTAL)

The group id record is sent to the site to update the site's resident group database. Message type 34 implies an incremental upload of the database. This particular id is updated with no effect on the rest of the database.

| | |
|---|---|
| ff | AA |
| tt | 32 |
| dd | group id (1 word) |
| | spare (1 nibble), not currently used |
| | voice priority (1 nibble) |
| | data priority (1 nibble) |
| | DVG priority (1 nibble) |
| | interconnect priority (1 nibble) |
| | id valid (1 bit) |
| | spare (3 bits), not currently used |
| | hang time (1 byte) (seconds) |
| cc | checksum as calculated |

MESSAGE 33 INTERCONNECT ROTARY DATA

Message 33 is used to send interconnect rotary data to the site. Rotaries are numbered 1–15. Each rotary has 16 line entries, each entry being a line number from 1–255. Unused line entries must be set to 0.

| | |
|---|---|
| ff | AA |
| tt | 33 |
| dd | rotary number (1 byte, lower nibble used) |
| | line entries (array [0 ... 15] of byte) |
| cc | checksum as calculated |

MESSAGE 34 INTERCONNECT TOLL CALL RESTRICTIONS

Message 34 is used to send interconnect toll call restriction data to the site. Toll call restriction entries are numbered 0–15. Dialed telephone numbers are matched to the restriction level mask, from level 0–15. When a match is found, the boolean in the user levels array which is pointed to by the users toll call pointer is checked to determine whether or not the call is permissible. Unused restriction levels must have a mask of "...".

| | |
|---|---|
| ff | AA |
| tt | 34 |
| dd | restriction level (1 byte, lower nibble used) |
| | mask (array [0 ... 3] of character) |
| | user levels (array [0 ... 15] of |

-continued

|    |                                |
| -- | ------------------------------ |
|    | boolean)                       |
| cc | checksum as calculated         |

MESSAGE 35 ACU RELAY MASK

|    |                        |
| -- | ---------------------- |
| ff | AA                     |
| tt | 35                     |
| dd | relay mask (1 byte)    |
| cc | checksum as calculated |

MESSAGE 36 ACU ALARM MASKS

The ACU alarm masks message is sent to the site controller to configure the 32 ACU alarm inputs. Masks determine which inputs are active, whether they are active high or low, and whether they are major or minor alarms.

|    |                                     |
| -- | ----------------------------------- |
| ff | AA                                  |
| tt | 36                                  |
| dd | enable (array [0 ... 31] of boolean) |
|    | active (array [0 ... 31] of boolean) |
|    | major (array [0 ... 31] of boolean)  |
| cc | checksum as calculated              |

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A digitally trunked radio communications system of the type having a control channel and plural working channels, said working channels being temporarily assigned for communication by radio units in response to digital control signals passed over said control channel, a method of testing the operation of said system comprising:
   (a) continually monitoring digital control messages passed over said control channel with a testing radio transceiver;
   (b) controlling, from a site controller, initiation of a test call sequence provided by said testing radio transceiver, including the steps of (b1) generating a test call message at said site controller, (b2) providing said generated test call message to said testing radio transceiver by passing said test call message from said site controller to said testing transceiver over a digital signal link connecting said testing transceiver to said site controller, and (b3) transmitting a digital call message over said control channel with said testing transceiver in response to said test call message provided to said testing transceiver, said call message requesting a working channel;
   (c) receiving a working channel assignment message passed over said control channel;
   (d) in response to receipt of said working channel assignment message, performing the following steps:
      (1) tuning said testing transceiver to a working channel specified by said working channel assignment message,
      (2) monitoring high speed signaling passed over said working channel,
      (3) transmitting low-speed signaling over said working channel,
      (4) monitoring low-speed signaling passed over said working channel, and
      (5) receiving a drop channel message passed over said working channel; and
   (e) applying a called results message indicating results of said step (d) monitoring to said site controller via said digital signal link.

2. A method as in claim 1 further including the steps of:
   reserving a working channel for testing;
   sending said test call message over said link only after said working channel has been reserved; and
   applying an error message to said site controller if a call pending message is passed over said control channel instead of said working channel assignment.

3. A method as in claim 1 wherein said working channel assignment message received by said receiving step (c) specifies message trunking, said monitoring step (4) is performed for a preset hang time period after said transmitting step (3) is completed, and said call results message indicates whether low-speed data was received.

4. A method as in claim 1 wherein said call results message indicates no drop message channel was received if more than a preset time period elapses between completion of said transmitting step (3) and receipt by said receiving step (5) of a predetermined drop channel message.

5. A method as in claim 1 wherein:
   said method further includes the step of reserving beforehand, at said site controller, a specific working channel for testing and generating said working channel assignment message specifying said reserved working channel; and
   said tuning step (d)(1) comprises the step of tuning said testing transceiver to said reserved channel in response to said working channel assignment message.

6. A digitally trunked radio communications system of the type having a control channel and plural working channels, said working channels being temporarily assigned for communication by radio units in response to digital control signals passed over said control channel, a method of testing the operation of said system comprising:
   (a) substantially continuously monitoring digital control messages passed over said control channel with a testing radio transceiver;
   (b) in response to a receipt of a test call message passed over a digital signal link connecting said testing transceiver to a site controller, transmitting a digital call message over said control channel with said testing transceiver, said call message requesting a working channel;
   (c) receiving a working channel assignment message passed over said control channel;
   (d) in response to receipt of said working channel assignment message, performing the following steps:

(1) tuning said testing transceiver to a working channel specified by said working channel assignment message,
(2) monitoring high speed signaling passed over said working channel,
(3) transmitting low-speed signaling over said working channel,
(4) monitoring low-speed signaling passed over said working channel, and
(5) receiving a drop channel message passed over said working channel; and (e) applying a called results message indicating results of said step (d) to said site controller via said digital signal link;

wherein said applying step (e) includes generating a called results digital message including the following:
a T5 value specifying whether said receiving step (c) received said working channel assignment message;
a T4 value specifying whether said monitoring step (2) successfully monitored said working channel high-speed signaling;
a T3 value specifying whether said monitoring step (4) successfully monitored said working channel low-speed signaling; and
a T2 value specifying whether said receiving step (5) successfully received said dropped channel message.

7. A method as in claim 6 wherein said applying step (e) further includes generating a W value identifying the working channel tuned to by said tuning step (1).

* * * * *